US009544651B2

(12) United States Patent
Ueno

(10) Patent No.: US 9,544,651 B2
(45) Date of Patent: Jan. 10, 2017

(54) INFORMATION RECEPTION APPARATUS, INFORMATION RECEPTION METHOD, COMPUTER PROGRAM FOR INFORMATION RECEPTION, AND INFORMATION DISTRIBUTION APPARATUS

(71) Applicant: JVC KENWOOD CORPORATION, Yokohama-shi, Kanagawa (JP)

(72) Inventor: Masahiro Ueno, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 113 days.

(21) Appl. No.: 14/142,181

(22) Filed: Dec. 27, 2013

(65) Prior Publication Data
US 2014/0115630 A1 Apr. 24, 2014

Related U.S. Application Data

(60) Division of application No. 13/219,137, filed on Aug. 26, 2011, now abandoned, which is a
(Continued)

(30) Foreign Application Priority Data

Feb. 27, 2009 (JP) ................................ 2009-046915
Feb. 27, 2009 (JP) ................................ 2009-047059
(Continued)

(51) Int. Cl.
*H04N 7/16* (2011.01)
*H04N 21/4722* (2011.01)
(Continued)

(52) U.S. Cl.
CPC ...... *H04N 21/4722* (2013.01); *H04N 21/2625* (2013.01); *H04N 21/26283* (2013.01);
(Continued)

(58) Field of Classification Search
CPC ...................... H04N 21/47214; H04N 21/4784
(Continued)

(56) References Cited

U.S. PATENT DOCUMENTS 6,057,872 A 5/2000 Candelore
6,353,444 B1 3/2002 Katta et al.
(Continued)

FOREIGN PATENT DOCUMENTS

CN 1235298 A 11/1999
EP 0940980 A2 9/1999
(Continued)

OTHER PUBLICATIONS

International Search Report for International Application No. PCT/JP2010/001338, mailing date of Jun. 1, 2010.
(Continued)

*Primary Examiner* — An Son P Huynh
(74) *Attorney, Agent, or Firm* — Cantor Colburn LLP

(57) ABSTRACT

An information reception apparatus which allows a user to easily understand, from an electronic program guide, the information announced in a broadcast program, and which contributes to increasing viewer ratings of the broadcast program. The information reception apparatus (broadcast reception apparatus) is provided with: an electronic program information acquisition unit (tuner, control unit) for acquiring electronic program information; an announcement information acquisition unit (control unit, DEMUX unit) for acquiring information announced in the broadcast program from information included in the electronic program information acquired by the electronic program information acquisition unit or from information transmitted together with the electronic program information; and an announcement information output unit (control unit, AV output unit) for outputting the electronic program information and for
(Continued)

outputting information indicating the presence or absence of the announcement information, based on the information acquired by the announcement information acquisition unit.

5 Claims, 42 Drawing Sheets

Related U.S. Application Data continuation-in-part of application No. PCT/JP2010/001338, filed on Feb. 26, 2010.

(30) Foreign Application Priority Data

| Feb. 27, 2009 | (JP) | ................................ | 2009-047139 |
| Feb. 27, 2009 | (JP) | ................................ | 2009-047394 |
| Feb. 27, 2009 | (JP) | ................................ | 2009-047405 |
| Feb. 27, 2009 | (JP) | ................................ | 2009-047407 |
| Mar. 6, 2009 | (JP) | ................................ | 2009-053907 |

(51) Int. Cl.
  *H04N 21/472* (2011.01)
  *H04N 21/4784* (2011.01)
  *H04N 21/482* (2011.01)
  *H04N 21/262* (2011.01)

(52) U.S. Cl.
  CPC ... *H04N 21/4784* (2013.01); *H04N 21/47214* (2013.01); *H04N 21/482* (2013.01); *H04N 21/4821* (2013.01)

(58) Field of Classification Search
  USPC ........ 725/23, 39–40; 705/14.1, 14.11, 14.12, 705/14.13, 14.14, 14.15, 14.22, 14.27, 14.31, 705/14.32, 14.33, 14.35, 14.36, 14.41
  See application file for complete search history.

(56) References Cited

U.S. PATENT DOCUMENTS

| 6,364,768 | B1 | 4/2002 | Acres et al. |
| 6,487,722 | B1 | 11/2002 | Okura et al. |
| 7,302,696 | B1 | 11/2007 | Yamamoto |
| 7,313,802 | B1 | 12/2007 | Tomsen |
| 7,493,636 | B2 | 2/2009 | Kitsukawa et al. |
| 7,765,563 | B2 | 7/2010 | Bauminger et al. |
| 7,778,868 | B2 | 8/2010 | Haugen et al. |
| 7,792,709 | B1* | 9/2010 | Trandal .................. G06Q 30/02 705/26.1 |
| 7,814,406 | B2 | 10/2010 | Ozawa et al. |
| 7,840,975 | B2* | 11/2010 | Matheny ............ G06Q 30/0226 725/23 |
| 8,239,891 | B2 | 8/2012 | Hughes et al. |
| 2002/0059636 | A1* | 5/2002 | Takeuchi ............... H04H 20/28 725/116 |
| 2002/0078448 | A1 | 6/2002 | Wakahara |
| 2002/0174430 | A1* | 11/2002 | Ellis ..................... G11B 27/005 725/46 |
| 2003/0149988 | A1* | 8/2003 | Ellis .................. H04N 5/44543 725/87 |
| 2003/0204854 | A1 | 10/2003 | Blackketter et al. |
| 2004/0053667 | A1* | 3/2004 | Hirayama ............. G06Q 50/34 463/17 |
| 2004/0210932 | A1 | 10/2004 | Mori et al. |
| 2005/0028208 | A1* | 2/2005 | Ellis ...................... H04N 7/163 725/58 |
| 2005/0097602 | A1* | 5/2005 | Murakami ......... H04N 5/44543 725/44 |
| 2006/0178932 | A1* | 8/2006 | Lang ..................... G06Q 30/02 705/14.73 |
| 2006/0265281 | A1* | 11/2006 | Sprovieri ............... G06Q 30/02 705/14.26 |
| 2007/0073599 | A1* | 3/2007 | Perry ..................... G06Q 30/02 705/26.5 |
| 2007/0154163 | A1* | 7/2007 | Cordray ............. H04N 21/6187 386/278 |
| 2007/0157225 | A1* | 7/2007 | Harada ............... G06Q 30/0601 725/23 |
| 2008/0026810 | A1 | 1/2008 | Walker et al. |
| 2008/0059884 | A1* | 3/2008 | Ellis .................... H04N 5/44543 715/721 |
| 2008/0134229 | A1* | 6/2008 | Conant ............. H04N 7/17318 725/23 |
| 2008/0163257 | A1* | 7/2008 | Carlson .................. G06Q 20/10 719/318 |
| 2008/0184303 | A1 | 7/2008 | Schein et al. |
| 2008/0262928 | A1* | 10/2008 | Michaelis .............. G06Q 30/02 705/14.26 |
| 2009/0133069 | A1* | 5/2009 | Conness ............ H04N 5/44543 725/46 |
| 2009/0281888 | A1* | 11/2009 | Zai ........................ G06Q 30/02 705/14.25 |
| 2009/0300670 | A1 | 12/2009 | Barish |
| 2010/0077423 | A1* | 3/2010 | Yonishi .................. H04H 60/32 725/14 |
| 2010/0131983 | A1* | 5/2010 | Shannon ............. H04N 5/44543 725/46 |
| 2010/0150335 | A1 | 6/2010 | Dowdy |
| 2010/0153885 | A1* | 6/2010 | Yates ..................... G06F 3/0482 715/841 |
| 2010/0262995 | A1* | 10/2010 | Woods .................... G06T 15/20 725/40 |
| 2011/0054993 | A1 | 3/2011 | Marshall et al. |
| 2012/0257560 | A1* | 10/2012 | Srinivasan .............. H04W 4/18 370/312 |

FOREIGN PATENT DOCUMENTS

| EP | 1265386 A1 | 12/2002 |
| JP | 11275537 A | 10/1999 |
| JP | 11341441 A | 12/1999 |
| JP | 2000172394 A | 6/2000 |
| JP | 2000196545 A | 7/2000 |
| JP | 2000295554 A | 10/2000 |
| JP | 2002245198 A | 8/2002 |
| JP | 2003032568 A | 1/2003 |
| JP | 2003333544 A | 11/2003 |
| JP | 2004104640 A | 4/2004 |
| JP | 2006114972 A | 4/2006 |
| JP | 2007-89220 A | 4/2007 |
| JP | 2007-235639 A | 9/2007 |
| JP | 2008-252447 A | 10/2008 |
| JP | 2008252358 A | 10/2008 |
| JP | 2008258943 A | 10/2008 |
| WO | 02067474 A1 | 8/2002 |
| WO | 2008123457 A1 | 10/2008 |

OTHER PUBLICATIONS

Office Action for the Japanese Patent No. 2009-047407, Mailed on May 7, 2014. English Translation Attached.

Japanese Notice of Reasons for Rejection corresponding to Application No. 2014-172660; Mailing Date: Jul. 7, 2015, with English translation.

* cited by examiner

PRIZE INFORMATION

| broadcast type | broadcast station name | broadcast start date and time | broadcast end date and time | program name | present categroy | present roduct name | present image | real-time or not | application ethod | prize application start date and time | prize application end date and time |
|---|---|---|---|---|---|---|---|---|---|---|---|
| Terrestrial TV | Tokyo BC | 2009/1/1 17:00 | 2009/1/1 19:00 | Discover the 7wonders of Japan! | program novelty | Mr. Crystal Hiroshi | | real-time | telephone | 2009/1/1 18:40 | 2009/1/1 18:45 |
| FM | Asian FM | 2009/1/1 18:30 | 2009/1/1 20:30 | New Year Asia | travel | 8 days and 6 nights tour to Thailand | | real-time | internet | 2009/1/1 18:30 | 2009/1/1 20:15 |
| BS | BS World | 2009/1/1 19:00 | 2009/1/1 20:00 | World Newa | home electronics | 32-inch LCD TV | | non-real-time | post mail | 2009/1/1 | 2009/1/5 |

Fig.4

Terrestrial Digital
BS
CS
FM
AM

Thu, 1 January 2009 17:00

| | Asia TV 41 | TV Sunset 51 | Tokyo BC 61 | Business TV 71 |
|---|---|---|---|---|
| 17 | 00 Music Airport Stop, Blt, Mr. Robinson, Ayumi Sawada, Self-esteem, Typhoon, Koji Fukuda, Earl Grey, beckoning Cat, And Others Mc: Sabori | 00 Fire Defense Agency 24 o'clock fire station fighting against fire documentary | | 00 Moonin Special "Moonin and a fairy in the valley" "Moonin flies in the sky" |
| 18 | | 00 New Year's Concert live broadcast from Opera Forum | | 00 News at 18 o' clock 15 soon the national Team kicks off |
| 19 | 00 New Year's Illusion Show amazing illusion of the illusionist zoro!! can Zoro conjure away a sports car driving at 300 km/h? in the studio, wine is | 00 Foreign Movie Time "Save The Earth!" (05 USA) Bilingual, Starring L Pot Director: S Steel C Roberts, T Grand, S Baker 2005 Academy award-winning film | 00 Parlor Trick 2009 Giant Swing By Stobe, fire drum by Soh takata, super jump by Toast, and then, the politician Sota Yamada challenges a magic to conjure away a unicycle! MC: Kozo Yamada, Hasegawa | 30 Soccer Japan National Team Japan National Team vs Spain National Team The first national game this year is versus European champion Commentator: Sergio Echizen Live announcer: takao Marusawa Guest: Yuji aAoshima Overwhelming pass work |
| 20 | | | | |
| 21 | | | | |

Fig.9

17:00～19:00　Discover The 7 Wonders of Japan!
This time, Mr. Hiroshi traveling around the world challenges the 7 wonders of Japan. Mr. Crystal Hiroshi will be presented!!
[MC] Hiroshi Yamada
[Guest] Toru Shiroyanagi, Seiich Itanishi, Masashi Nomura, Risa Yamada
[Present] Mr. Crystal Hiroshi
[Application Method] Telephone
[Content] This time, Mr. Hiroshi challenges the 7 wonders of Japan.
The mummy excavated from the ohgawara mound has arelationship with egypt?!
Unbelievable! The limestone cave at the base of Mt. Takata is connected to an underground lake.

| Reserve Video Recording | Select Channel | Reserve Viewing | Present |

Fig.10

Present Information
[Present] Mr. Crystal Hiroshi
[The number of winners] 10
[Application method] Telephone
[Application period] 2009/1/1 18:40-18:45
[Present image]

image

| | EPG INFORMATION | | | | | | | | | | PRIZE INFORMATION | | | | | |
|---|---|---|---|---|---|---|---|---|---|---|---|---|---|---|---|---|
| broadcast type | broadcast station name | broadcast start date and time | broadcast end date and time | program name | display format | sound format | genre | cast | director | production company | program content | present | real-time or not | application method | prize application start date and time | prize application end date and time | present category | present product name |
| Terrestrial TV | Tokyo BC | 2009/1/1 17:00 | 2009/1/1 19:00 | Discover the 7 wonders of Japan! | 1125i | stereo 2ch | quiz | HIRoshi Fujio Eiich Itanishi | Akira Ozu | Tokyo BC media | always travel around the worlD | present | real-time | telephone | 2009/1/1 17:20 | 2009/1/1 17:22 | program novelty | Mr. Crystal Hiroshi |

| broadcast type | broadcast station name | broadcast start date and time | broadcast end date and time | program name | coupled contents 1 | coupled contents 2 | real-time or not | application method | prize application start date and TIME | prize application end date and time | present category | present product name |
|---|---|---|---|---|---|---|---|---|---|---|---|---|
| Terrestrial TV | Tokyo BC | 2009/1/1 17:00 | 2009/1/1 19:00 | Discover the 7 wonders of Japan! | super zoom camera | | real-time | telephone | 2009/1/1 17:20 | 2009/1/1 17:22 | program novelty | Mr. Crystal Hiroshi |
| FM | Asian FM | 2009/1/1 18:30 | 2009/1/1 20:30 | New Year Asia | travel with Thai airways | secret of muay thai!! | real-time | internet | 2009/1/1 18:30 | 2009/1/1 20:15 | travel | 8 days and 6 nights tour to thailand |
| BS | BS World | 2009/1/1 19:00 | 2009/1/1 20:00 | World News | | | non-real-time | post mail | 2009/1/1 | 2009/1/5 | home electronics | 32-inch LCD TV |

Fig.20

| broadcast type | broadcast station name | broadcast start date and time | broadcast end date and time | program name | coupled contents 1 | contents start date and time | contents end date and time | real-time or not | application method | prize application start date and time | prize application end date and time | present category | present product namE | coupled contents 1 |
|---|---|---|---|---|---|---|---|---|---|---|---|---|---|---|
| Terrestrial TV | Tokyo BC | 2009/1/1 17:00 | 2009/1/1 19:00 | Discover the 7 wonders of Japan! | super zoom camera | 2009/1/1 17:00 | 2009/1/1 18:00 | real-time | telephone | 2009/1/1 17:20 | 2009/1/1 17:22 | program novelty | Mr. Crystal Hiroshi | |
| FM | Asian FM | 2009/1/1 18:30 | 2009/1/1 20:30 | New Year Asia | travel with Thai airways | 2009/1/1 18:30 | 2009/1/1 20:30 | real-time | internet | 2009/1/1 18:30 | 2009/1/1 20:15 | travel | 8 days and 6 nights tour to Thailand | |
| BS | BS World | 2009/1/1 19:00 | 2009/1/1 20:00 | World News | | 2009/1/1 19:00 | 2009/1/1 20:00 | non-real-time | post mail | 2009/1/1 | 2009/1/5 | home electronics | 32-inch LCD TV | |

Fig.21

17:00~19:00   Discover the 7 wonders of Japan!
This time, Mr. Hiroshi traveling around the world challenges the 7 wonders of Japan. Mr. Crystal Hiroshi will be presented!!
[MC] Hiroshi Yamada
[Guest] Toru Shiroyanagi, Seiich Itanishi, Masashi Nomura, Risa Yamada
[Present] Mr. Crystal Hiroshi
[Application method] telephone
[Content] This time, Mr. Hiroshi challenges the 7 wonders of Japan. The mummy excavated from the Ohgawara mound has a relationship with Egypt?!
Unbelievable! the limestone cave at the base of Mt. Takata Is connected to an underground lake.

| Reserve Video Recording | Select Channel | Reserve Viewing | Present |

Fig.34

17:00~19:00   Discover the 7 wonders of Japan!
This time, Mr. Hiroshi traveling around the world challenges the 7 wonders of Japan. Mr. Crystal Hiroshi will be presented!!
[MC] Hiroshi Yamada
[Guest] Toru Shiroyanagi, Seiich Itanishi, Masashi Nomura, Risa Yamada
[Present] Mr. Crystal Hiroshi
[Application method] telephone
[Content] This time, Mr. Hiroshi challenges the 7 wonders of Japan. The mummy excavated from the Ohgawara mound has a relationship with Egypt?!
Unbelievable! The limestone cave at the base of Mt. Takata Is connected to an underground lake.

This program includes a real-time prize.

| Reserve Video Recording | Select Channel | Reserve Viewing | Present |

Fig.35

| | Asia TV 41 | TV Sunset 51 | Tokyo BC 61 | Business TV 71 |
|---|---|---|---|---|
| 17 | 00 Music Airport Stop, Blt, Mr. Robinson, Ayumi Sawada, Self-esteem, Typhoon, Koji Fukuda, Earl Grey, beckoning Cat, And Others Mc: Sabori | 00 Fire Defense Agency 24 o'clock fire station fighting against fire documentary | | 00 Moonin Special "Moonin and a fairy in the valley" "Moonin flies in the sky" |
| 18 | | 00 New Year's Concert live broadcast from Opera Forum | | 00 News at 18 o' clock 15 soon the national Team kicks off |
| 19 | 00 New Year's Illusion Show amazing illusion of the illusionist zoro!! can Zoro conjure away a sports car driving at 300 km/h? in the studio, wine is | 00 Foreign Movie Time "Save The Earth!" (05 USA) Bilingual, Starring L Pot Director: S Steel C Roberts, T Grand, S Baker 2005 Academy award-winning film | 00 Parlor Trick 2009 Giant Swing By Stobe, fire drum by Soh takata, super jump by Toast, and then, the politician Sota Yamada challenges a magic to conjure away a unicycle! MC: Kozo Yamada, Hasegawa | 30 Soccer Japan National Team Japan National Team vs Spain National Team The first national game this year is versus European champion Commentator: Sergio Echizen Live announcer: takao Marusawa Guest: Yuji aAoshima Overwhelming pass work |
| 20 | | | | |
| 21 | | | | |

Terrestrial Digital
BS
CS
FM
AM

Thu, 1 January 2009 17:00

Red = Reserve Video Recording  Blue = Select Channel  Yellow = Reserve Viewing  Green = Present
Decision = Program Details

Fig.36

| | | | Thu, 1 January 2009 17:00 | |
|---|---|---|---|---|
| | Asia TV 41 | TV Sunset 51 | Tokyo BC 61 | Business TV 71 |
| 17 | 00 Music Airport Stop, Blt, Mr. Robinson, Ayumi Sawada, Self-esteem, Typhoon, Koji Fukuda, Earl Grey, beckoning Cat, And Others Mc: Sabori | 00 Fire Defense Agency 24 o'clock fire station fighting against fire documentary | | 00 Moonin Special "Moonin and a fairy in the valley" "Moonin flies in the sky" |
| 18 | | 00 New Year's Concert live broadcast from Opera Forum | | 00 News at 18 o' clock 15 soon the national Team kicks off |
| 19 | 00 New Year's Illusion Show amazing illusion of the illusionist zoro!! can Zoro conjure away a sports car driving at 300 km/h? in the studio, wine is | 00 Foreign Movie Time "Save The Earth!" (05 USA) Bilingual, Starring L Pot Director: S Steel C Roberts, T Grand, S Baker 2005 Academy award-w | 00 Parlor Trick 2009 Giant Swing By Stobe, fire drum by Soh takata, super jump by Toast, and then, the politician Sota Yamada challenges a magic to conjure away a unicycle! MC: Kozo Yamada | 30 Soccer Japan National Team Japan National Team vs Spain National Team The first national game this year is versus European champion Commentator: Sergio Echizen Live announcer: takao Marusawa Guest: Yuji aAoshima Overwhelming pass work |
| 20 | | | | |
| 21 | | | | |

This Program Includes a Real-time Prize.

Terrestrial Digital
BS
CS
FM
AM

Fig.37

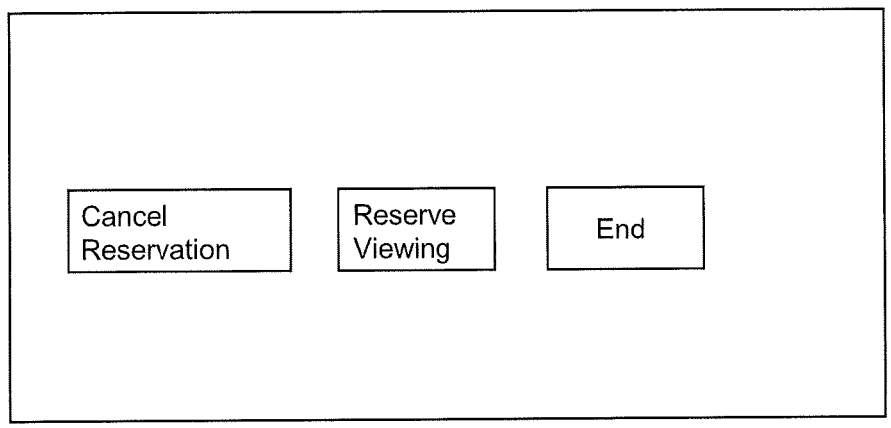
Fig.41
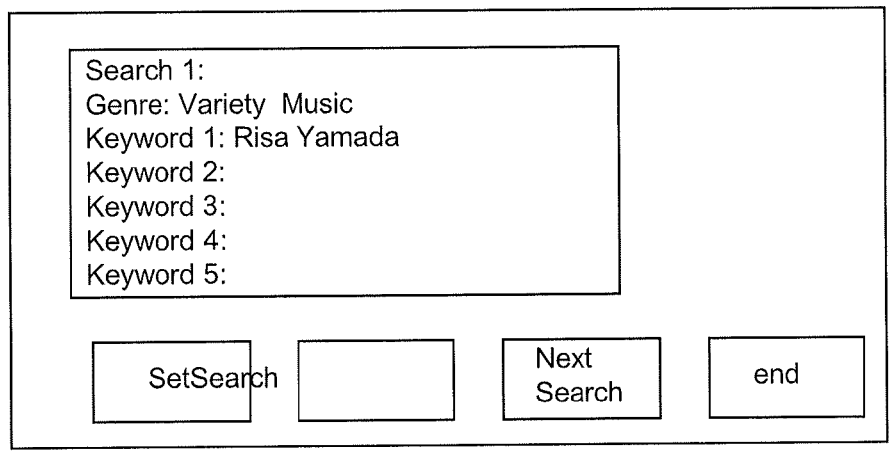
Fig.42
| Date | Time | Program Name | Present | Reservation |
|---|---|---|---|---|
| January 1 | 17:00 -19:00 | Discover the 7 wonders of Japan! | ○ | — |
| January 4 | 21:00 -23:30 | Zoo -1 Grand Prix | — | — |
| January 6 | 10:00 -11:45 | Sunday Music | — | ○ |
Red = details
Blue = reserve video recording
Yellow = reserve viewing
Fig.43

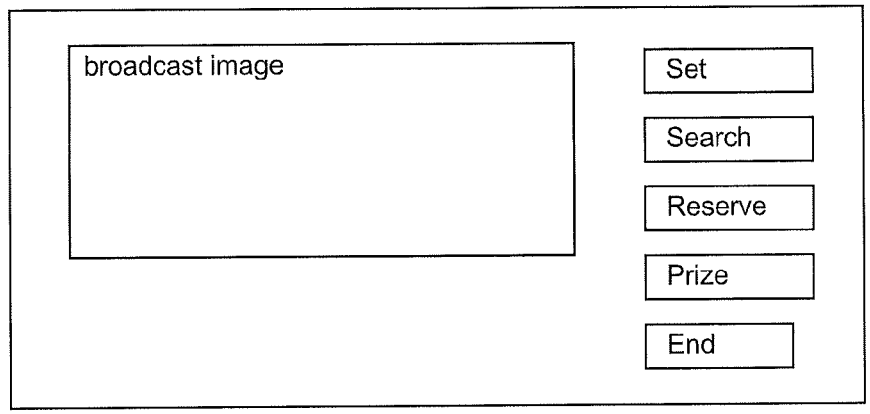
Fig.47
| Date | Time | Program Name | Product Name |
|---|---|---|---|
| January 1 | 17:00 - 19:00 | Discover the 7 wonders of Japan! | Mr. Crystal Hiroshi |
| January 1 | 18:30 - 20:30 | New Year Asia 8 days and 6 nights tour to Thailand | |
| January 1 | 19:00 - 20:00 | World News | 32-inch LCD TV |
Red = details
Blue = reserve video recording
Yellow = reserve viewing
Fig.48
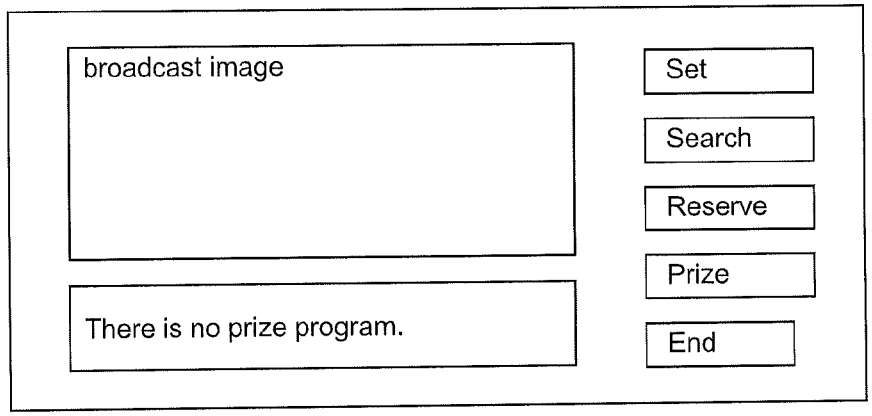
Fig.49

INFORMATION RECEPTION APPARATUS, INFORMATION RECEPTION METHOD, COMPUTER PROGRAM FOR INFORMATION RECEPTION, AND INFORMATION DISTRIBUTION APPARATUS

CROSS-REFERENCE TO RELATED APPLICATION

The present application is a divisional application of the U.S. patent application Ser. No. 13/219,137, filed on Aug. 26, 2011, the entire contents of which are incorporated herein by referenced and priority to which is hereby claimed. Application No. 13/219,137 is a continuation-in-part application of PCT Application No. PCT/JP2010/001338, which relates to and claims priorities from Japanese Patent Applications No. 2009-046915 filed on Feb. 27, 2009; No. 2009-047059 filed on Feb. 27, 2009; No. 2009-047139 filed on Feb. 27, 2009; No. 2009-047394 filed on Feb. 27, 2009; No. 2009-047405 filed on Feb. 27, 2009; No. 2009-047407 filed on Feb. 27, 2009; and No. 2009-053907 filed on Mar. 6, 2009. The PCT and Japanese applications are incorporated in the present application by reference.

BACKGROUND OF THE INVENTION

1. Field of the Invention

The present invention relates to an information reception apparatus, an information reception method, a computer program for information reception, and an information distribution apparatus.

2. Description of Related Art

In recent years, in digital broadcasting such as terrestrial digital broadcasting and BS (Broadcasting satellite), an electronic program guide (EPG) (hereinafter, also simply referred to as "EPG") showing contents of programs scheduled to be broadcast is known. Various proposals are provided to enhance the convenience of viewers by using the EPG information. For example, it is proposed that, by using the EPG information, only broadcasting data linked to a program to be provided is reserved to be printed or broadcasting data is reserved to be printed separately and independently from moving image data of programs (see JP 2007-235639 A (Abstract, paragraph [0013] and the like)).

It is proposed that, by using the EPG information, when a program is viewed with a vehicle-mounted digital broadcast reception apparatus, a specific electronic program guide grouped for each viewer is displayed and information according to reception sensitivity is reflected in the specific electronic program guide (see JP 2007-89220 A (Abstract, paragraph [0007] and the like)).

An apparatus, such as ADMS (TV-Asahi Data And Multimedia Service)-EPG and iEPG, is known which provides EPG information via the Internet, and there is also a proposal related to a control when the EPG information received via the Internet and the EPG information received via a broadcast signal are received (see JP 2008-252447 A (Abstract and the like)).

SUMMARY OF THE INVENTION

However, in the techniques disclosed in JP 2007-235639 A, JP 2007-89220 A, and JP 2008-252447 A, for example, if there is an announcement of prize or present in a program scheduled to be broadcast, the viewer cannot know the fact from the EPG information. If there is an announcement of prize in a program, the viewer cannot know information, such as the application period of the prize is only within the airtime of the program and has high real-time characteristics, and when is the deadline of the application. When a user reserves a program for video recording, the user who tries to reserve the program cannot know information about presence or absence of a prize in the program which the user tries to reserve and further information about the application period for the prize when the prize is present. Therefore, when the user views the recorded program later, if the user wants to apply for the prize, there may be a case in which the user cannot apply for the prize because the application period has passed. In addition, while a user views a program with prize, the user cannot easily apply for the prize.

Therefore, in view of the above problems, an object of the present invention is to provide an information reception apparatus, an information reception method, a computer program for information reception, and an information distribution apparatus by which a user can easily grasp information announced in a program from the electronic program guide.

According to a first aspect of the present invention, an information reception apparatus is provided comprising an electronic program information acquisition unit which receives electronic program information, an announcement information acquisition unit which acquires information announced in a program from information included in the electronic program information acquired by the electronic program information acquisition unit or from information transmitted along with the electronic program information, and an announcement information output unit which outputs the electronic program information and information indicating the presence or absence of the announcement information based on the information acquired by the announcement information acquisition unit, in which the announcement information is prize information, and when an application deadline of the prize information is set within the airtime of the program, the announcement information output unit differentiates the display of a program field including the prize information from the display of other program fields.

In addition to the configuration described above, it is preferred that the announcement information output unit differentiates the display of a program field including the announcement information from the display of other program fields that do not include announcement information when outputting the electronic program information.

In addition to the configuration described above, it is preferred that the announcement information acquisition unit acquires information indicating an application method of the prize information from information included in the electronic program information acquired by the electronic program information acquisition unit or from information transmitted along with the electronic program information, and the announcement information output unit outputs the information indicating the application method when outputting the electronic program information.

According to a second aspect of the present invention, an information reception method is provided including an electronic program information acquisition step of receiving electronic program information, an announcement information acquisition step of acquiring information announced in a program from information included in the electronic program information acquired by the electronic program information acquisition step or from information transmitted along with the electronic program information, and an announcement information output step of outputting the electronic program information and information indicating the presence or absence of the announcement information on the basis of the information acquired by the announcement information acquisition step. The announcement information is prize information. In the announcement information output step, when an application deadline of the prize information is set within the airtime of the program, the display of a program field including the prize information is differentiated from the display of other program fields.

According to a third aspect of the present invention, a computer program for information reception is provided to cause a computer to function as an electronic program information acquisition unit which acquires electronic program information, an announcement information acquisition unit which acquires information announced in a program from information included in the electronic program information acquired by the electronic program information acquisition unit or from information transmitted along with the electronic program information, and an announcement information output unit which outputs the electronic program information and information indicating the presence or absence of the announcement information on the basis of the information acquired by the announcement information acquisition unit, wherein the announcement information is prize information, and when an application deadline of the prize information is set within the airtime of the program, the announcement information output unit differentiates the display of a program field including the prize information from the display of other program fields.

According to a fourth aspect of the present invention, an information distribution apparatus which provides prize information at least either one of the electronic program information and information announced in a program included in the electronic program information to the information reception apparatus described above is provided.

According to another aspect of the present invention, an information reception apparatus is provided comprising an electronic program information acquisition unit which acquires electronic program information, an announcement information acquisition unit which acquires information announced in a program from information included in the electronic program information acquired by the electronic program information acquisition unit or from data transmitted along with the electronic program information, and a recording reservation reception unit which, when reserving recording of a program, displays whether or not the program to be reserved for recording includes the announced information on the basis of the information acquired by the announcement information acquisition unit, in which the announced information is prize information, and the recording reservation reception unit notifies of a program whose application deadline is within the airtime of the program among candidates to be reserved for recording in the electronic program information.

It is preferred to comprise a search unit which searches the electronic program information satisfying a predetermined condition to be a candidate to be reserved for recording before reserving recording.

According to another aspect of the present invention, an information reception method is provided including an electronic program information acquisition step of acquiring electronic program information, an announcement information acquisition step of acquiring information announced in a program from information included in the electronic program information acquired by the electronic program information acquisition step or from data transmitted along with the electronic program information, and a recording reservation reception step of, when reserving recording of a program, displaying whether or not the program to be reserved for recording includes the announced information on the basis of the information acquired by a process of the announcement information acquisition step is provided, wherein the announced information is prize information, and in the recording reservation reception step, a program whose application deadline is within the airtime of the program is notified among candidates to be reserved for recording in the electronic program information.

According to another aspect of the present invention, a computer program for information reception is provided to cause a computer to function as an electronic program information acquisition unit which acquires electronic program information, an announcement information acquisition unit which acquires information announced in a program from information included in the electronic program information acquired by the electronic program information acquisition unit or from data transmitted along with the electronic program information, and a recording reservation reception unit which, when reserving recording of a program, displays whether or not the program to be reserved for recording includes the announced information on the basis of the information acquired by the announcement information acquisition unit, wherein the announced information is prize information, and the recording reservation reception unit notifies of a program whose application deadline is within the airtime of the program among candidates to be reserved for recording in the electronic program information.

According to another aspect of the present invention, an information distribution apparatus is provided to provide prize information as information announced in a program included in at least either one of the electronic program information and the electronic program information to the information reception apparatus described above.

According to another aspect of the present invention, an information reception apparatus is provided comprising an electronic program information acquisition unit which acquires electronic program information, an announcement information acquisition unit which acquires information announced in a program from information included in the electronic program information acquired by the electronic program information acquisition unit or from data transmitted along with the electronic program information, and an announcement information output unit which selects and outputs the electronic program information including information of the program related to the announced information acquired by the announcement information acquisition unit when outputting the electronic program information, in which the announcement information output unit outputs content of the electronic program information when the number of the electronic program information pieces selected as the electronic program information pieces including the program related to the announced information is smaller than or equal to a predetermined number, and outputs titles of the electronic program information pieces when the number is greater than the predetermined number.

According to another aspect of the present invention, an information reception apparatus is provided comprising an electronic program information acquisition unit which acquires electronic program information, an announcement information acquisition unit which acquires information announced in a program from information included in the electronic program information acquired by the electronic program information acquisition unit or from data transmitted along with the electronic program information, and an announcement information output unit which selects and outputs the electronic program information including information of the program related to the announced information acquired by the announcement information acquisition unit when outputting the electronic program information, in which the announcement information output unit selects the channel of the broadcast station broadcasting the program when the number of the electronic program information pieces selected as the electronic program information pieces including the program related to the announced information is one, and outputs the electronic program information when the number is two or more.

The announcement information output unit may output content of the electronic program information when the number of the electronic program information pieces selected as the electronic program information pieces including the program related to the announced information is smaller than or equal to a predetermined number, and output titles of the electronic program information pieces when the number is greater than the predetermined number.

The announcement information output unit may select and output the electronic program information including information of the program related to the announced information effective in a predetermined period of time with respect to the time when the power is turned on.

The announcement information output unit may select and output the electronic program information including information of the program related to the announced information satisfying a predetermined condition.

It is preferred that the announced information is prize information and the predetermined condition is a condition for specifying information among a plurality of information pieces included in the announced information.

According to another aspect of the present invention, an information reception method is provided including an electronic program information acquisition step of acquiring electronic program information, an announcement information acquisition step of acquiring information announced in a program from information included in the electronic program information acquired by the electronic program information acquisition step or from data transmitted along with the electronic program information, and an announcement information output step of selecting and outputting the electronic program information including information of the program related to the announced information acquired by a process of the announcement information acquisition step when outputting the electronic program information, wherein, in the announcement information output step, content of the electronic program information is outputted when the number of the electronic program information pieces selected as the electronic program information pieces including the program related to the announced information is smaller than or equal to a predetermined number, and titles of the electronic program information pieces are outputted when the number is greater than the predetermined number.

According to another aspect of the present invention, an information reception method is provided including an electronic program information acquisition step of acquiring electronic program information, an announcement information acquisition step of acquiring information announced in a program from information included in the electronic program information acquired by the electronic program information acquisition step or from data transmitted along with the electronic program information, and an announcement information output step of selecting and outputting the electronic program information including information of the program related to the announced information acquired by a process of the announcement information acquisition step when outputting the electronic program information, wherein, in the announcement information output step, the channel of the broadcast station broadcasting the program is selected when the number of the electronic program information pieces selected as the electronic program information pieces including the program related to the announced information is one, and the electronic program information is outputted when the number is two or more.

According to another aspect of the present invention, a computer program for information reception is provided to cause a computer to function as an electronic program information acquisition unit which acquires electronic program information, an announcement information acquisition unit which acquires information announced in a program from information included in the electronic program information acquired by the electronic program information acquisition unit or from data transmitted along with the electronic program information, and an announcement information output unit which selects and outputs the electronic program information including information of the program related to the announced information acquired by the announcement information acquisition unit when outputting the electronic program information, wherein the announcement information output unit selects the channel of the broadcast station broadcasting the program when the number of the electronic program information pieces selected as the electronic program information pieces including the program related to the announced information is one, and outputs the electronic program information when the number is two or more.

According to another aspect of the present invention, an information distribution apparatus is provided to provide prize information as at least either one of the electronic program information and information announced in a program included in the electronic program information to the information reception apparatus described above.

According to the present invention, it is possible to provide an information reception apparatus, an information reception method, a computer program for information reception, and an information distribution apparatus by which a user can easily grasp information announced in a program from the electronic program guide.

BRIEF DESCRIPTION OF THE DRAWINGS

Specific embodiments of the present invention will now be described, by way of example only, with reference to the accompanying drawings in which:

FIG. 4 is a diagram showing an example of a data string of prize information transmitted by the broadcast transmission apparatus shown in FIG. 2;

FIG. 9 is a diagram showing an example 1 of a prize information display screen displayed on the display apparatus shown in FIG. 3;

FIG. 10 is a diagram showing an example 2 of the prize information display screen displayed on the display apparatus shown in FIG. 3;

FIG. 11 is a diagram showing an example 3 of the prize information display screen displayed on the display apparatus shown in FIG. 3;

FIG. 17 is a diagram showing an example of a data string of EPG information transmitted from the broadcast station server shown in FIG. 14;

FIG. 20 is a diagram showing an example of a data string distributed from a broadcast station server which is a modified example of the exemplary embodiment 2 of the present invention;

FIG. 21 is a diagram showing an example of a data string distributed from the broadcast station server of the exemplary embodiment 2 of the present invention;

FIG. 34 is a diagram showing a screen display example 2 displayed on the display apparatus of the exemplary embodiment 3 of the present invention;

FIG. 35 is a diagram showing a screen display example 3 displayed on the display apparatus of the exemplary embodiment 3 of the present invention;

FIG. 36 is a diagram showing a screen display example 4 displayed on the display apparatus of the exemplary embodiment 3 of the present invention;

FIG. 37 is a diagram showing a screen display example 5 displayed on the display apparatus of the exemplary embodiment 3 of the present invention;

FIG. 41 is a diagram showing the screen display example 7 displayed on the display apparatus of the exemplary embodiment 3 of the present invention;

FIG. 42 is a diagram showing a screen display example 8 displayed on the display apparatus of the exemplary embodiment 3 of the present invention;

FIG. 43 is a diagram showing the screen display example 8 displayed on the display apparatus of the exemplary embodiment 3 of the present invention;

FIG. 47 is a diagram showing a screen display example 1 displayed on a display apparatus according to the exemplary embodiment 4 of the present invention;

FIG. 48 is a diagram showing a screen display example 1 displayed on the display apparatus according to the exemplary embodiment 4 of the present invention;

FIG. 49 is a diagram showing a screen display example 1 displayed on the display apparatus according to the exemplary embodiment 4 of the present invention;

DETAILED DESCRIPTION OF THE PREFERRED EMBODIMENTS

Figure 1:
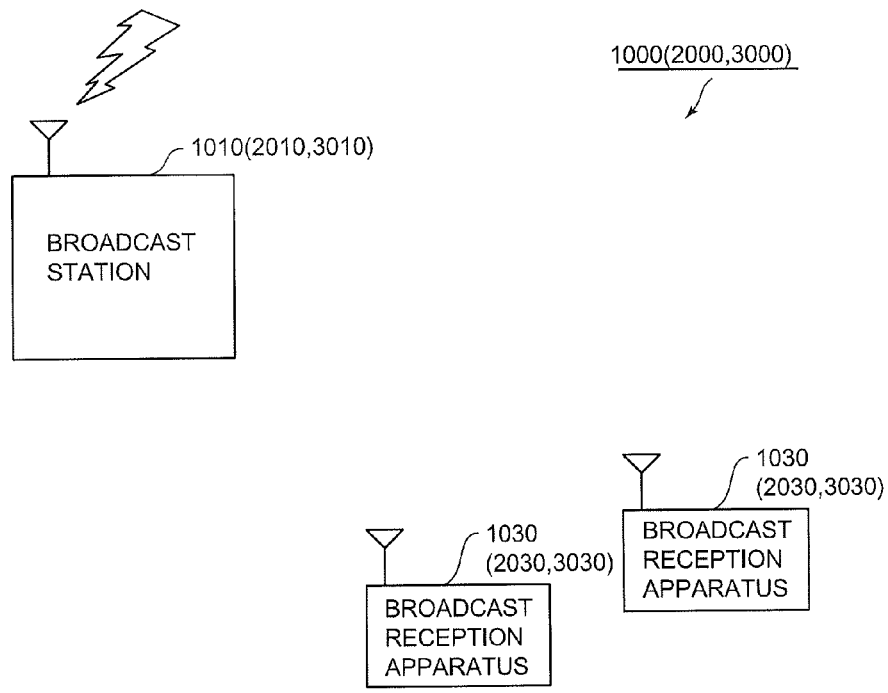
FIG. 1 is a diagram showing an entire configuration of an information distribution system according to an exemplary embodiment 1 of the present invention.

Hereinafter, exemplary embodiments 1 to 4 of the present invention will be described with reference to the drawings. First, the characteristics of each exemplary embodiment of the present invention will be briefly described. The exemplary embodiment 1 of the present invention is characterized by display processing of a broadcast reception apparatus when a program with prize is notified. Although the exemplary embodiment 2 is different from the exemplary embodiment 1 in a point that EPG information and the like are transmitted via an IP communication network, the exemplary embodiment 2 is also characterized by display processing of a broadcast reception apparatus when a program with prize is notified. The exemplary embodiment 3 is characterized by recording reservation processing of a broadcast reception apparatus when a program with prize is notified. The exemplary embodiment 4 is characterized by a process for searching a program with prize after the program with prize is notified.

An information distribution system according to the exemplary embodiment 1 of the present invention will be described. The exemplary embodiment 1 according to the present invention is characterized by the display processing of the broadcast reception apparatus when a program with prize is notified. FIG. 1 is a diagram showing an entire configuration of an information distribution system 1000 according to the exemplary embodiment 1 of the present invention. As shown in FIG. 1, the information distribution system 1000 has a broadcast station 1010 and broadcast reception apparatuses 1030. Although FIG. 1 shows one broadcast station 1010 and two broadcast reception apparatuses 1030, the information distribution system 1000 may have a plurality of broadcast stations 1010 and three or more broadcast reception apparatuses 1030.

The broadcast station 1010 transmits contents of programs as stream data according to a broadcast schedule. The broadcast station 1010 has a broadcast transmission apparatus 1011 (see FIG. 2) capable of superimposing a data broadcast and EPG (Electronic Program Guide) information on a broadcast signal and transmitting the broadcast signal. The broadcast reception apparatus 1030 receives the broadcast signal from the broadcast transmission apparatus 1011 of the broadcast station 1010, and outputs video and sound of a received program and the EPG information.

Figure 2:
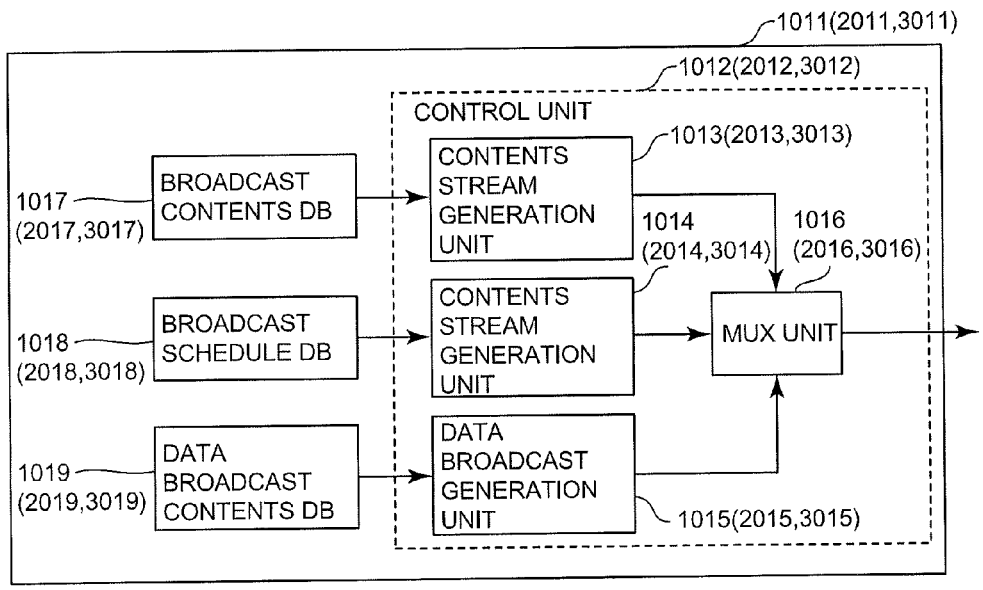
FIG. 2 is a block diagram showing a configuration of a broadcast transmission apparatus included in a broadcast station shown in FIG. 1.

FIG. 2 is a block diagram showing a configuration of the broadcast transmission apparatus 1011 included in the broadcast station 1010 shown in FIG. 1. As shown in FIG. 2, the broadcast transmission apparatus 1011 has a control unit 1012, a contents stream generation unit 1013, an EPG information generation unit 1014, a data broadcast generation unit 1015, a MUX (MUltipleXer) unit 1016, a broadcast contents DB 1017, a broadcast schedule DB 1018, a data broadcast contents DB 1019 as main constituent elements. The broadcast transmission apparatus 1011 is an example of a broadcast distribution apparatus in the claims.

Here, information processing implemented by functions of the contents stream generation unit 1013, the EPG information generation unit 1014, the data broadcast generation unit 1015, and the MUX unit 1016 mentioned above is implemented by the control unit 1012 which controls the entire broadcast transmission apparatus 1011 by cooperating with hardware resources. Specifically, the control unit 1012 includes a CPU and the like, which are hardware resources not shown in the drawings, and implements the information processing by the CPU which reads various programs stored in a ROM not shown in the drawings, stores the programs in a RAM not shown in the drawings, and executes the programs cooperating with the hardware resources. The broadcast contents DB 1017, the broadcast schedule DB 1018, the data broadcast contents DB 1019 mentioned above are stored in a storage unit not shown in the drawings, and the storage unit includes, for example, an HDD (Hard Disk Drive), a flash memory, or the like.

The contents stream generation unit 1013 refers to the broadcast contents DB 1017 to generate broadcast contents. In the description of the present exemplary embodiment, it is assumed that the broadcast contents are encoded and multiplexed compliant with MPEG2-TS (Motion Photographic Coding Experts Groupe-2 Transport Stream) standard. In the MPEG2-TS standard, video and sound of transmitted contents are generated as an encoded ES (Elementary Stream), and then generated PESs (Packetized Elementary Streams) by packetizing the ES into each significant unit. Further, TS (Transport Stream) packets obtained by dividing the PES are transmitted from the broadcast station 1010.

A 13-bit packet identifier called PID is added to a header of each TS packet. Thereby each TS packet can be classified into video data, sound data, control data, or the like of the broadcast contents.

Here, the control data is data called SI/PSI (Service Information/Program Specific Information). The SI of the SI/PSI includes information necessary to generate the EPG information, and the PSI is control data including information to perform basic controls. Encryption processing (hereinafter referred to as "scramble processing") for preventing viewing that is against the intention of the broadcast station 1010 may be performed on the TS packet. Here, for example, Multi2 may be used as a method of the scramble processing. The Multi2 is one of methods for encrypting digital data, and widely used in BS digital broadcasting, terrestrial digital broadcasting, and the like. The broadcast contents DB 1017 stores contents data that will be a source of the broadcast contents described above.

The EPG information generation unit 1014 has a function to generate EPG information by referring to the broadcast schedule DB 1018 by the control of the control unit 1012. The broadcast schedule DB 1018 stores broadcast schedule information of programs that will be broadcast by the broadcast station 1010. The programs stored in the broadcast schedule DB 1018 include presence or absence of prize information. The EPG information generation unit 1014 can generate EPG information including presence or absence of prize information for the programs stored in the broadcast schedule DB 1018. The broadcast schedule DB 1018 may store broadcast schedule information of programs that will be broadcast by other broadcast stations 1010 and presence or absence of prize information of the programs.

The data broadcast generation unit 1015 generates, for example, a data broadcast of information related to weather forecast and a program from the data broadcast contents DB 1019. In the description of the present exemplary embodiment, it is assumed that the data broadcast is encoded and multiplexed compliant with MPEG2-TS standard in the same manner as the broadcast contents. In addition to the data broadcast of information related to weather forecast and a program, the data broadcast contents DB 1019 may store URL (Uniform Resource Locator) information that is related to the program and provided by the broadcast station 1010 and search query information that can be used in a P2P (Peer to Peer) method. The data broadcast generation unit 1015 combines the above information pieces together and provides them to the MUX unit 1016.

The MUX unit 1016 generates broadcast data in which the broadcast contents generated by the contents stream generation unit 1013 referring to the broadcast contents DB 1017, the EPG information generated by the EPG information generation unit 1014 referring to the broadcast schedule DB 1018, and the broadcast data generated by the broadcast generation unit 1015 referring to the data broadcast contents DB 1019 are multiplexed. Then, the broadcast data is transmitted from an antenna of the broadcast station 1010 as a broadcast signal.

Figure 3:
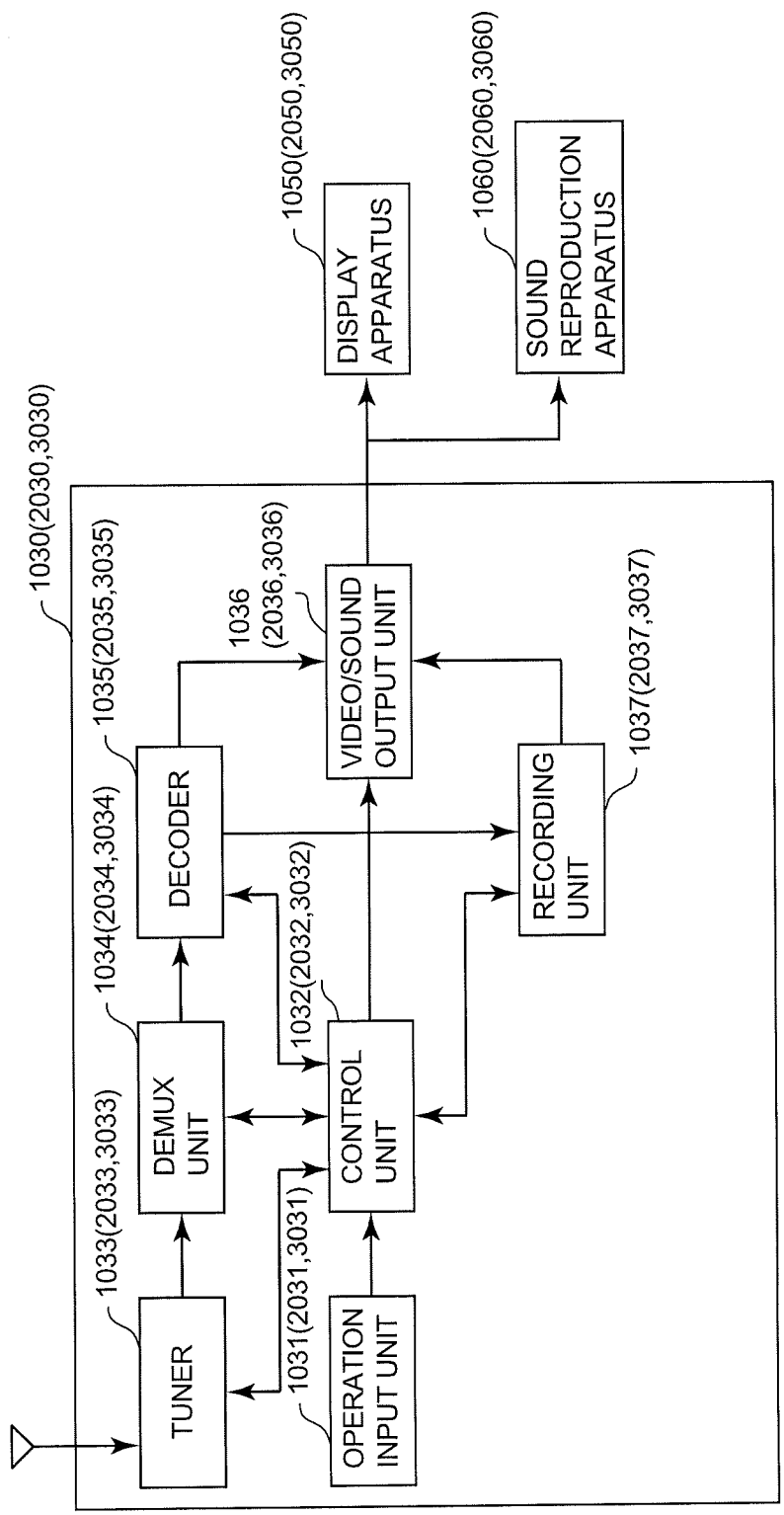
FIG. 3 is a block diagram showing an entire configuration of a broadcast reception apparatus shown in FIG. 1.

The broadcast reception apparatus 1030 will be described. FIG. 3 is a diagram showing a block configuration of the broadcast reception apparatus 1030 shown in FIG. 1. The broadcast reception apparatus 1030 is, for example, a terminal for receiving TV broadcasts or radio broadcasts, and may be a fixed reception terminal as well as a mobile terminal that can be carried. The broadcast reception apparatus 1030 outputs information received from the broadcast station 1010 to a display apparatus 1050 and a sound reproduction apparatus 1060. The broadcast reception apparatus 1030 according to the present exemplary embodiment is an individual apparatus separated from the display apparatus 1050 and the sound reproduction apparatus 1060. However, it is not limited to this, and the broadcast reception apparatus 1030, the display apparatus 1050, and the sound reproduction apparatus 1060 may be accommodated in the same housing. For example, the broadcast reception apparatus 1030 may be a television set. A configuration is possible in which the broadcast reception apparatus 1030 and the display apparatus 1050 are accommodated in the same housing and only the sound reproduction apparatus 1060 is accommodated in another housing. That is to say, it is not limited in what a apparatus the broadcast reception apparatus 1030, the display apparatus 1050, and the sound reproduction apparatus 1060 are provided. The broadcast reception apparatus 1030 may have a video recording function and a sound recording function.

As shown in FIG. 3, the broadcast reception apparatus 1030 has an operation input unit 1031, a control unit 1032, a tuner 1033, a DEMUX (DEMUltipleXer) unit 1034, a decoder 1035, a video/sound output unit 1036, and a recording unit 1037 as main constituent elements. Here, the control unit 1032 includes a CPU and the like, which are hardware resources not shown in the drawings, and can implement information processing performed by each unit of the broadcast reception apparatus 1030 by reading various programs stored in the recording unit 1037 and a ROM, storing the programs in a RAM, and executing various arithmetic processing cooperating with the hardware resources.

The operation input unit 1031 includes, for example, a remote control or a touch panel. The operation input unit 1031 may have a voice input function. The operation input unit 1031 receives an operation input from a user and transmits user's instruction (for example, EPG screen display request, prize information display request, station selection change processing request, or the like described below) to the control unit 1032. The user can perform operation input to the broadcast reception apparatus 1030 by operating the operation input unit 1031. The operation input to the broadcast reception apparatus 1030 may be inputted into the operation input unit 1031 provided in the broadcast reception apparatus 1030 via a wireless signal (operation signal) such as infrared. The operation signal inputted into the operation input unit 1031 is provided to the control unit 1032 via a bus not shown in the drawings. The operation input unit 1031 is an example functioning as an electronic program information acquisition request unit and an announcement information acquisition request unit in the claims.

The control unit 1032 is a central processing unit which includes a CPU and the like not shown in the drawings, analyzes the operation signal inputted into the operation input unit 1031, and controls all or part of units included in the broadcast reception apparatus 1030. For example, when the user inputs a channel selection instruction by using the operation input unit 1031, a signal indicating the channel selection instruction is inputted into the control unit 1032 via the operation input unit 1031 and a bus not shown in the drawings. Thereby, the control unit 1032 transmits the user's channel selection instruction to the tuner 1033 via a bus not shown in the drawings. The control unit 1032 is an example functioning as a part of an electronic program information acquisition unit, an announcement information acquisition unit, and an announcement information output unit in the claims.

The tuner 1033 receives a broadcast signal from the broadcast station 1010, demodulates a received RF (Radio Frequency) signal, performs error correction, and outputs a TS signal including TS packets to the DEMUX unit 1034. The tuner unit 1033 is an example functioning as a part of the electronic program information acquisition unit and a part of the announcement information acquisition unit in the claims.

Although FIG. 3 shows only one tuner 1033 to receive terrestrial digital broadcasting, an analog tuner 1033 for analog broadcasting may be provided to receive analog broadcasting, and thus two tuners 1033 may be provided. The broadcast reception apparatus 1030 may include a descrambling unit which descrambles a signal into a normal signal when a scrambled TS signal is transmitted. In this case, the descrambling unit may provide a TS signal including descrambled TS packets to the DEMUX unit 1034.

The DEMUX unit 1034 performs processing to divide the TS signal including TS packets outputted from the tuner 1033 (that is, broadcast data in which a plurality of streams such as video and sound are multiplexed by the MUX unit 1016 of the broadcast transmission apparatus 1011 on the transmission side) into stream data of video, sound, and the like and section format data of SI/PSI and the like. The data divided by the DEMUX unit 1034 are provided to the decoder 1035 according to an instruction of the control unit 1032. The DEMUX unit 1034 is an example functioning as a part of the electronic program information acquisition unit and a part of the announcement information acquisition unit in the claims.

The decoder 1035 decodes broadcast contents, EPG information, data broadcast, and the like included in the broadcast data according to an instruction of the control unit 1032. The decoder 1035 provides the decoded data to the recording unit 1037. The decoder 1035 may provide data to the recording unit 1037 as a data signal without decoding data into a video signal or a sound signal.

The decoder 1035 decodes the broadcast contents, the EPG information, the data broadcast, and the like included in the broadcast data described above and generates audio data, video data, and program data. The decoded audio data is provided to the sound reproduction apparatus 1060 described above. The sound reproduction apparatus 1060 performs D/A conversion processing on the provided audio data and outputs the audio data as a sound signal. The decoder 1035 provides the decoded video data and program data to the video/sound output unit 1036. The decoder 1035 is an example functioning as a part of the announcement information output unit in the claims.

The video/sound output unit 1036 stores the provided program data into a RAM not shown in the drawings. The video/sound output unit 1036 generates EPG information by drawing program data. Then, the video/sound output unit 1036 generates a synthesized screen in which a screen based on the EPG information is synthesized into a screen based on the video data from the decoder 1035, and outputs the synthesized screen to the display apparatus 1050. The display apparatus 1050 displays the synthesized screen. The video/sound output unit 1036 is an example functioning as a part of the announcement information output unit in the claims. The recording unit 1037 stores the data decoded by the decoder 1035 according to an instruction from the control unit 1032.

FIG. 4 is a diagram showing an example of a data string of prize information transmitted by the broadcast transmission apparatus 1011 shown in FIG. 2. As shown in FIG. 4, the data string of the prize information includes fields such as "broadcast type", "broadcast station name", "broadcast start date and time", "broadcast end date and time", "program name", "present category", "present product name", "present image", "real-time or not", "application method", "prize application start date and time", and "prize application end date and time". In a field of "broadcast type", a broadcast type such as terrestrial digital broadcasting, BS digital broadcasting, CS broadcasting, FM radio broadcasting, or AM radio broadcasting is written. In a field of "broadcast station name", a name of a broadcast station is written. In a field of "program name", a field name of the program is written. In fields of "broadcast start date and time" and "broadcast end date and time", the start time and the end time of the program are written, respectively. In a field of "real-time or not", information indicating whether or not the prize application is closed while the program is being broadcast (or, in the day on which the program is broadcast) is written. In a field of "present category", category information of the present is written. In a field of "present product name", a name of the present is written. In a field of "application method", a type of the application method of the prize (for example, post mail, telephone, or Internet) is written. In fields of "prize application start date and time" and "prize application end date and time", the application start date and time and the application close date and time of the prize are written, respectively. In the case of post mail, a date by which the post mail must be postmarked may be written. Regarding the fields of "application method" and the following fields, if there is a plurality of application methods, fields may be repeatedly added for each application method.

When adding the above-described prize information to the EPG information, it is preferred to insert the prize information into data portion of program guide format and/or data portion for explaining an individual program for displaying TYPE-H of the EPG information in SI information of terrestrial digital broadcasting defined by ARIB (Association of Radio Industries and Broadcast) or BS digital broadcasting. In a case of other broadcasting or other EPG display format (one-segment broadcasting), it is preferred to insert the prize information into data of text information for program name and description of the program. It is preferred that the prize information includes a predetermined keyword such as "prize" or "present" so that the text can be searched in the broadcast reception apparatus 1030. When describing application condition, it is preferred to describe a predetermined condition after a character string "application condition". It is preferred that the start of the application and the end of the application are described in the same format as described above.

Figure 5:
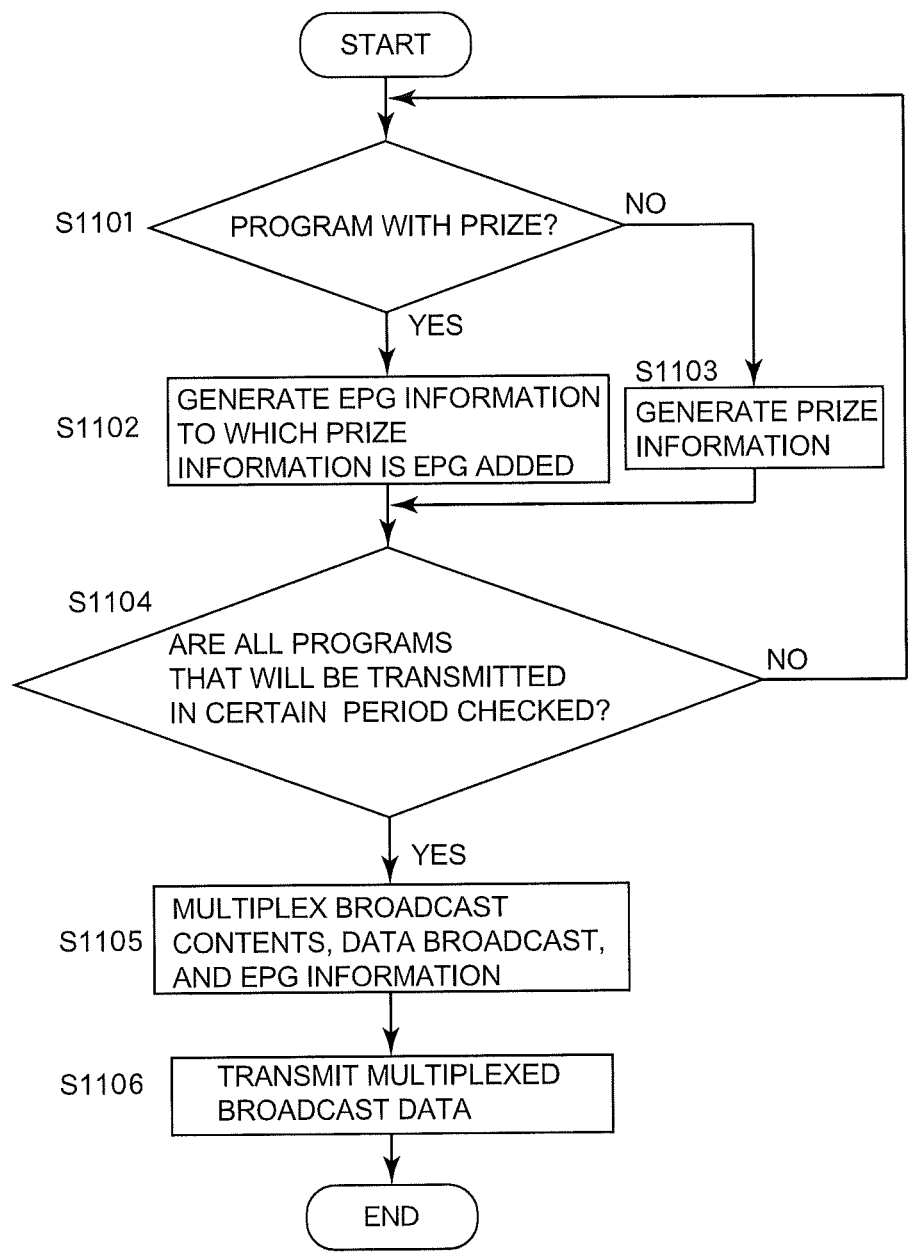
FIG. 5 is a flowchart of broadcast distribution processing of the broadcast transmission apparatus shown in FIG. 2.

FIG. 5 is a flowchart of broadcast distribution processing of the broadcast transmission apparatus 1011 shown in FIG. 2.

START: the control unit 1012 starts broadcast distribution processing when the power is turned on or a mode of the broadcast distribution is selected. After starting the broadcast distribution processing, the control unit 1012 proceeds to the process of step S1101.

Step S1101: the control unit 1012 refers to the broadcast schedule DB 1018, extracts one program from programs which will be transmitted in a certain period (for example, one week), and determines whether or not the program includes a prize. For example, if the extracted program is "Discover the 7 Wonders of Japan!" of terrestrial TV, Tokyo BC at 1/1 17:00-19:00, the control unit 1012 determines whether or not the program includes a prize. Specifically, the control unit 1012 determines whether or not the program is included in the data string of the prize information shown in FIG. 4. If the program which is extracted by referring to the broadcast schedule DB 1018 is a program that includes a prize (YES in step S1101), the control unit 1012 proceeds to the process of step S1102 and if the program is a program that includes no prize (NO in step S1101), the control unit 1012 proceeds to the process of step S1103.

Step S1102: the control unit 1012 generates EPG information including prize information. For example, if the prize information is the data string shown in FIG. 4, the control unit 1012 generates EPG information to which information items, such as present category, present product name, present image, real-time or not, application method, and prize period, are added. When the process of step S1102 is completed, the control unit 1012 proceeds to the process of step S1104.

Step S1103: the control unit 1012 generates EPG information. When the process of step S1103 is completed, the control unit 1012 proceeds to the process of step S1104.

Step S1104: the control unit 1012 determines whether or not the presence or absence of prize information has been checked for all the programs that will be transmitted in the certain period. If the presence or absence of prize information has been checked for all the programs that will be transmitted in the certain period (YES in step S1104), the control unit 1012 proceeds to the process of step S1105 and if the presence or absence of prize information has not been checked for all the programs (NO in step S1104), the control unit 1012 returns to the process of step S1101.

Step S1105: the control unit 1012 multiplexes the broadcast contents, the data broadcast, and the EPG information. When the process of step S1105 is completed, the control unit 1012 proceeds to the process of step S1106.

Step S1106: the control unit 1012 distributes broadcast data multiplexed in step S1105, and ends the broadcast distribution processing (END).

The broadcast data is distributed in this way, and thereby the presence or absence of prize information is included in the EPG information to be distributed, so that a viewer can easily know information announced in the programs. In addition, the announcement information motivates the viewer to watch a program, so the announcement information can contribute to increasing viewer ratings of the program.

Figure 6:
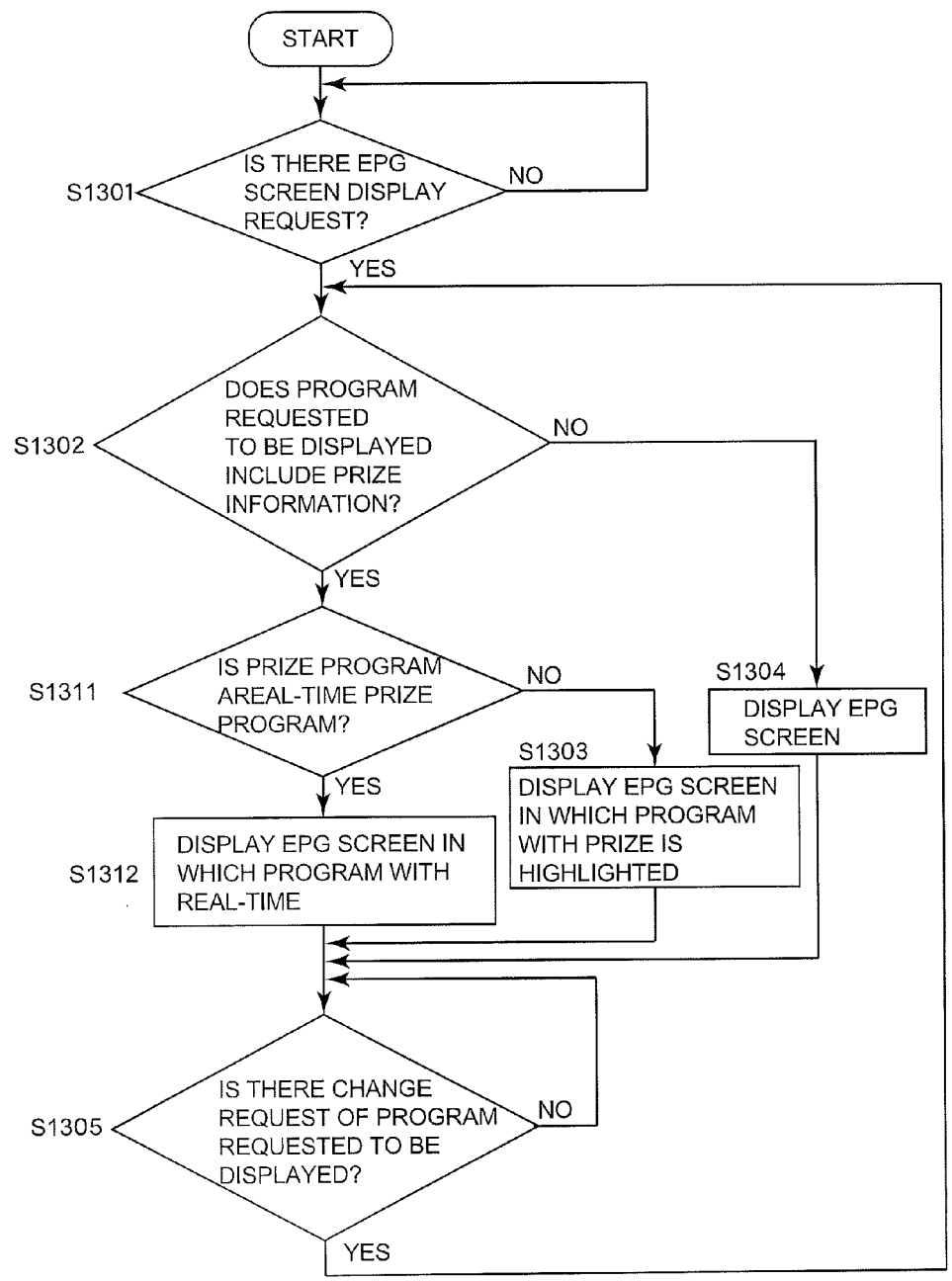
FIG. 6 is a flowchart of prize information display processing of the broadcast reception apparatus shown in FIG. 1.

FIG. 6 is a flowchart of prize information display processing 1 of the broadcast reception apparatus 1030 shown in FIG. 1.

START: the control unit 1032 starts prize information display processing when the power is turned on or a mode of the display processing is selected. After starting the prize information display processing, the control unit 1032 proceeds to the process of step S1301.

Step S1301: the control unit 1032 determines the presence or absence of an EPG screen display request. If the EPG screen display request is present (YES in step S1301), the control unit 1032 proceeds to the process of step S1302, and if the EPG screen display request is absent (NO in step S1301), the control unit 1032 repeats the determination process of step S1301. The prize information display processing may be started when the EPG screen display request is present in step S1301.

Step S1302: the control unit 1032 determines whether or not a program requested to be displayed includes prize information. Specifically, the control unit 1032 determines whether or not there is a prize program in a screen (broadcast type, broadcast station, and time slot requested to be displayed) displayed by the EPG information. If the program requested to be displayed includes prize information (YES in step S1302), the control unit 1032 proceeds to the process of step S1303, and if the program requested to be displayed includes no prize information (NO in step S1302), the control unit 1032 proceeds to the process of step S1304.

Step S1303: the control unit 1032 displays an EPG information screen in which a program with prize is highlighted. Specifically, the control unit 1032 uses an icon to indicate a program with prize or changes background color of the program on the EPG information. When the process of step S1303 is completed, the control unit 1032 proceeds to the process of step S1305.

Step S1304: the control unit 1032 displays a normal EPG information screen. When the process of step S1304 is completed, the control unit 1032 proceeds to the process of step S1305.

Step S1305: the control unit 1032 determines the presence or absence of a display program change request. Specifically, the control unit 1032 determines the presence or absence of a change of displayed time slot, a change of date, a change of the broadcast station 1010, or a change of the program. If the display program change request is present (YES in step S1305), the control unit 1032 proceeds to the process of step S1302, and if the display program change request is absent (NO in step S1305), the control unit 1032 repeats the determination process of step S1305.

Step S1311: if it is determined that the program requested to be displayed includes prize information in step S1302, the control unit 1032 determines whether or not the application period of the prize information of the program has high real-time characteristics, such as, for example, the application period is limited to the airtime of the program. A real-time application prize program indicates a program in which the prize is applied at real-time by telephone, Internet, facsimile, and the like. Examples of the real-time application prize program include a program in which users answer quizzes, a program using questionnaire, and a program using request. The real-time prize program is a program where a user cannot apply to the prize if the user records video or sound of the program and enjoys the program afterward. A program applied by post mail postmarked on the day of the program or the next day of the program and a program that is not a real-time program but closes the application within 24 hours can be assumed to be a real-time prize program. If the control unit 1032 determines that the prize announced in the program has high real-time characteristics (YES in step S1311), the control unit 1032 proceeds to the process of step S1312 and if the control unit 1032 determines that the prize announced in the program does not have high real-time characteristics (NO in step S1311), the control unit 1032 proceeds to the process of step S1303.

Step S1312: the control unit 1032 displays an EPG screen in which a frame displaying the program, which is determined to be a prize program having high real-time characteristics in step S1311, is highlighted. When the process of step S1312 is completed, the control unit 1032 proceeds to the process of step S1305. It is preferred that display setting (background color, shape of icon, and the like) of the highlighted display of the program field with prize having high real-time characteristics is different from that of a highlighted display of the frame of a program that includes a prize but does not have high real-time characteristics.

By the display processing described above, a program with prize information is highlighted in the EPG screen, so that the viewer can grasp the presence or absence of prize information at a glance. Therefore, the viewer can easily know information announced in programs. In particular, by turning the viewer's attention to prize information having high real-time characteristics, the viewer tends to view the program including the prize information, so the display processing can contribute to increasing viewer ratings of the program.

The prize information display processing 2 of the broadcast reception apparatus 1030 will be described. In this prize information display processing, the display processing is performed based on user setting information set by a user in advance. Therefore, first, the user setting processing will be described.

Figure 7:
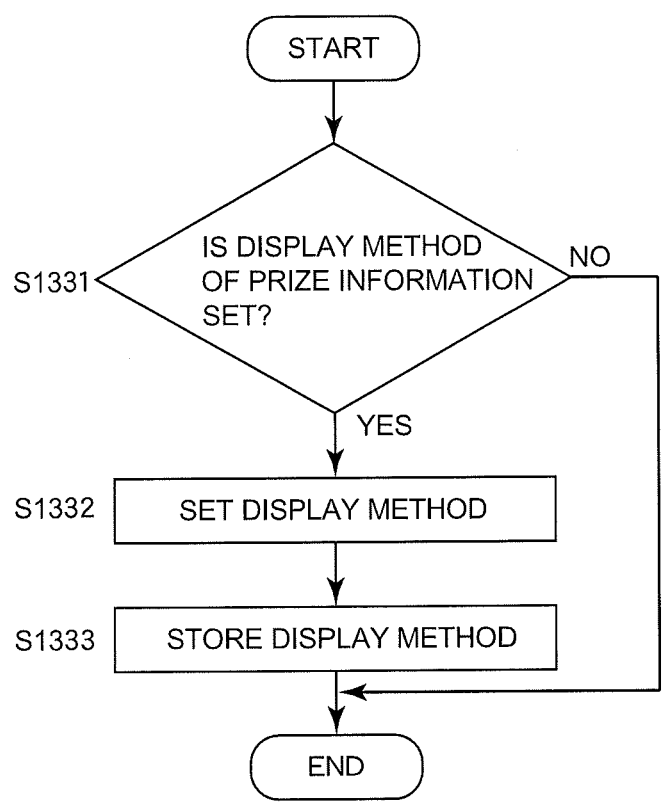
FIG. 7 is a flowchart of application information display processing of the broadcast reception apparatus shown in FIG. 1.

FIG. 7 is a flowchart of the user setting processing of the broadcast reception apparatus 1030 shown in FIG. 1.

START: the control unit 1032 starts the user setting processing when a mode of the user setting processing is selected. After starting the user setting processing, the control unit 1032 proceeds to the process of step S1331.

Step S1331: the control unit 1032 determines the presence or absence of a prize information display setting request. If the prize information display setting request is present (YES in step S1331), the control unit 1032 proceeds to the process of step S1332, and if the prize information display setting request is absent (NO in step S1331), the control unit 1032 ends the user setting processing (END). The presence or absence of the display setting request can be determined by the presence or absence of a display setting request signal from the operation input unit 1031.

Step S1332: the control unit 1032 sets a display method according to the request in step S1331. Specifically, the control unit 1032 performs various setting, such as, necessity of highlighted display (background color, icon, and the like) when there is prize information, highlighted display of application method, and a representation method of a prize having high real-time characteristics. When the process of step S1332 is completed, the control unit 1032 proceeds to the process of step S1333.

Step S1333: the control unit 1032 stores the display method of step S1332 and ends the user setting processing (END).

By the user setting processing described above, it is possible to set a user-desired display method of a program having prize information in the EPG screen, and to secure operability and visibility suitable to the user. Further, setting environments of different users can be stored respectively.

Figure 8:
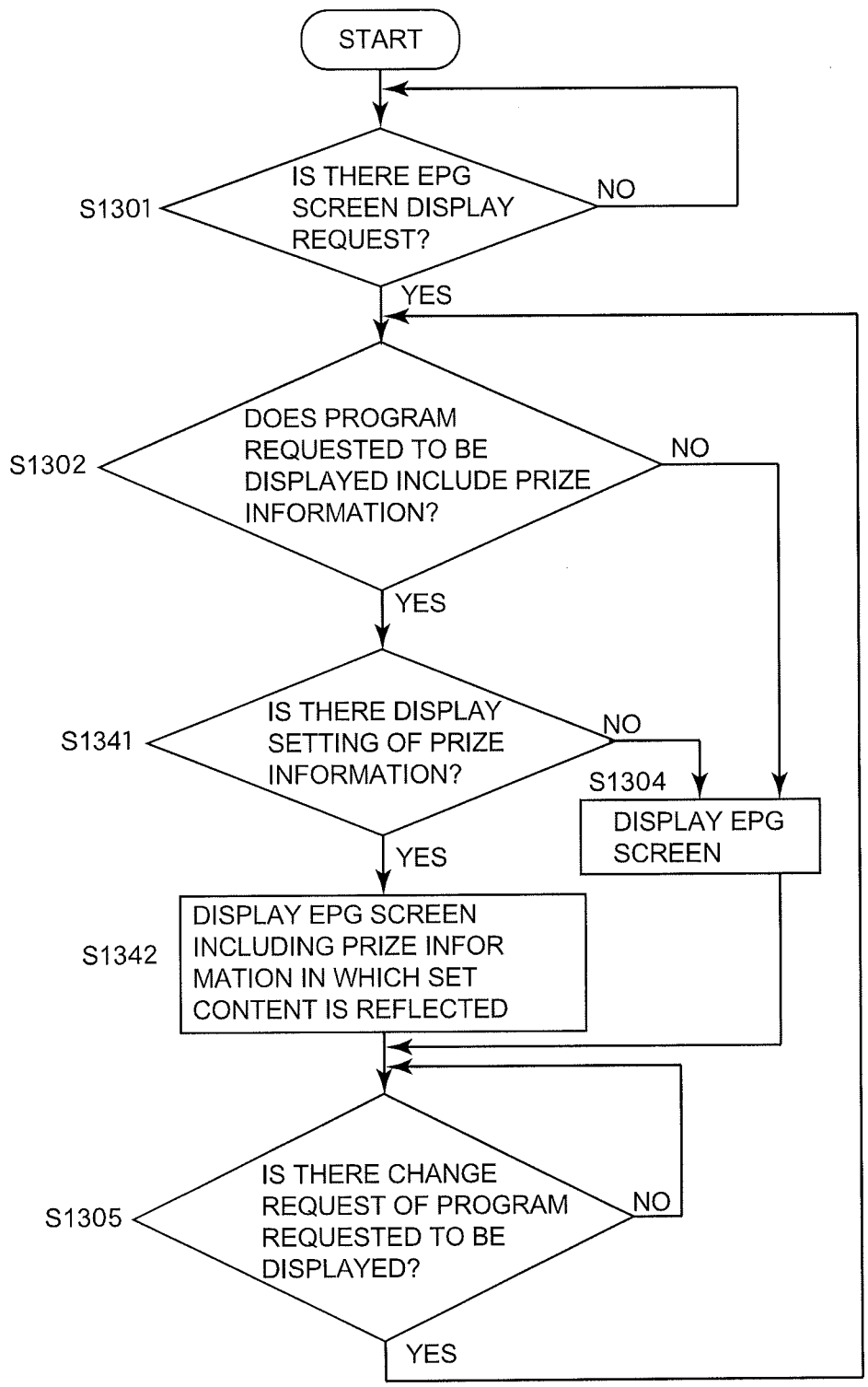
FIG. 8 is a flowchart of user setting processing of the broadcast reception apparatus shown in FIG. 1.

Next, the prize information display processing based on the user setting information will be described. FIG. 8 is a flowchart of the prize information display processing in which the user setting processing shown in FIG. 7 is reflected. The same processes as those in the prize information display processing of FIG. 6 (START, steps S1301, S1302, S1303, S1304, and S1305 in FIG. 8) are given the same step numbers as those of FIG. 6 in FIG. 8, and the description thereof will be omitted from the description below.

Step S1341: when a program requested to be displayed includes prize information in step S1302, the control unit 1032 determines the presence or absence of the display setting information of the prize information. If the display setting information of the prize information is present (YES in step S1341), the control unit 1032 proceeds to the process of step S1342, and if the display setting information of the prize information is absent (NO in step S1341), the control unit 1032 proceeds to the process of step S1304. For example, the presence or absence of the display setting information of the prize information can be determined by checking the presence or absence of a display setting file of the prize information stored in the user setting processing described in FIG. 9.

Step S1342: the control unit 1032 displays an EPG screen including the prize information in which the set content is reflected, and ends the prize information display processing (END).

By the display processing described above, the prize information is displayed according to the display method set in advance by the user from the operation input unit 1031 or the like, so that it is possible to secure operability and visibility suitable to the user.

In addition to the prize information display processings 1 and 2, whether or not the prize information includes information of application method may be determined, and if the prize information includes information of application method, it is possible to add the application information and highlight the program having the prize. Specifically, a control for changing background color for each application method and displaying a predetermined icon is performed. By the display processing described above, it is possible to know more detailed application information, such as an application deadline of the prize, in addition to the application information announced in the program from the display screen.

FIG. 9 is a diagram showing an example of the prize information display screen displayed on the display apparatus 1050 shown in FIG. 3. The screen example shown in FIG. 9 is, for example, the screen displayed in step S1303 in FIG. 6 described above, and is an EPG screen displayed in a format of radio/TV section of a newspaper. At the left end portion of the EPG screen, the type of broadcast being received ("Terrestrial Digital" in FIG. 9) is highlighted, and the other broadcast types ("BS", "CS", "FM", and "AM") are grayed out. At the above right of the program guide, the current date and time are displayed. In the present exemplary embodiment, a program guide of four broadcast stations 1010 is displayed. In this program guide, the program "Discover the 7 Wonders of Japan!" of "Tokyo BC", which is one of the broadcast stations 1010, at 17 o'clock-19 o'clock has prize information, so the program is highlighted. Only the prize information may be displayed in the program guide without highlighting the program.

FIG. 10 is a diagram showing an example of the prize information display screen displayed on the display apparatus 1050 shown in FIG. 3. The screen shown in FIG. 10 is an example in which "Discover the 7 Wonders of Japan!" is selected in the program guide of FIG. 9 (a selected program in the program guide is moved by direction keys, and a decision key is pressed), and detailed program information of "Discover the 7 Wonders of Japan!" is displayed in FIG. 10. By pressing the down direction key and scrolling the screen, information that cannot be displayed in the screen can be displayed. In FIG. 10, the application method is displayed as well. In FIG. 10, a Record button, a Select Channel button, a Reserve Viewing button, and a Present button are displayed. When the Record button is pressed, the program is recorded (reserved to be recorded). When the Select Channel button is pressed, the channel is switched to the broadcast station 1010 to perform display. If the Reserve Viewing button is pressed subsequently, a control for switching the channel when the program starts is performed. When the Present button is pressed, the prize information is extracted, and the prize information is displayed.

FIG. 11 is a diagram showing an example of the prize information display screen displayed on the display apparatus 1050 shown in FIG. 3. FIG. 11 shows the prize information when the Present button is pressed. Regarding the present image data, data of the present image can be displayed by transmitting a prize data string including the image data.

As described above, the information distribution system 1000 according to the exemplary embodiment 1 of the present invention performs broadcast including prize information, so that it is possible for a viewer or user to easily grasp a program with prize. Thereby, as a merit of the broadcast station 1010, it is possible for a broadcast service provider to acquire new viewers whose aim is prize and increase chances of viewing. As a merit of a user, it is possible to easily grasp programs with prize from the EPG information, so that the user can easily find a program which offers a present and watch the program. Further, the user can easily grasp what present is offered in the program. Furthermore, the user can grasp whether the program is a real-time prize program or not, so that the user can select whether the user watches the program real-time or records the program and watches the recorded program.

Figure 12:
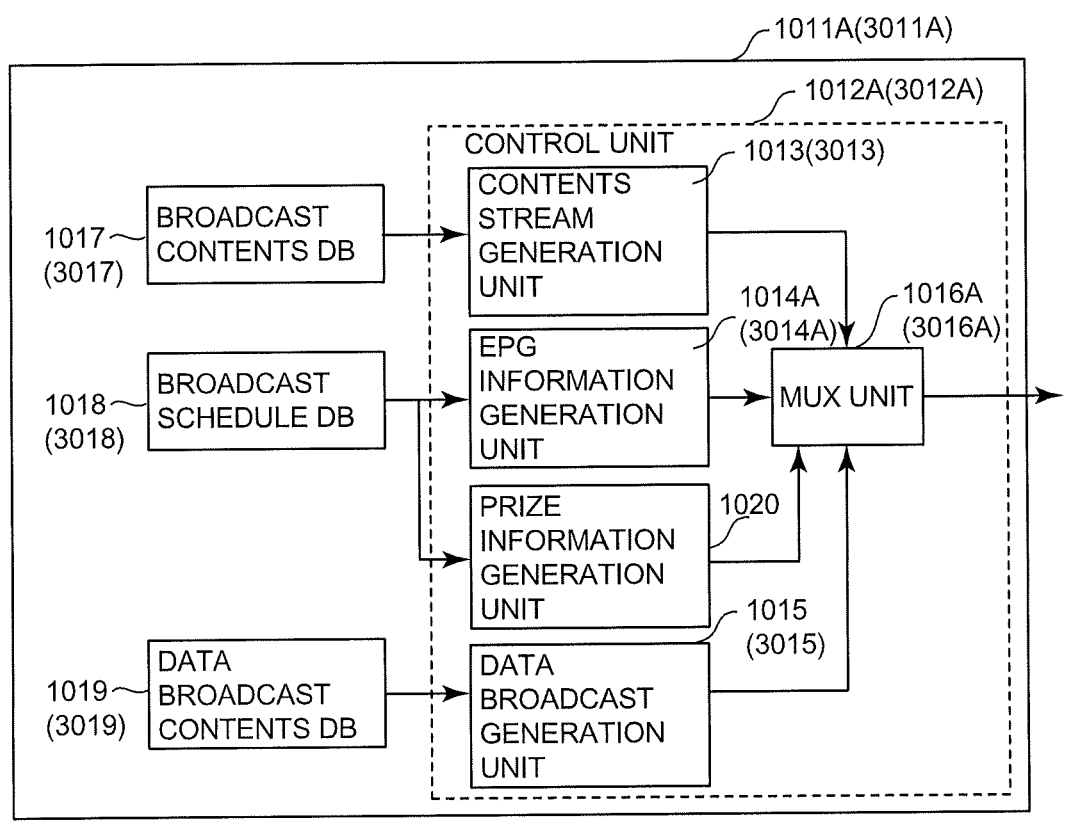
FIG. 12 is a diagram showing a modified example of the broadcast transmission apparatus shown in FIG. 2.

Next, a broadcast transmission apparatus, which is a modified example of the exemplary embodiment 1 described above, will be described with referring by a numeral 1011A. FIG. 12 is a diagram showing the broadcast transmission apparatus 1011A, which is a modified example of the broadcast transmission apparatus 1011 shown in FIG. 2. The broadcast transmission apparatus 1011A is different from the broadcast transmission apparatus 1011 of the exemplary embodiment 1, and generates and transmits prize information separately from the EPG information without transmitting prize information included in the EPG information. Specifically, a prize information generation unit 1020 generates prize information by referring to the broadcast schedule DB 1018, and the prize information is multiplexed with other information by a MUX unit 1016A and is transmitted. Although the broadcast transmission apparatus 1011A will be mainly described below, the processing of a broadcast reception apparatus that receives prize information separately from the EPG information is the same as that of a broadcast reception apparatus of a modified example of an exemplary embodiment 2 described below, so that the description thereof will be omitted here. The screens displayed on the display apparatus 1050 from the broadcast reception apparatus of a modified example of the exemplary embodiment 1 are the same as those shown in FIGS. 9 to 11, so their drawings and descriptions will be omitted.

Figure 13:
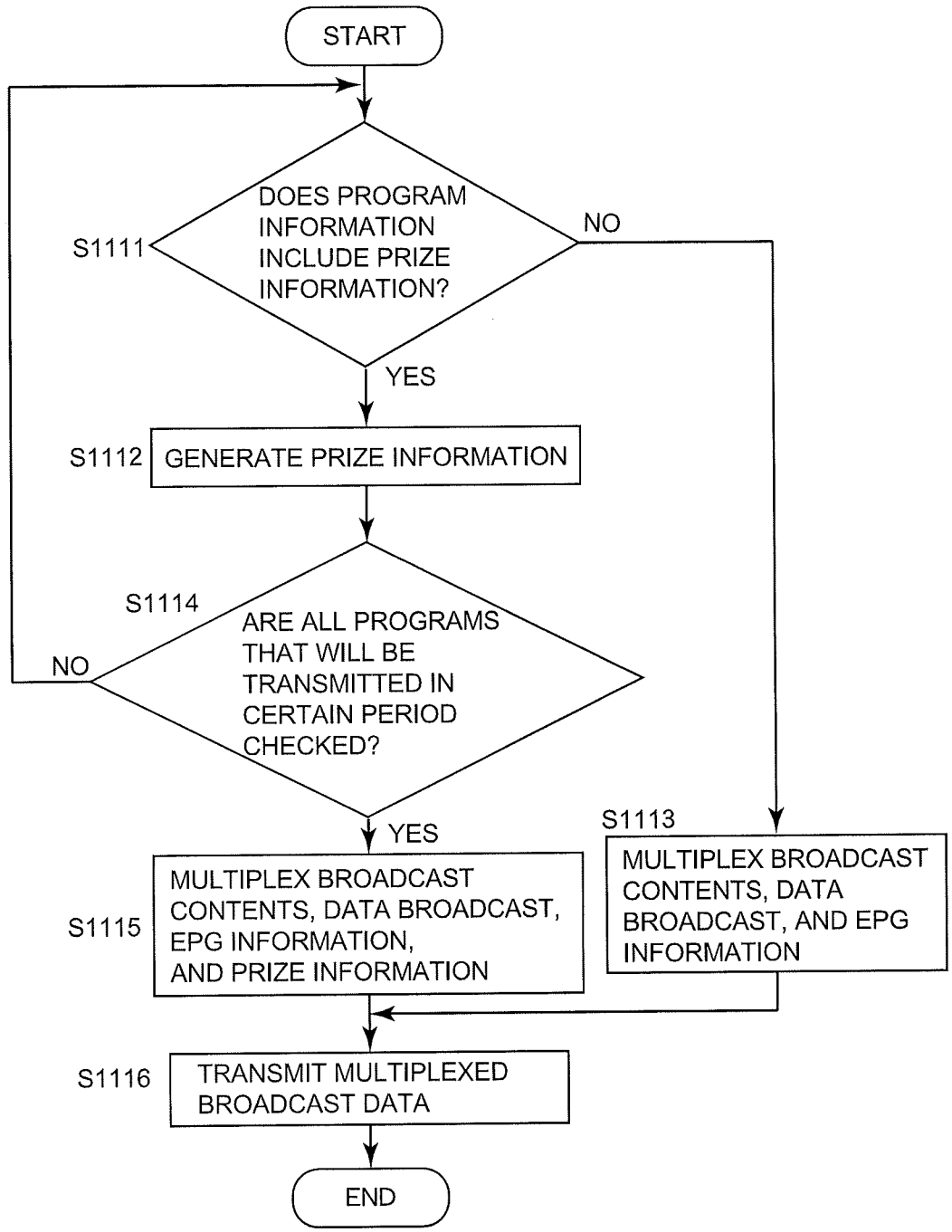
FIG. 13 is a flowchart of broadcast distribution processing of the broadcast transmission apparatus shown in FIG. 12.

FIG. 13 is a flowchart of broadcast distribution processing of the broadcast transmission apparatus 1011A shown in FIG. 12. Prize information announced in a program is associated with corresponding program information stored in the broadcast schedule DB 1018 and is stored.

START: a control unit 1012A starts broadcast distribution processing when the power is turned on or a mode of the broadcast distribution is selected. After starting the broadcast distribution processing, the control unit 1012A proceeds to the process of step S1111.

Step S1111: the control unit 1012A determines whether or not prize information is included in the program information by referring to the broadcast schedule DB 1018. If prize information is included in the program information (YES in step S1111), the control unit 1012A proceeds to the process of step S1112, and if prize information is not included in the program information (NO in step S1111), the control unit 1012A proceeds to the process of step S1113.

Step S1112: the control unit 1012A generates prize information. When the process of step S1112 is completed, the control unit 1012A proceeds to the process of step S1115.

Step S1113: the control unit 1012A multiplexes the broadcast contents, the data broadcast, and the EPG information. When the process of step S1113 is completed, the control unit 1012A proceeds to the process of step S1116.

Step S1114: the control unit 1012A determines whether or not the presence or absence of prize information has been checked for all the programs that will be transmitted in a certain period. If the presence or absence of prize information has been checked for all the programs that will be transmitted in the certain period (YES in step S1114), the control unit 1012A proceeds to the process of step S1115 and if the presence or absence of prize information has not been checked for all the programs (NO in step S1114), the control unit 1012A returns to the process of step S1111.

Step S1115: the control unit 1012A multiplexes the broadcast contents, the data broadcast, the EPG information, and the prize information. The prize information and the EPG information can be identified by comparing "broadcast start date and time", "broadcast end date and time", "program name", and the like included in both information. When the process of step S1115 is completed, the control unit 1012A proceeds to the process of step S1116.

Step S1116: the control unit 1012A transmits broadcast data multiplexed in step S1113 or step S1115, and ends the broadcast distribution processing (END).

By performing such distribution processing, in addition to the advantage of the broadcast transmission apparatus 1011 of the exemplary embodiment 1 described above, it is possible to multiplex the prize information with the broadcast data and distribute them to a broadcast reception apparatus 1030A even when the presence or absence of a prize in a program is not decided when the EPG information is generated or prize information is desired to be added after the EPG information is generated. Even when the prize information cannot be included in the EPG information due to a reason other than the above, it is possible to multiplex the prize information with the broadcast data and distribute them to the broadcast reception apparatus 1030A.

Exemplary Embodiment 2

Figure 14:
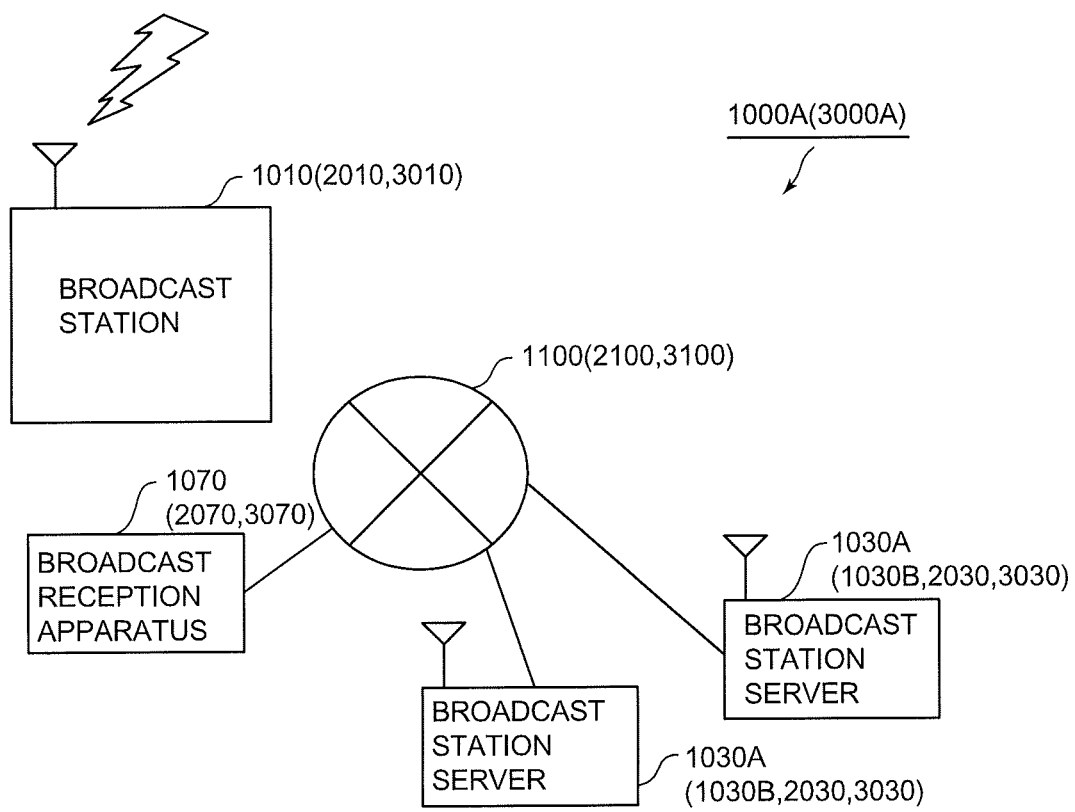
FIG. 14 is a diagram showing an entire configuration of an information distribution system according to an exemplary embodiment 2 of the present invention.

An information distribution system according to an exemplary embodiment of the present invention will be described. Although an information distribution system according to an exemplary embodiment 2 is different from the exemplary embodiment 1 in a point that EPG information and the like are transmitted via an IP communication network, the display processing of the broadcast reception apparatus when a program with prize is notified is the same as that in the exemplary embodiment 1. FIG. 14 is a diagram showing an entire configuration of an information distribution system 1000A according to the exemplary embodiment 2 of the present invention. The information distribution system 1000A shown in FIG. 14 is different from the information distribution system 1000 of the exemplary embodiment 1, and a broadcast station 1010, a broadcast station server 1070, and a broadcast reception apparatus 1030A can communicate with each other via an IP communication network 1100. The broadcast station 1010 transmits a program, data broadcast, and EPG information by a broadcast signal. The broadcast station server 1070 transmits EPG information and the like via the IP communication network 1100. The broadcast station server 1070 may be included in the broadcast station 1010, or may be separated from the broadcast station 1010. The broadcast station server 1070 may transmit its own contents data such as a program, a still image, sound, and a moving image that are unique to the Internet. Also, the broadcast station server 1070 may transmit its own contents data such as a program, a still image, sound, and a moving image that are coupled with a program of the broadcast station. The broadcast reception apparatus 1030A receives the broadcast signal from the broadcast station, and displays the received program and outputs sound and EPG information. The broadcast reception apparatus 1030A is, for example, a receiver of TV broadcasting and radio broadcasting. The broadcast reception apparatus 1030A may have a video recording function and a sound recording function. The broadcast reception apparatus 1030A can receive contents from the broadcast station server 1070, display the contents, and output sound and data. Although FIG. 14 shows one broadcast station server 1070 and two broadcast reception apparatuses 1030A, the information distribution system 1000A may have a plurality of broadcast station servers 1070 and three or more broadcast reception apparatuses 1030A.

Figure 15:
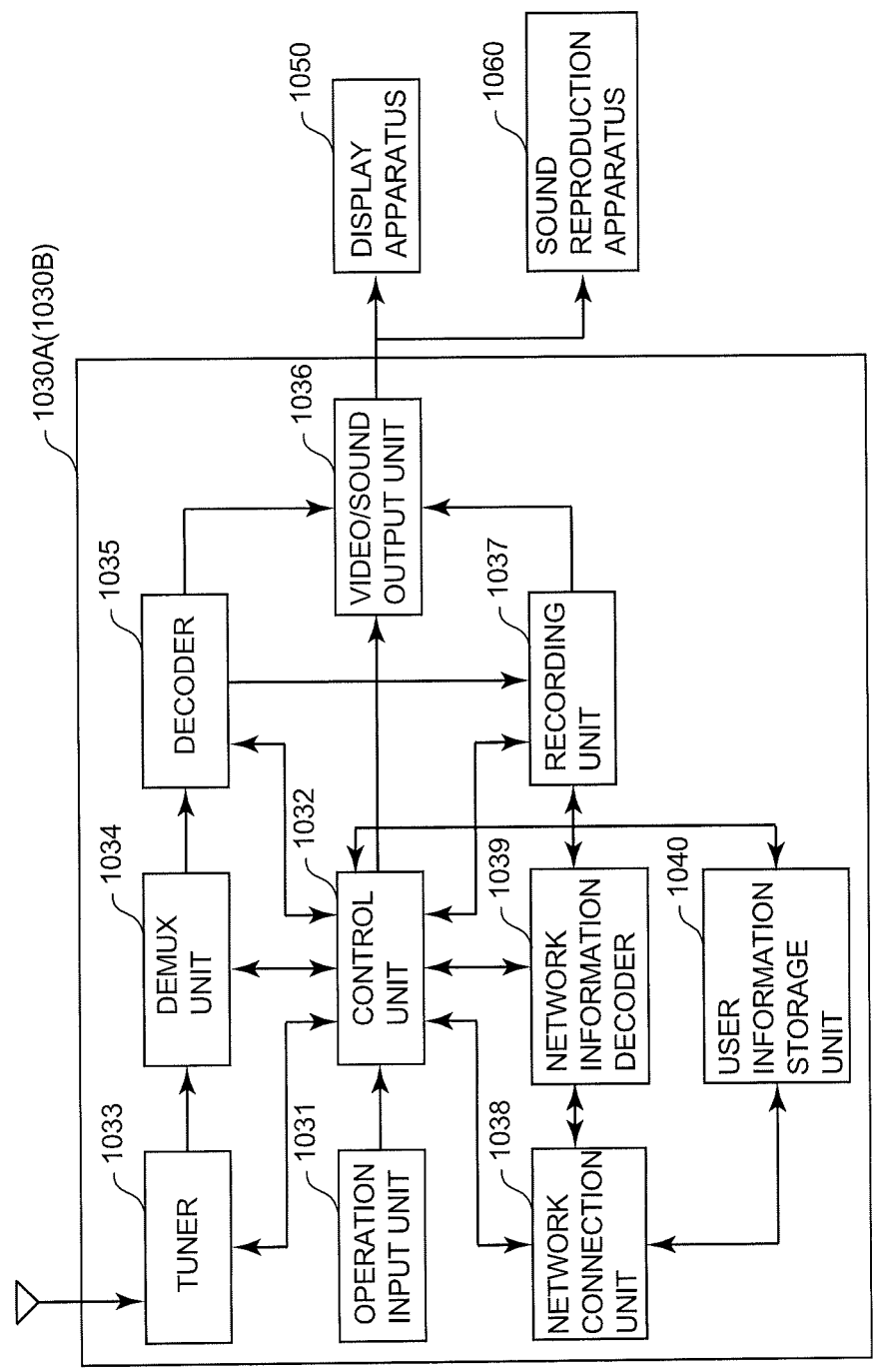
FIG. 15 is a block diagram showing an entire configuration of a broadcast reception apparatus shown in FIG. 14.

FIG. 15 is a block diagram showing an entire configuration of the broadcast reception apparatus 1030A shown in FIG. 14. As shown in FIG. 15, the broadcast reception apparatus 1030A has an operation input unit 1031, a control unit 1032, a tuner 1033, a DEMUX unit 1034, a decoder 1035, a video/sound output unit 1036, a recording unit 1037 a network connection unit 1038, a network information decoder 1039, and a user information storage unit 1040 as main constituent elements. Here, the control unit 1032 includes a CPU and the like, which are hardware resources not shown in the drawings, and can implement information processing performed by each unit of the broadcast reception apparatus 1030A by reading various programs stored in the recording unit and a ROM, storing the programs in a RAM, and executing various arithmetic processing cooperating with the hardware resources. The same functions as those of the broadcast reception apparatus 1030 of the exemplary embodiment 1 (operation input unit 1031, control unit 1032, tuner 1033, DEMUX unit 1034, decoder 1035, video/sound output unit 1036, and recording unit 1037) are given the same reference numerals and the descriptions thereof will be omitted.

The network connection unit 1038 is a communication interface for communicating with the broadcast station server 1070 via the IP communication network 1100. The network connection unit 1038 receives data from a network connection unit 1081 (see FIG. 16) of the broadcast station server 1070 and transmits the data to the network information decoder 1039. The network connection unit 1038 is an example functioning as a part of the electronic program information acquisition unit and a part of the announcement information acquisition unit in the claims.

The network information decoder 1039 decodes the data received from the network connection unit 1038 according to an instruction from the control unit 1032 and provides the data to the recording unit 1037. The data provided to the recording unit 1037 is provided to the video/sound output unit 1036 and thereafter outputted to at least either one of the display apparatus 1050 and the sound reproduction apparatus 1060. The user information storage unit 1040 stores information of users who use the information distribution system 1000A. The network information decoder 1039 is an example functioning as a part of the announcement information output unit in the claims.

Figure 16:
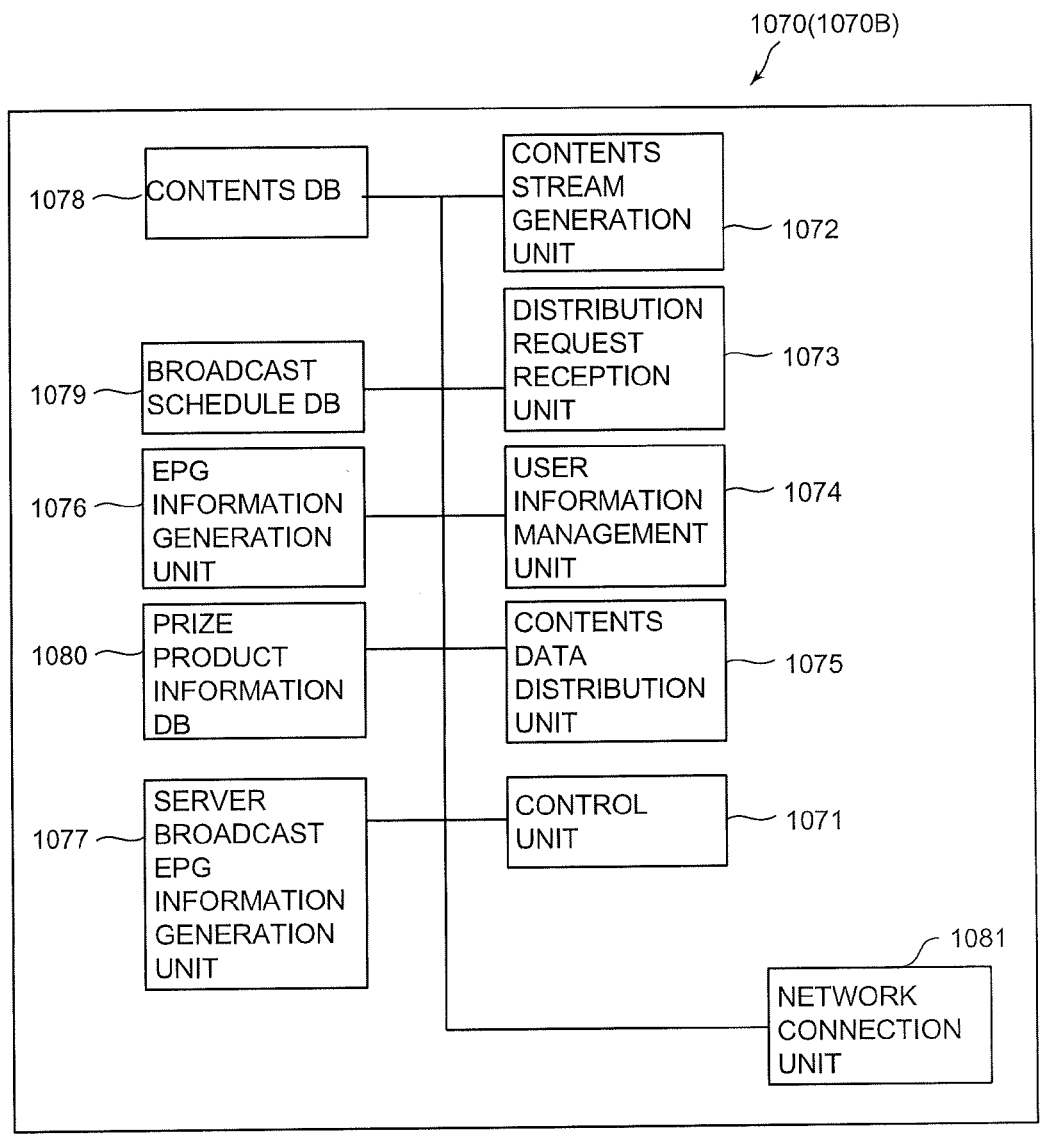
FIG. 16 is a block diagram showing an entire configuration of a broadcast station server shown in FIG. 14.

FIG. 16 is a block diagram showing an entire configuration of the broadcast station server 1070 shown in FIG. 14. As shown in FIG. 16, the broadcast station server 1070 has a control unit 1071, a contents stream generation unit 1072, a distribution request reception unit 1073, a user information management unit 1074, a contents data distribution unit 1075, an EPG information generation unit 1076, a server broadcast EPG information generation unit 1077, a contents DB 1078, a broadcast schedule DB 1079, a prize product information DB 1080, and a network connection unit 1081 as main constituent elements. The broadcast station server 1070 is an example functioning as an information distribution unit in the claims.

Here, information processing implemented by functions of the contents stream generation unit 1072, the distribution request reception unit 1073, the user information management unit 1074, the contents data distribution unit 1075, the EPG information generation unit 1076, and the server broadcast EPG information generation unit 1077 mentioned above is implemented by the control unit 1071 which controls the entire broadcast station server 1070 by cooperating with hardware resources. Specifically, the control unit 1071 includes a CPU and the like, which are hardware resources not shown in the drawings, and implements the information processing by the CPU which reads various programs stored in a ROM not shown in the drawings, stores the programs in a RAM not shown in the drawings, and executes the programs cooperating with the hardware resources. The contents DB 1078, the broadcast schedule DB 1079, the prize product information DB 1080 mentioned above are stored in a storage unit not shown in the drawings, and the storage unit includes, for example, an HDD, a flash memory, or the like. The description of the same function as that in the broadcast transmission apparatus 1011 of the exemplary embodiment 1 (contents stream generation unit 1072) will be omitted.

The distribution request reception unit 1073 has a function for receiving a prize information distribution request from the broadcast reception apparatus 1030A. Specifically, the broadcast station server 1070 provides contents, EPG information, server broadcast EPG information, and the like requested by the broadcast reception apparatus 1030A.

The user information management unit 1074 has a function for acquiring predetermined input items if a user who tries to connect to the broadcast station server 1070 is not registered, and newly registering the user as a user of the information distribution system 1000A. Specifically, the user information management unit 1074 displays a user registration screen on a display of a broadcast reception apparatus 1030A which tries to connect to the broadcast station server 1070 or on a display apparatus 1050 connected to the broadcast reception apparatus 1030A, causes a user to input predetermined items, and stores the inputted items into a storage unit not shown in the drawings.

The user information management unit 1074 also has a function to determine whether or not a user who tries to connect to the broadcast station server 1070 is a user who is rightly allowed to use the information distribution system 1000A. Specifically, the user information management unit 1074 performs user authentication processing by displaying a user authentication screen on a display of a broadcast reception apparatus 1030A which tries to connect to the broadcast station server 1070 or on a display apparatus 1050 connected to the broadcast reception apparatus 1030A, and comparing items inputted into the authentication screen (for example, a user ID and a password inputted by a user) with items stored in advance in a storage unit not shown in the drawings (for example, an ID of the user and a password set by the user in advance). Regarding the user information management unit 1074, an LDAP (Lightweight Directory Access Protocol) server as the user authentication server may be installed separately from the broadcast station server 1070, and each process of the user information management unit 1074 may be implemented on the LDAP server. The user information management unit 1074 manages information of users. Specifically, user IDs and areas of the users are registered, so that it is possible to provide EPG information of an appropriate broadcast area corresponding to the area of the user who requests the EPG information.

The contents data distribution unit 1075 has a function to distribute contents, which are different from the broadcast data transmitted from the broadcast transmission apparatus 1011 by a broadcast signal but are related to the broadcast data, or contents other than the above via the IP communication network 1100.

The EPG information generation unit 1076 generates EPG information based on the broadcast schedule DB 1079 and the prize product information DB 1080. The broadcast schedule DB 1079 stores program information carried by broadcast signals (TV broadcasting, radio broadcasting, and the like). The broadcast schedule DB 1079 is used to generate EPG information. The broadcast schedule DB 1079 basically includes substantially the same data as that in the broadcast schedule DB 1018 of the broadcast transmission apparatus 1011 according to the exemplary embodiment 1. However, the broadcast schedule DB 1079 stores more detailed information than the information stored in the broadcast schedule DB 1018. The prize product information DB 1080 stores prize information in advance. In the prize information, as shown by data in FIGS. 17, 20, and 21, broadcast type, broadcast station name, program name, start/end times, real-time application program or not, application deadline information, application information, and the like of programs with prize are recorded. The above data are used to generate EPG information, and the EPG information including the prize information is transmitted according to a request from the broadcast reception apparatus 1030A.

The server broadcast EPG information generation unit 1077 generates EPG data of contents related to a program if contents of the contents DB 1078 described below are the contents related to the program. If there is prize information related to the contents, the server broadcast EPG information generation unit 1077 generates server broadcast EPG data including the prize information.

The contents DB 1078 stores various contents. The contents stored in the contents DB 1078 include contents coupled to a program, contents that can be accessed even after the program has been broadcast, contents that are not limited to a specific area, and the like. Specific examples of the contents include a static image, a moving image, and sound. The information mentioned above is described by a markup language, such as for example, XML (eXtensible Markup Language) or BML (Broadcast Markup Language). Using such a markup language improves compatibility with the IP communication network 1100.

Next, prize information distribution processing performed by the broadcast station server 1070 will be described. The broadcast station server 1070 adds prize information to the EPG information and transmits the EPG information to the broadcast reception apparatus 1030A.

FIG. 17 is a diagram showing an example of a data string of the EPG information transmitted from the broadcast station server 1070 shown in FIG. 14. As shown in FIG. 17, the data string of the prize information includes fields, such as "broadcast type", "broadcast station name", "broadcast start date and time", "broadcast end date and time", "program name", "display format", "sound format", "genre", "cast", "director", "production company", "program content", "present", "real-time or not", "application method", "prize application start date and time", "prize application end date and time", "present category", and "present product name". Among the EPG information shown in FIG. 17, the fields of "present", "real-time or not", "application method", "prize application start date and time", "prize application end date and time", "present category", and "present product name" are added as the prize information.

Figure 18:
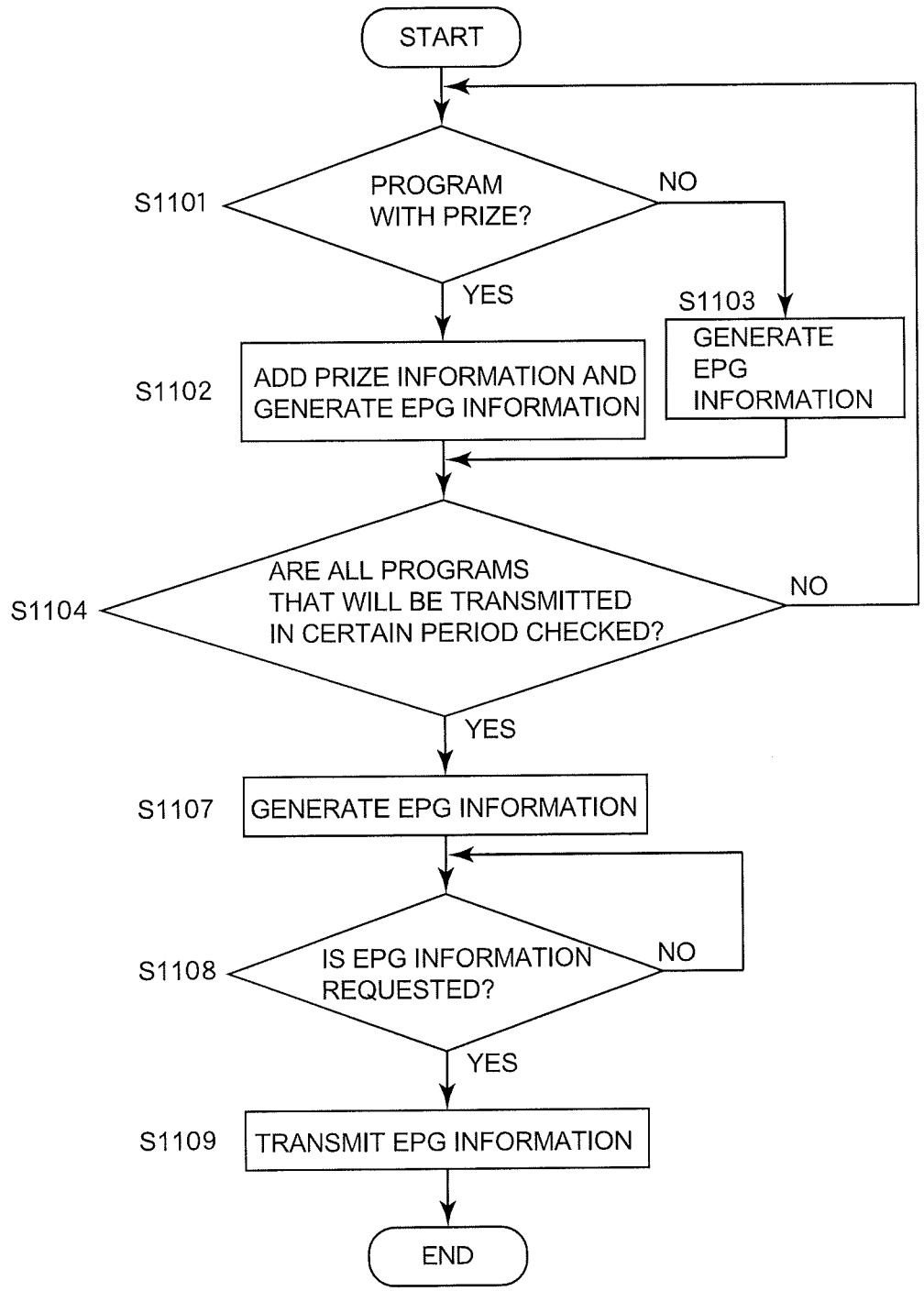
FIG. 18 is a flowchart of EPG information transmission processing of the broadcast station server shown in FIG. 14.

FIG. 18 is a flowchart of EPG information transmission processing of the broadcast station server 1070 shown in FIG. 14. In the EPG information transmission processing, the EPG information including the presence or absence of prize information is distributed. The same processes as those in FIG. 5 (START, steps S1101, S1102, S1103, and S1104 in FIG. 18) are given the same step numbers as those in FIG. 5, and the description thereof will be omitted.

Step S1107: if the presence or absence of prize information has been checked for all the programs that will be transmitted in the certain period in step S1104, the control unit 1071 generates EPG information including all the programs that will be transmitted in the certain period. When the process of step S1107 is completed, the control unit 1071 of the broadcast station server 1070 proceeds to the process of step S1108.

Step S1108: the control unit 1071 determines the presence or absence of a transmission request of the EPG information. If the transmission request of the EPG information is present (YES in step S1108), the control unit 1071 of the broadcast station server 1070 proceeds to step S1109, and if the transmission request is absent (NO in step S1108), the control unit 1071 repeats the determination process of step S1108.

Step S1109: the control unit 1071 transmits the EPG information and ends the EPG information transmission processing (END).

The EPG information is transmitted in this way, and thereby the presence or absence of prize information is included in the EPG information and distributed, so that a viewer can easily know information announced in the programs. The EPG information including the presence or absence of prize information is distributed from the broadcast station server 1070 using the IP communication network 1100 on the basis of the transmission request from the broadcast reception apparatus 1030A, so that, different from the distribution processing by the broadcast signal of the broadcast transmission apparatus 1011 according to the exemplary embodiment 1, it is possible to distribute the EPG information including the presence or absence of prize information on the basis of the distribution request of the viewer. In summary, a user's request can be reflected.

Figure 19:
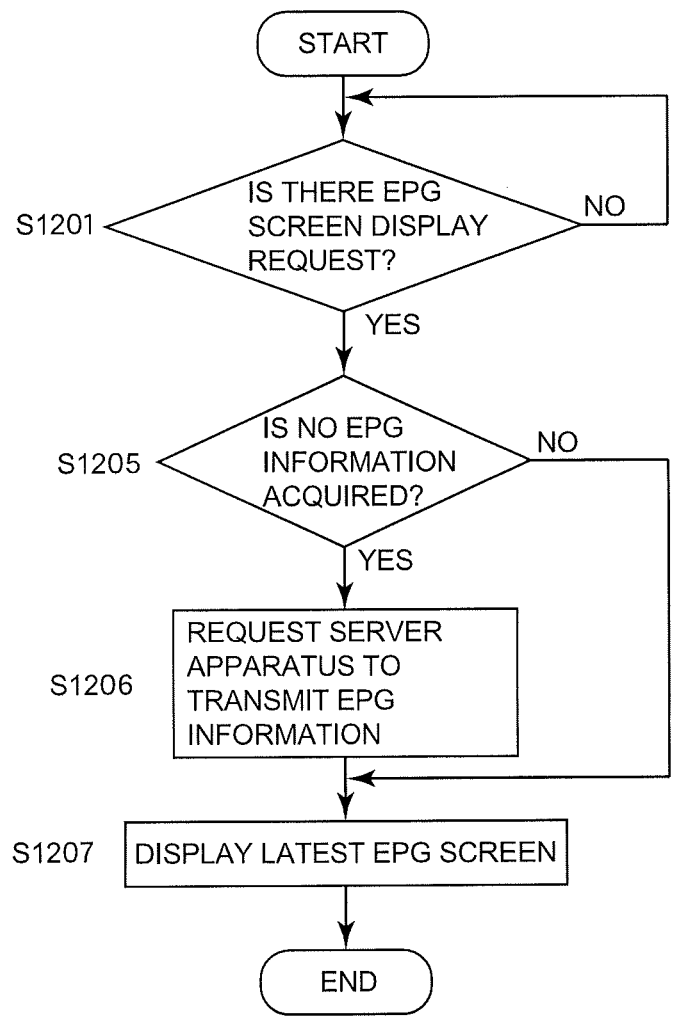
FIG. 19 is a flowchart of prize information display processing of the broadcast reception apparatus shown in FIG. 14.

FIG. 19 is a flowchart of prize information display processing of the broadcast reception apparatus 1030A shown in FIG. 14.

START: the control unit 1032 starts prize information display processing when the power is turned on or a mode of the display processing is selected. After starting the prize information display processing, the control unit 1032 proceeds to the process of step S1201.

Step S1201: the control unit 1032 determines the presence or absence of an EPG screen display request. If the EPG screen display request is present (YES in step S1201), the control unit 1032 proceeds to the process of step S1205, and if the EPG screen display request is absent (NO in step S1201), the control unit 1032 repeats the determination process of step S1201.

Step S1205: the control unit 1032 determines whether the EPG information is acquired or not. If the EPG information is not acquired (YES in step S1205), the control unit 1032 proceeds to the process of step S1206, and if the EPG information is acquired (NO in step S1205), the control unit 1032 proceeds to the process of step S1207. In an environment connected to a network at all times, if the latest EPG information can be acquired at specific timings (for example, once in every 5 minutes), this step can be omitted.

Step S1206: the control unit 1032 requests the broadcast station server 1070 to transmit the EPG information. When the EPG information is transmitted from the broadcast station server 1070 according to the request in step S1206, the control unit 1032 proceeds to the process of step S1207.

Step S1207: the control unit 1032 displays an EPG screen based on the EPG information requested and acquired in step S1206 or EPG information having been acquired, and ends the prize information display processing (END).

By the display processing described above, if the EPG screen display request is present, the control unit 1032 checks whether the EPG information is acquired or not, and even if the EPG information is not acquired, the control unit 1032 can send an acquisition request to the broadcast station server 1070 and display the EPG information acquired by the request. The EPG information acquired here may include prize information, so if the prize information is included, the prize information can be displayed.

As described above, the information distribution system 1000A according to the exemplary embodiment 2 of the present invention performs broadcast including prize information, so that it is possible for a viewer or user to easily grasp a program with prize. Thereby, as a merit of the broadcast station 1010, it is possible for a broadcast service provider to acquire new viewers whose aim is prize and increase chances of viewing. As a merit of the user, it is possible to easily grasp programs with prize from the EPG information, so that the user can easily find a program which offers a present and watch the program. Further, the user can easily grasp what present is offered in the program. Furthermore, the user can grasp whether the program is a real-time prize program or not, so that the user can select whether the user watches the program real-time or records the program and watches the recorded program. Even when the EPG information is not transmitted from the broadcast station 1010 or the transmitted EPG information does not include prize information, it is possible for the user to easily grasp a program with prize by acquiring the EPG information including prize information transmitted from the broadcast station server 1070.

A broadcast station server (hereinafter referred to as broadcast station server 1070B) described below, which is a modified example of the broadcast station server 1070, is different from the broadcast station server 1070 of the exemplary embodiment 2, and the broadcast station server 1070B does not transmit the EPG information including prize information but generates prize information separately from the EPG information and transmits the prize information. A broadcast reception apparatus (hereinafter referred to as broadcast reception apparatus 1030B) described below, which is a modified example of the broadcast reception apparatus 1030A, is different from the broadcast reception apparatus 1030A of the exemplary embodiment 2, and the broadcast reception apparatus 1030B does not receive the EPG information including prize information but receives the EPG information and the prize information which are generated separately.

The broadcast station server 1070B is different from the broadcast station server 1070 of the exemplary embodiment 2, and generates and transmits prize information separately from the EPG information without transmitting prize information included in the EPG information. Specifically, the broadcast station server 1070B has a prize information generation unit (not shown in the drawings) in addition to the configuration of the broadcast station server 1070 shown FIG. 16. The prize information generation unit refers to the broadcast schedule DB 1079 to generate prize information. The generated prize information is transmitted via the IP communication network 1100. The configuration other than the prize information generation unit is the same as the configuration of the broadcast station server 1070 shown in FIG. 16, so the description thereof is omitted.

The broadcast reception apparatus 1030B is different from the broadcast reception apparatus 1030A of the exemplary embodiment 2, and receives the prize information generated separately from the EPG information without receiving the prize information included in the EPG information. However, the configuration of the broadcast reception apparatus 1030B is the same as that of the broadcast reception apparatus 1030A shown in FIG. 18, so the description thereof is omitted. Screen examples displayed on the display apparatus 1050 connected to the broadcast reception apparatus 1030B are the same as those described in FIGS. 9 to 11, so the description of the screen display examples is omitted.

Next, distribution processing of the broadcast station server 1070B will be described. The broadcast station server 1070B can add contents coupled to a program along with prize information. FIG. 20 is a diagram showing an example of a data string distributed from the broadcast station server 1070B, which is a modified example of the exemplary embodiment 2 of the present invention. A data string shown in FIG. 20 includes information related to contents transmitted by a broadcast signal (fields from "broadcast type" to "program name"), contents coupled to the above contents (fields of coupled contents 1 and coupled contents 2), and prize information related to the above contents (fields from "real-time or not" to "present product name"). Such a data string is transmitted, so that it is possible to distribute contents coupled to prize information of a program.

FIG. 21 is a diagram showing an example of a data string distributed from the broadcast station server 1070B of the exemplary embodiment 2 of the present invention. A data string shown in FIG. 21 includes information related to contents transmitted by a broadcast signal (fields from "broadcast type" to "program name"), contents coupled to the above contents (fields of coupled contents 1 and coupled contents 2), and prize information related to the coupled contents (fields from "real-time or not" to "present product name"). Thereby, contents coupled to a program can be distributed, and further the prize information of the coupled contents can be distributed as well.

Figure 22:
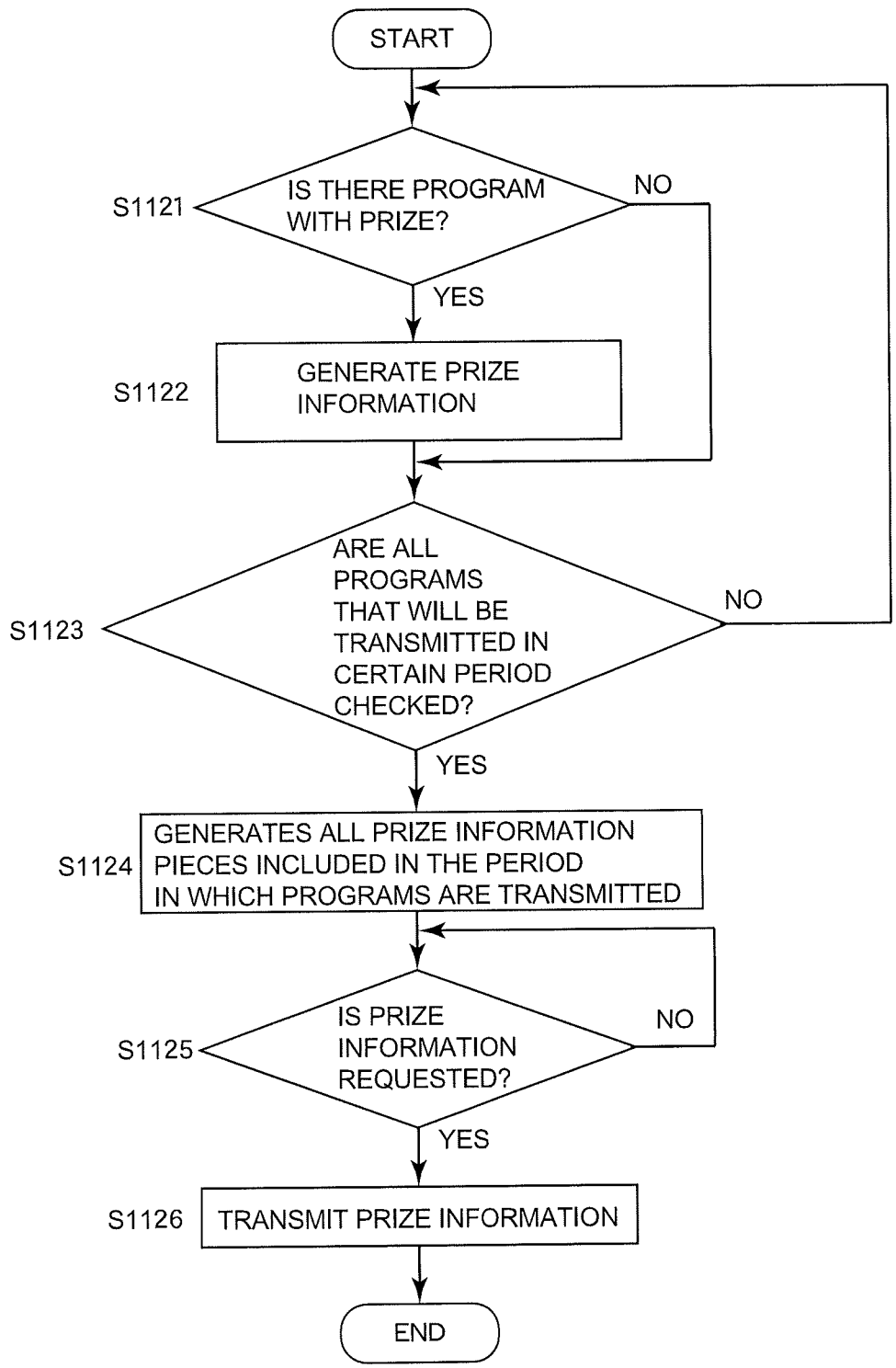
FIG. 22 is a diagram showing a modified example of the EPG information transmission processing shown in FIG. 18.

FIG. 22 is a diagram showing a modified example of the EPG information transmission processing shown in FIG. 18. In this modified example, only the prize information is generated and transmitted.

START: the control unit 1071 starts prize information transmission processing when the power is turned on or a mode of the prize information transmission is selected. After starting the prize information transmission processing, the control unit 1071 proceeds to the process of step S1121.

Step S1121: the control unit 1071 determines whether or not a program includes prize information. If the program includes prize information (YES in step S1121), the control unit 1071 proceeds to the process of step S1122, and if the program does not include prize information (NO in step S1121), the control unit 1071 proceeds to the process of step S1123.

Step S1122: the control unit 1071 generates prize information. When the process of step S1122 is completed, the control unit 1071 proceeds to the process of step S1123.

Step S1123: the control unit 1071 checks the presence or absence of prize information for all the programs that will be transmitted in a certain period. If the presence or absence of prize information has been checked for all the programs that will be transmitted in the certain period (YES in step S1123), the control unit 1071 proceeds to the process of step S1124, and if the presence or absence of prize information has not been checked for all the programs (NO in step S1123), the control unit 1071 returns to the process of step S1121.

Step S1124: the control unit 1071 generates all prize information pieces included in the period in which the programs are transmitted. When the process of step S1124 is completed, the control unit 1071 proceeds to the process of step S1125.

Step S1125: the control unit 1071 determines the presence or absence of a prize information transmission request. If the prize information transmission request is present (YES in step S1125), the control unit 1071 proceeds to the process of step S1126, and if the prize information transmission request is absent (NO in step S1125), the control unit 1071 ends the prize information transmission processing (END).

Step S1126: the control unit 1071 transmits all the prize information pieces included in the period in which the programs are transmitted, and then ends the prize information transmission processing (END).

The prize information is transmitted in this way, so that only the prize information can be transmitted independently from the EPG information.

Figure 23:
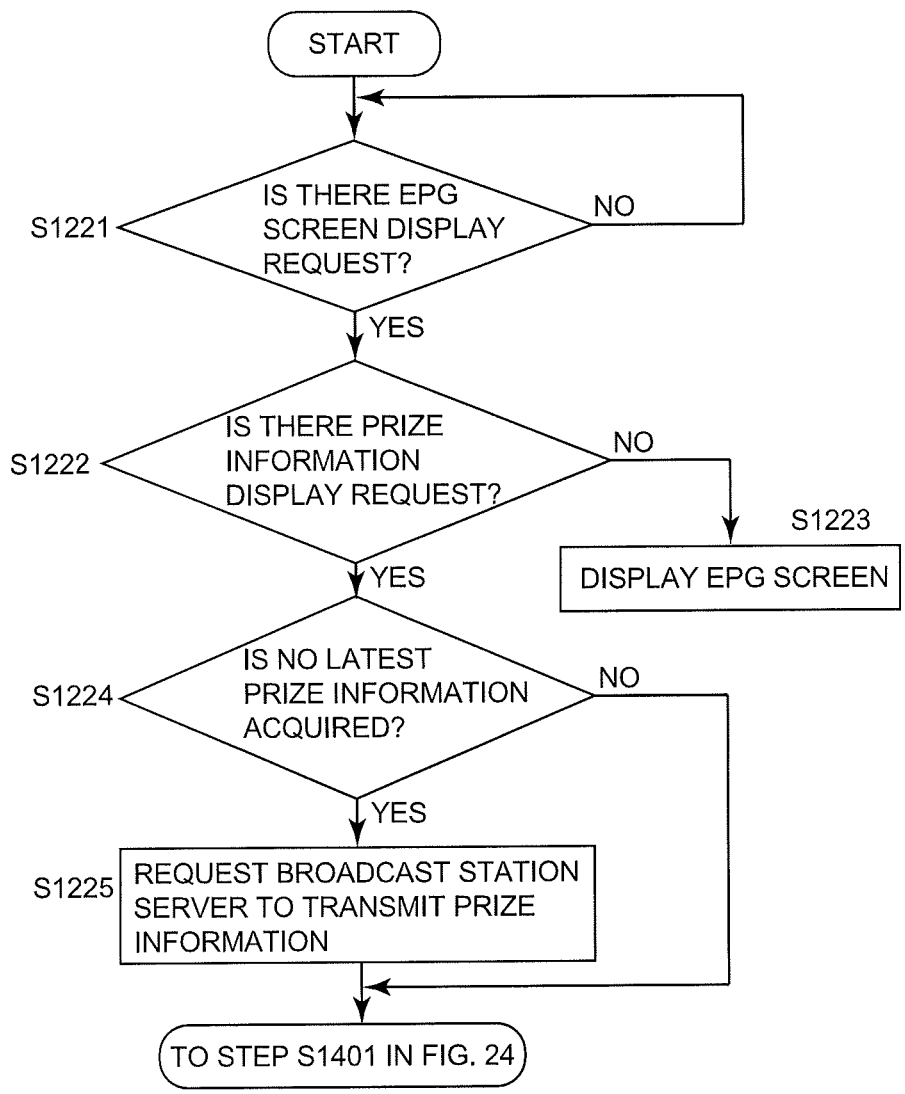
FIG. 23 is a diagram showing a modified example of the prize information display processing shown in FIG. 19.

Next, a modified example of the prize information display processing of the broadcast reception apparatus 1030B will be described. FIG. 23 is a diagram showing the modified example of the prize information display processing shown in FIG. 19. This modified example is used as prize information display processing when the broadcast reception apparatus 1030B communicates with the broadcast station server 1070 that transmits only the prize information.

START: the control unit 1032 starts prize information display processing when the power is turned on or a mode of the display processing is selected. After starting the prize information display processing, the control unit 1032 proceeds to the process of step S1221.

Step S1221: the control unit 1032 determines the presence or absence of an EPG screen display request. If the EPG screen display request is present (YES in step S1221), the control unit 1032 proceeds to the process of step S1222, and if the EPG screen display request is absent (NO in step S1221), and the control unit 1032 repeats the determination process of step S1221.

Step S1222: the control unit 1032 determines the presence or absence of a prize information display request. If the prize information display request is absent (NO in step S1222), the control unit 1032 proceeds to the process of step S1223, and if the prize information display request is present (YES in step S1222), the control unit 1032 proceeds to the process of step S1224.

Step S1223: the control unit 1032 displays the EPG screen, and then ends the prize information display processing (END). In step S1223, when displaying the EPG screen, the control unit 1032 may determine the presence or absence of the prize information display request in the same manner as in step S1222.

Step S1224: the control unit 1032 determines whether the latest prize information is acquired or not. If the latest prize information is not acquired (YES in step S1224), the control unit 1032 proceeds to the process of step S1225, and if the latest prize information is acquired (NO in step S1224), the control unit 1032 proceeds to the process of step S1226.

Step S1225: the control unit 1032 requests the broadcast station server 1070 to transmit the prize information. When the process of step S1225 is completed, the control unit 1032 proceeds to the process of step S1401 in FIG. 24.

Figure 24:
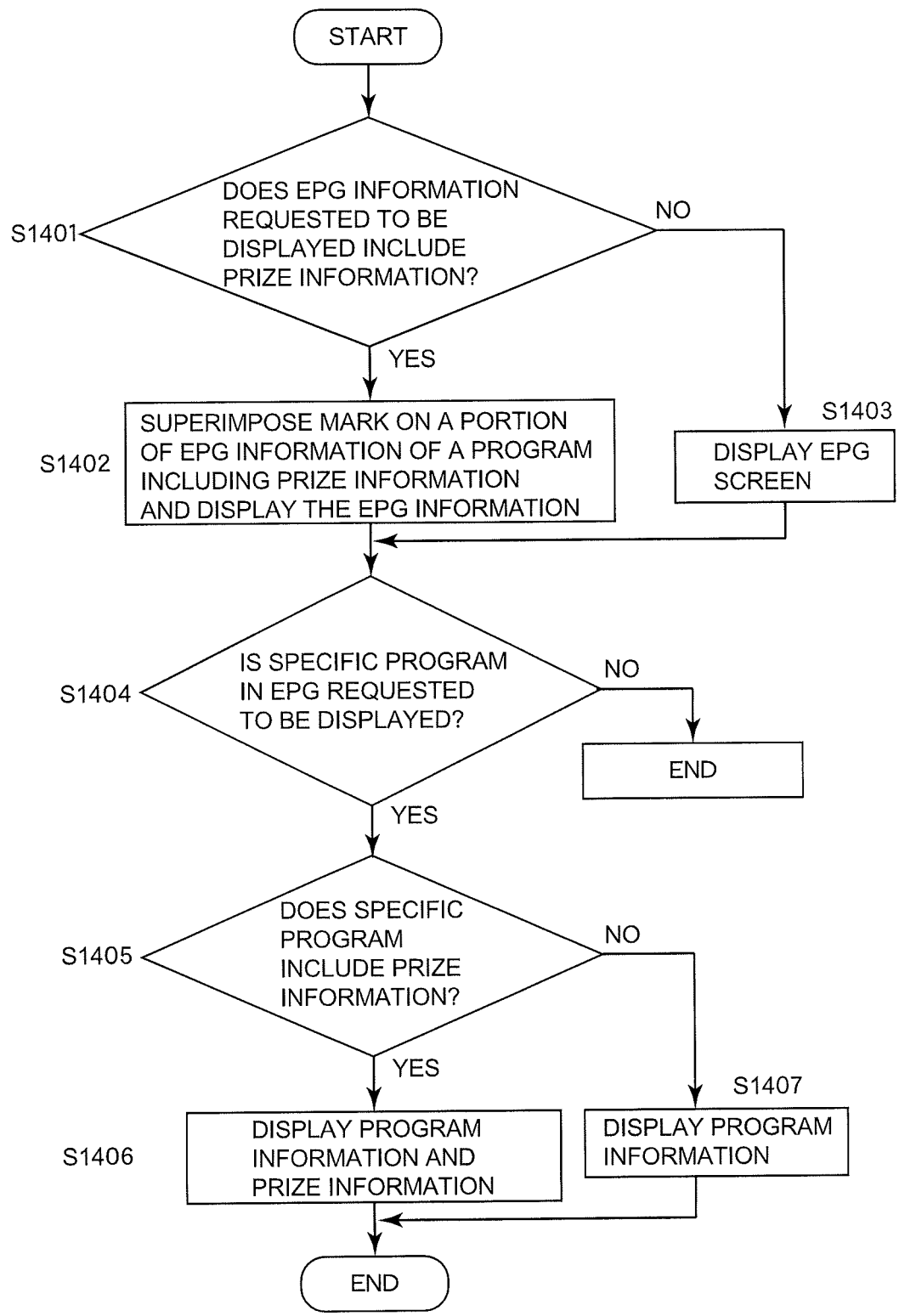
FIG. 24 is a diagram showing the modified example of the prize information display processing shown in FIG. 19.

FIG. 24 is a diagram showing the modified example of the prize information display processing shown in FIG. 19, following step S1225 of the prize information display processing shown in FIG. 23.

Start: when the control unit 1032 requests the broadcast station server 1070 to transmit the EPG information and acquires the EPG information, the control unit 1032 proceeds to the process of step S1401.

Step S1401: the control unit 1032 determines whether or not "program of the EPG information" requested to be displayed includes prize information. If the "program of the EPG information" requested to be displayed includes prize information (YES in step S1401), the control unit 1032 proceeds to the process of step S1402, and if the "program of the EPG information" requested to be displayed includes no prize information (NO in step S1401), the control unit 1032 proceeds to the process of step S1403.

Step S1402: the control unit 1032 superimposes a mark on a portion of the EPG information of the program including prize information and displays the EPG information (superimposed display). When the process of step S1402 is completed, the control unit 1032 proceeds to the process of step S1404. The mark indicating that the program includes a prize may be an icon or a text.

Step S1403: the control unit 1032 displays the EPG information on the screen. When the process of step S1403 is completed, the control unit 1032 proceeds to the process of step S1404.

Step S1404: the control unit 1032 determines the presence or absence of a display request of a specific program among the programs displayed on the basis of the EPG information. If the display request of a specific program is present (YES in step S1404), the control unit 1032 proceeds to the process of step S1405, and if the display request of a specific program is absent (NO in step S1404), the control unit 1032 ends the prize information display processing (END).

Step S1405: the control unit 1032 determines whether or not the specific program includes prize information. If the specific program includes prize information (YES in step S1405), the control unit 1032 proceeds to the process of step S1406, and if the specific program includes no prize information (NO in step S1405), the control unit 1032 proceeds to the process of step S1407.

Figure 25:
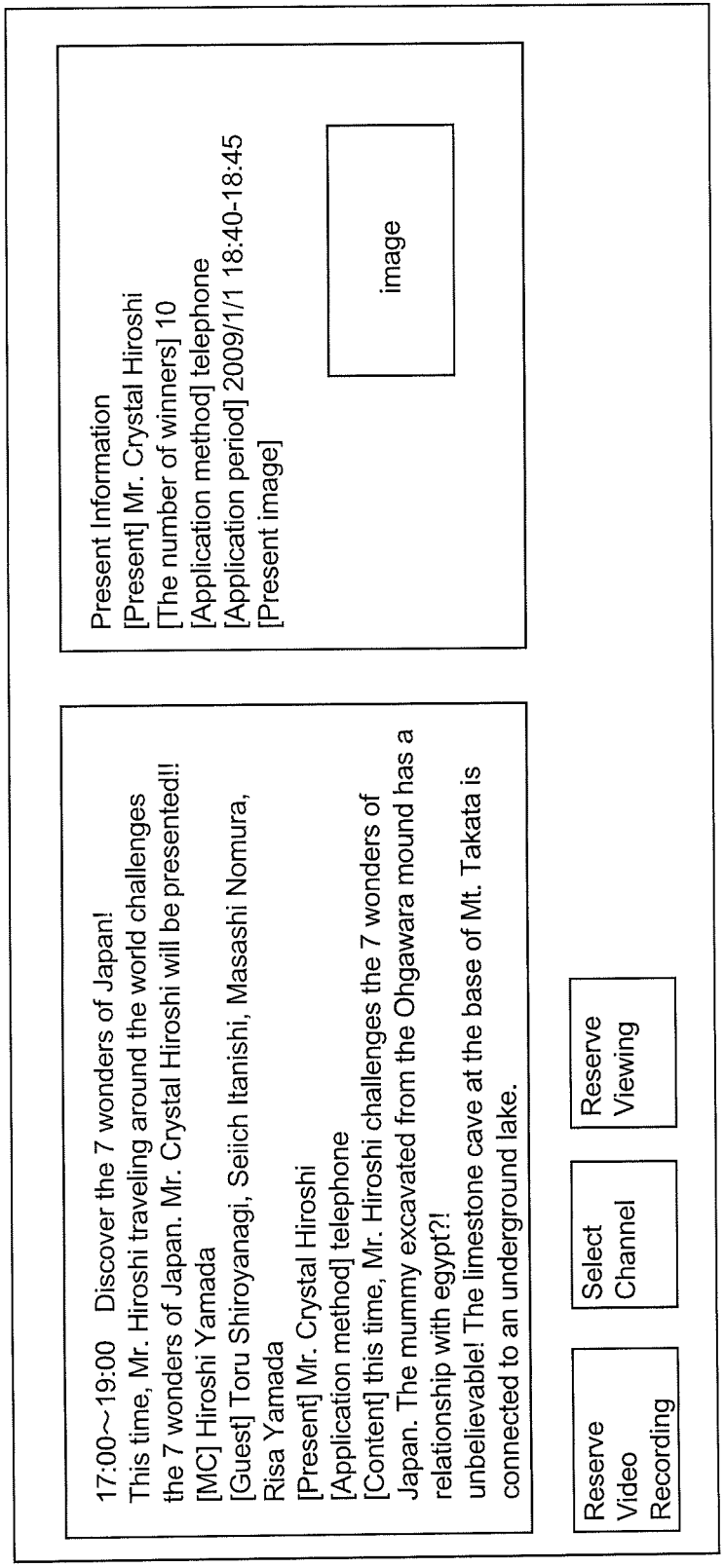
FIG. 25 is a diagram showing an example 1 of the prize information display screen displayed on the display apparatus shown in FIG. 15.

Step S1406: the control unit 1032 displays the program information and the prize information as shown in FIG. 25, and then ends the prize information display processing (END).

Figure 26:
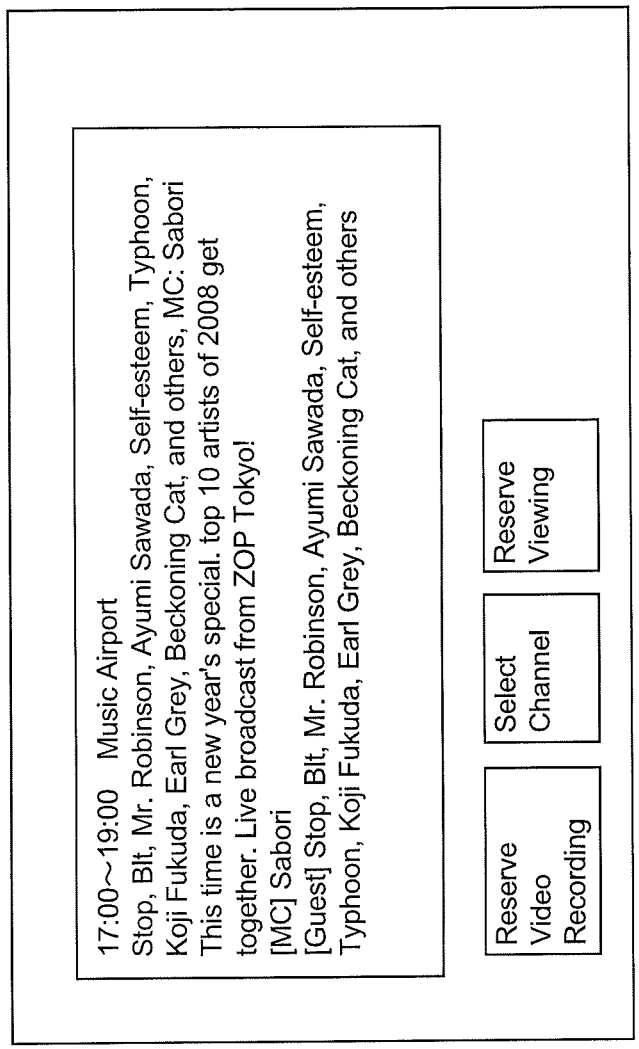
FIG. 26 is a diagram showing an example 2 of the prize information display screen displayed on the display apparatus shown in FIG. 15.

Step S1407: the control unit 1032 displays the program information as shown in FIG. 26, and then ends the prize information display processing (END).

When the prize information is present in step S1405, an icon of present as shown in FIG. 10 may be displayed, and when the icon is selected, details of the prize information (present information) as shown in FIG. 11 may be displayed.

By the display processing described above, it is possible for a user or viewer to easily know the presence or absence of the prize information of the program displayed on the EPG screen as well as detailed prize information. Such information motivates the viewer to watch the program, so the information can contribute to increasing viewer ratings of the program.

The information distribution systems 1000 and 1000A have been described as the exemplary embodiments of the present invention. The present invention is not limited to these, but various changes and modifications are possible without departing from the scope of the invention.

For example, if a program which needs to be applied in real-time is reserved for video recording, a pop-up screen for asking whether to switch the program to be reserved for viewing may be displayed.

When the EPG information from the broadcast station server 1070 includes a program with present, the broadcast reception apparatuses 1030, 1030A, and 1030B may perform OSD (On Screen Display) on the EPG information from the broadcast signal.

Programs with prize which will be broadcast within 24 hours from the current time may be displayed along with the prize names. In this case, the prize content may be hidden by the broadcast station server 1070, or may be disclosed.

The presence or absence of the prize information may be notified by sound or voice. Or, the presence or absence of the prize information may be notified during a broadcast of a program of broadcast signal. Specifically, the prize information may be run as a telop in the screen.

The broadcast reception apparatuses 1030, 1030A, and 1030B may notify the prize application and the lottery results in bidirectional communication with the broadcast station server 1070 via the IP communication network 1100.

The EPG information may be converted into contents data in the broadcast station server 1070 and the contents data may be browsed on the web without transmitting the EPG information.

All or part of functions of each unit described in the information distribution systems 1000 and 1000A according to the exemplary embodiments described above may be configured by a computer program, and the functions may be implemented by installing the computer program in an information processing apparatus (computer). The computer program can be directly installed in the computer from a medium in which the computer program is recorded in an executable state. The computer program may also be installed in a remote computer via a network.

Exemplary Embodiment 3

An information distribution system according to the exemplary embodiment 3 of the present invention will be described. The exemplary embodiment 3 according to the present invention is characterized by recording reservation processing of the broadcast reception apparatus when a program with prize is notified. The entire configuration of an information distribution system according to the exemplary embodiment 3 of the present invention is the same as that of the information distribution system 1000 according to the exemplary embodiment 1 of the present invention, so the description of each constituent element will be omitted. In the description below, an information distribution system, a broadcast station, a broadcast transmission apparatus, and a broadcast reception apparatus according to the exemplary embodiment 3 are respectively represented as an information distribution system 2000, a broadcast station 2010, a broadcast transmission apparatus 2011, and a broadcast reception apparatus 2030. The information distribution system 2000 may have a plurality of broadcast stations 2010 and three or more broadcast reception apparatuses 2030.

The configuration of the broadcast transmission apparatus 2011 included in the broadcast station 2010 of the information distribution system 2000 according to the exemplary embodiment 3 of the present invention is the same as that of the broadcast transmission apparatus 1011 included in the broadcast station 1010 of the information distribution system 1000 shown in FIG. 2, so the description of each constituent element will be omitted. In the description below, the constituent elements of the broadcast transmission apparatus 2011 according to the exemplary embodiment 3 are respectively represented as a control unit 2012, a contents stream generation unit 2013, an EPG information generation unit 2014, a data broadcast generation unit 2015, a MUX unit 2016, a broadcast contents DB 2017, a broadcast schedule DB 2018, and a data broadcast contents DB 2019.

The configuration of the broadcast reception apparatus 2030 in the information distribution system 2000 according to the exemplary embodiment 3 of the present invention is the same as that of the broadcast reception apparatus 1030 in the information distribution system 1000 shown in FIG. 3, so the description of each constituent element will be omitted. In the description below, the constituent elements of the broadcast reception apparatus 2030 according to the exemplary embodiment 3 are respectively represented as an operation input unit 2031, a control unit 2032, a tuner 2033, a DEMUX unit 2034, a decoder 2035, a video/sound output unit 2036, and a recording unit 2037. In the description below, a display apparatus and a sound reproduction apparatus according to the exemplary embodiment 3 of the present invention are respectively represented as a display apparatus 2050 and a sound reproduction apparatus 2060.

Prize information distribution processing and a data string of the prize information transmitted by the broadcast transmission apparatus 2011 included in the broadcast station 2010 of the information distribution system 2000 according to the exemplary embodiment 3 of the present invention are the same as the prize information distribution processing and the data string of the prize information transmitted by the broadcast transmission apparatus 1011 according to the exemplary embodiment 1 shown in FIGS. 4 and 5, so their drawings and description of each process will be omitted.

The broadcast data is distributed in this way, and thereby the presence or absence of prize information is included in the EPG information and distributed, so that a viewer can easily know information announced in the programs. In addition, the announcement information motivates the viewer to watch a program, so the announcement information can contribute to increasing viewer ratings of the program.

Figure 27:
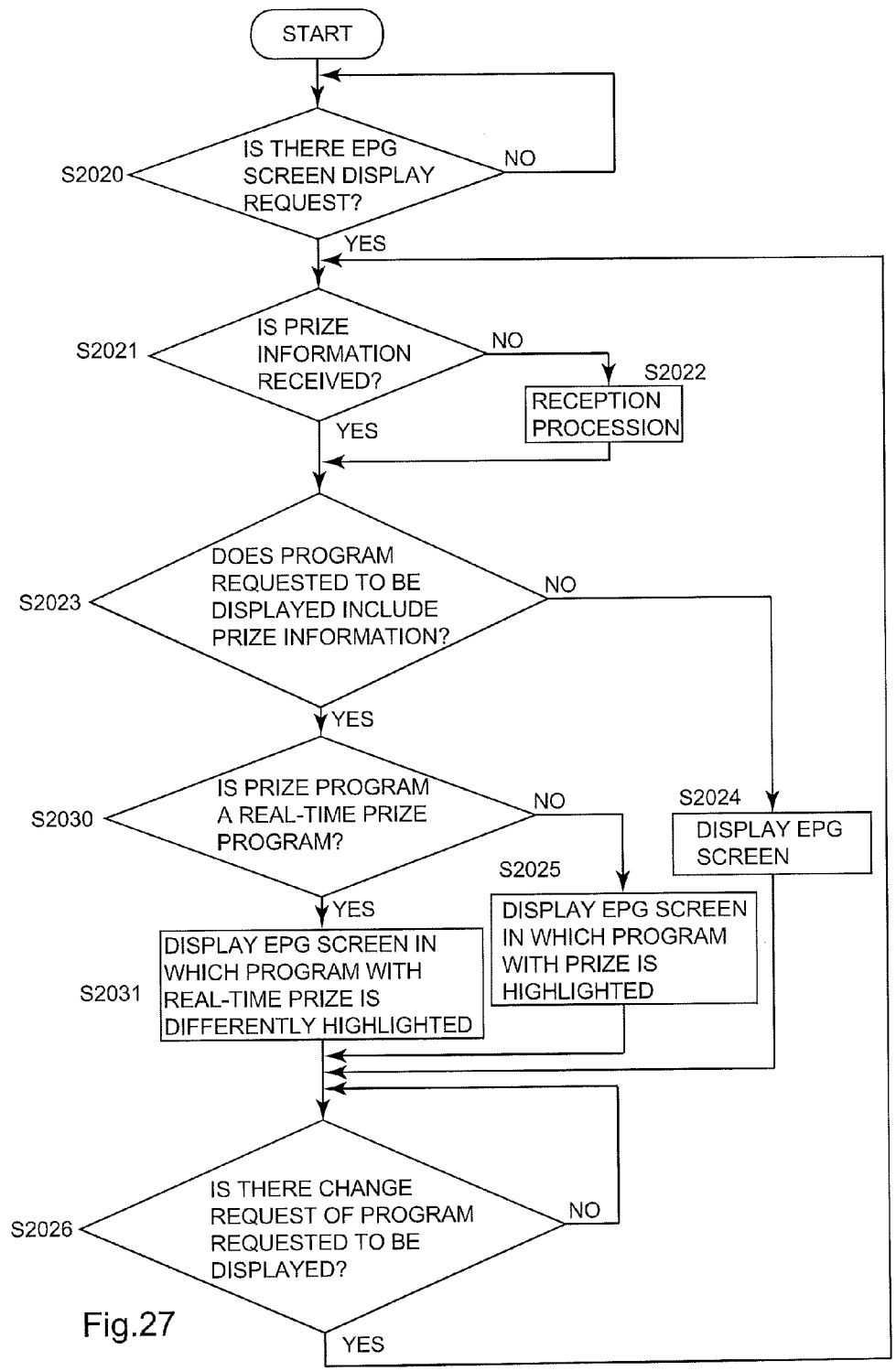
FIG. 27 is a flowchart of prize information display processing performed by a broadcast reception apparatus according to an exemplary embodiment 3 of the present invention.

FIG. 27 is a flowchart of prize information display processing 1 performed by the broadcast reception apparatus 2030 according to the exemplary embodiment 3 of the present invention.

START: the control unit 2032 starts prize information display processing when the power is turned on or a mode of the display processing is selected. After starting the prize information display processing, the control unit 2032 proceeds to the process of step S2020.

Step S2020: the control unit 2032 determines the presence or absence of an EPG screen display request. If the EPG screen display request is present (YES in step S2020), the control unit 2032 proceeds to the process of step S2021, and if the EPG screen display request is absent (NO in step S2020), the control unit 2032 repeats the determination process of step S2020.

Step S2021: the control unit 2032 determines whether or not the prize information is received. If the prize information is received (YES in step S2021), the control unit 2032 proceeds to the process of step S2023. If the prize information is not received (NO in step S2021), the control unit 2032 proceeds to the process of step S2022.

Step S2022: the control unit 2032 performs reception processing of the prize information, and then proceeds to the process of step S2023.

Step S2023: the control unit 2032 determines whether or not a program requested to be displayed includes prize information. Specifically, the control unit 2032 determines whether or not there is a prize program in a screen (broadcast type, broadcast station, and time slot requested to be displayed) displayed by the EPG information. If the program requested to be displayed includes prize information (YES in step S2023), the control unit 2032 proceeds to the process of step S2030, and if the program requested to be displayed includes no prize information (NO in step S2023), the control unit 2032 proceeds to the process of step S2024.

Step S2024: the control unit 2032 displays a normal EPG screen. When the process of step S2024 is completed, the control unit 2032 proceeds to the process of step S2026.

Step S2030: the control unit 2032 determines whether or not the application period of the prize information of the program has high real-time characteristics, such as, for example, the application period is limited to the airtime of the program. A real-time application prize program indicates a program in which the prize is applied at real-time by telephone, Internet, facsimile, and the like. Examples of the real-time application prize program include a program in which users answer quizzes, a program using questionnaire, and a program using request. The real-time prize program is a program where a user cannot apply to the prize if the user records video or sound of the program and enjoys the program afterward. A program applied by post mail postmarked on the day of the program or the next day of the program and a program that is not a real-time program but closes the application within 24 hours can be assumed to be a real-time prize program.

If the control unit 2032 determines that the prize announced in the program has high real-time characteristics (YES in step S2030), the control unit 2032 proceeds to the process of step S2031 and if the control unit 2032 determines that the prize announced in the program does not have high real-time characteristics (NO in step S2030), the control unit 2032 proceeds to the process of step S2025. When a normal prize program is highlighted, it is preferred that a real-time prize program is highlighted in a manner different from that of the normal prize program (for example, using different background color or icon).

Step S2025: the control unit 2032 displays an EPG information screen in which a program with prize is highlighted. Specifically, the control unit 2032 uses an icon to indicate a program with prize or changes background color of the program on the EPG screen. When the process of step S2025 is completed, the control unit 2032 proceeds to the process of step S2026.

Step S2026: the control unit 2032 determines the presence or absence of a display program change request. Specifically, the control unit 2032 determines the presence or absence of a change of displayed time slot, a change of date, a change of the broadcast station 2010, or a change of the program. If the display program change request is present (YES in step S2026), the control unit 2032 proceeds to the process of step S2023, and if the display program change request is absent (NO in step S2026), the control unit 2032 repeats the determination process of step S2026.

Step S2301: the control unit 2032 displays an EPG screen in which a field of the program, which is determined to be a prize program having high real-time characteristics in step S2030, is highlighted. When the process of step S2031 is completed, the control unit 2032 proceeds to the process of step S2026. It is preferred that display setting of the highlighted display of the program field with prize having high real-time characteristics is different from that of a highlighted display of a program field with prize that does not have high real-time characteristics.

By the display processing described above, a program with prize information is highlighted in the EPG screen, so that the viewer can grasp the presence or absence of prize information at a glance. Therefore, the viewer can easily know information announced in programs. In particular, by turning the viewer's attention to prize information having high real-time characteristics, the viewer tends to view the program including prize information, so the prize information display processing can contribute to increasing viewer ratings of the program.

Next, the prize information display processing 2 of the broadcast reception apparatus 2030 will be described. In this prize information display processing, the display processing is performed based on user setting information set by a user in advance. The user setting processing performed by the broadcast reception apparatus 2030 according to the exemplary embodiment 3 of the present invention is the same as that performed by the broadcast reception apparatus 1030 according to the exemplary embodiment 1 shown in FIG. 7, so the drawing and description thereof will be omitted. By the user setting processing described above, it is possible to set a user-desired display method of a program having prize information in the EPG screen, and to secure operability and visibility suitable to the user. Further, setting environments of different users can be stored respectively.

Figure 28:
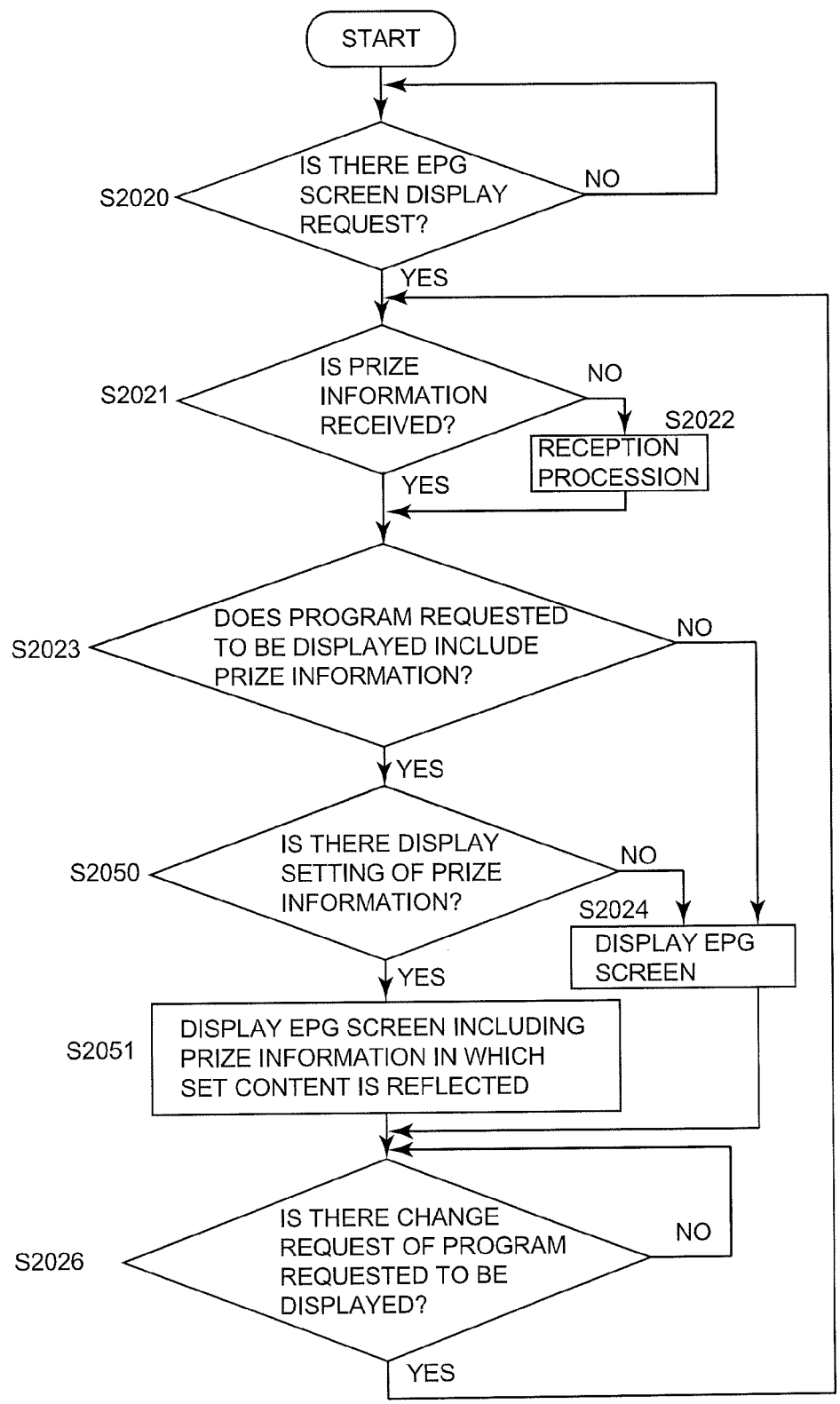
FIG. 28 is a flowchart of screen display processing in which user setting processing is reflected and which is performed by the broadcast reception apparatus according to the exemplary embodiment 3 of the present invention.

Next, the prize information display processing based on the user setting information will be described. FIG. 28 is a flowchart of screen display processing in which user setting processing is reflected and which is performed by the broadcast reception apparatus according to the exemplary embodiment 3 of the present invention. The same processes as those in the prize information display processing in FIG. 27 (START, steps S2020, S2021, S2022, S2023, S2024, and S2026 in FIG. 28) are given the same step numbers as those in FIG. 27, and the description thereof will be omitted.

Step S2050: when a program requested to be displayed includes prize information in step S2023, the control unit 2032 determines the presence or absence of the display setting information of the prize information. If the display setting information of the prize information is present (YES in step S2050), the control unit 2032 proceeds to the process of step S2051, and if the display setting information of the prize information is absent (NO in step S2050), the control unit 2032 proceeds to the process of step S2024. For example, the presence or absence of the display setting information of the prize information can be determined by the presence or absence of a display setting file of the prize information stored in the user setting processing described in FIG. 9.

Step S2051: the control unit 2032 displays an EPG screen including the prize information in which the set content is reflected, and ends the prize information display processing (END). Specifically, the control unit 2032 displays a mark of the prize information on the EPG screen or highlights the prize information by changing background color of a program including the prize information. It is possible to divide a detailed information display screen of each program into two screens and use one screen for explaining the program and the other screen for displaying the prize information.

By the display processing described above, the prize information is displayed according to the display method set in advance by the user from the operation input unit 2031 or the like, so that it is possible to secure operability and visibility suitable to the user.

Figure 29:
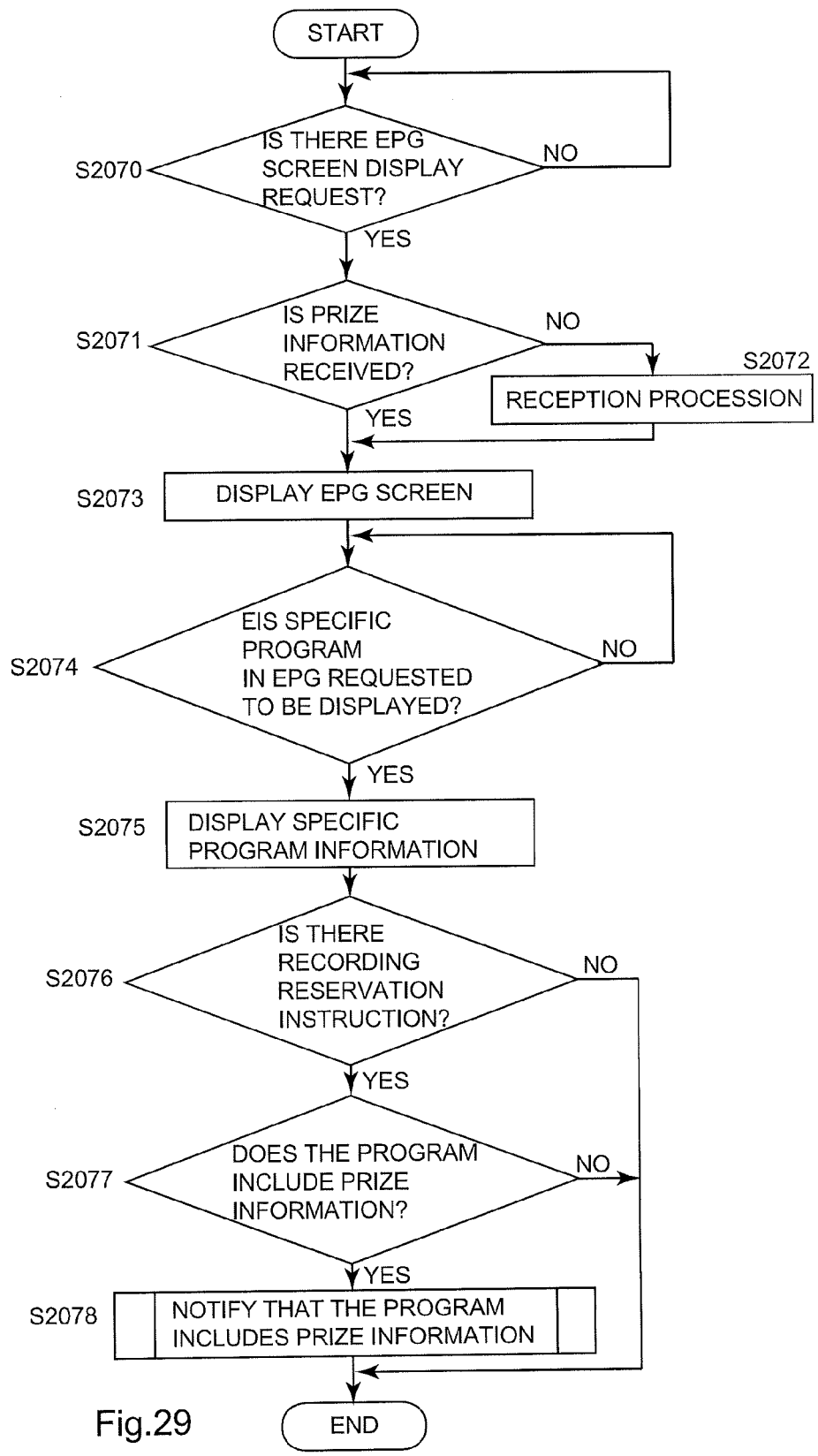
FIG. 29 is a flowchart of EPG screen display processing 1 performed by the broadcast reception apparatus according to the exemplary embodiment 3 of the present invention.

FIG. 29 is a flowchart of EPG screen display processing 1 performed by the broadcast reception apparatus 2030 according to the exemplary embodiment 3 of the present invention. In the EPG screen display processing 1 shown in FIG. 29, a prize program can be displayed and reserved for recording. "Reserved for recording" and "recording reservation" are words meaning recording reservation of image information such as TV broadcast as well as recording reservation of sound information such as radio broadcast.

START: when an EPG screen display mode is selected, the control unit 2032 starts the EPG screen display processing. After starting the EPG screen display processing, the control unit 2032 proceeds to the process of step S2070.

Step S2070: the control unit 2032 determines the presence or absence of an EPG screen display request. If the EPG screen display request is present (YES in step S2070), the control unit 2032 proceeds to the process of step S2071. If the EPG screen display request is absent (NO in step S2070), the control unit 2032 repeats the process of step S2070.

Step S2071: the control unit 2032 determines whether or not the prize information is received. If the prize information is received (YES in step S2071), the control unit 2032 proceeds to the process of step S2073. If the prize information is not received (NO in step S2071), the control unit 2032 proceeds to the process of step S2072.

Step S2072: the control unit 2032 performs reception processing of the prize information, and then proceeds to the process of step S2073.

Step S2073: the control unit 2032 displays an EPG screen, and then proceeds to the process of step S2074.

Step S2074: the control unit 2032 determines the presence or absence of a display request of a specific program in the EPG information. If a specific program in the EPG information is requested to be displayed (YES in step S2074), the control unit 2032 proceeds to the process of step S2075. If no specific program in the EPG information is requested to be displayed (NO in step S2074), the control unit 2032 repeats the process of step S2074.

Step S2075: the control unit 2032 displays the specific program selected in the process of step S2074, and then proceeds to the process of step S2076.

Step S2076: the control unit 2032 determines the presence or absence of a recording reservation instruction for the specific program displayed in the process of step S2075. If the recording reservation instruction for the specific program displayed in the process of step S2075 is present (YES in step S2076), the control unit 2032 proceeds to the process of step S2077. If the recording reservation instruction for the specific program displayed in the process of step S2075 is absent (NO in step S2076), the control unit 2032 ends the processing (END).

Step S2077: if the recording reservation instruction is present in the process of step S2076, the control unit 2032 determines whether or not the program reserved for recording includes prize information. If the program reserved for recording includes prize information (YES in step S2077), the control unit 2032 proceeds to the process of step S2078. If the control unit 2032 determines that the program reserved for recording includes no prize information (NO in step S2077), the control unit 2032 ends the processing (END).

Step S2078: if the result of the process of step S2077 is YES, the control unit 2032 notifies the user that the program reserved for recording includes prize information, and then ends the processing (END).

By the EPG screen display processing 1 described above, it is possible to notify the user whether or not the program reserved for recording includes prize information, so the possibility that the user fails to make a recording reservation of the program including prize information can be significantly reduced.

Figure 30:
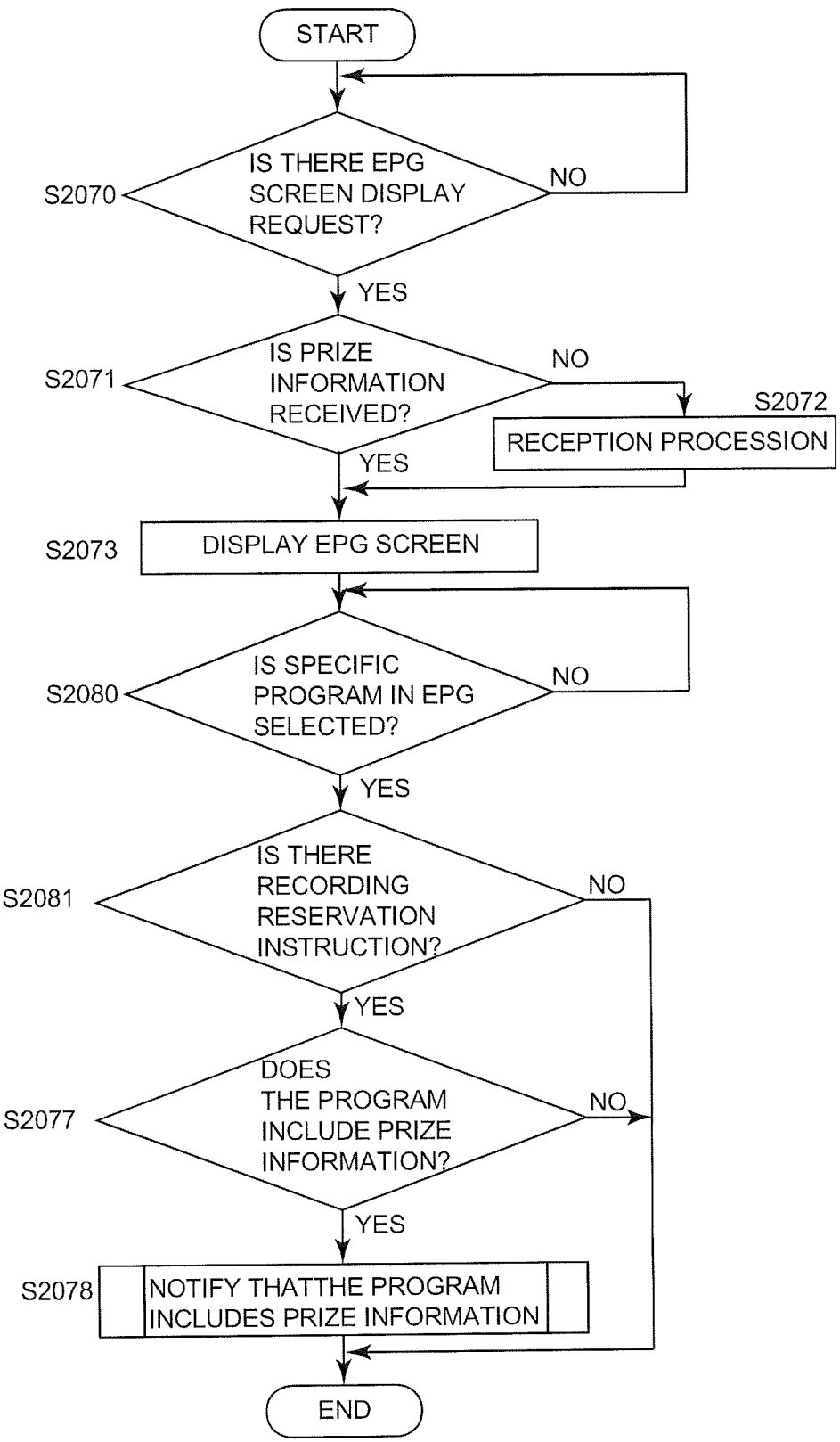
FIG. 30 is a flowchart of EPG screen display processing 2 performed by the broadcast reception apparatus according to the exemplary embodiment 3 of the present invention.

FIG. 30 is a flowchart of EPG screen display processing 2 performed by the broadcast reception apparatus 2030 according to the exemplary embodiment 3 of the present invention. In the EPG screen display processing 2 shown in FIG. 30, a prize program can be reserved for recording. The difference between the EPG screen display processing 2 and the EPG screen display processing 1 shown in FIG. 29 is whether the specific program is displayed or not. The same processes as those in the EPG screen display processing 1 in FIG. 29 (START, steps S2070, S2071, S2072, S2073, and S2078 in FIG. 30) are given the same step numbers as those in FIG. 29, and the description thereof will be omitted.

Step S2080: if a specific program in the EPG information is selected (YES in step S2080), the control unit 2032 proceeds to the process of step S2081. If no specific program in the EPG information is not selected (NO in step S2080), the control unit 2032 repeats the process of step S2080.

Step S2081: the control unit 2032 determines the presence or absence of a recording reservation instruction for the specific program selected in the process of step S2080. If the recording reservation instruction for the specific program selected in the process of step S2080 is present (YES in step S2081), the control unit 2032 proceeds to the process of step S2077. If the recording reservation instruction for the specific program selected in the process of step S2080 is absent (NO in step S2081), the control unit 2032 ends the processing (END).

By the EPG screen display processing described above, it is possible to notify the user whether or not the program reserved for recording includes prize information, so the possibility that the user fails to make a recording reservation of the program including prize information can be significantly reduced.

Figure 31:
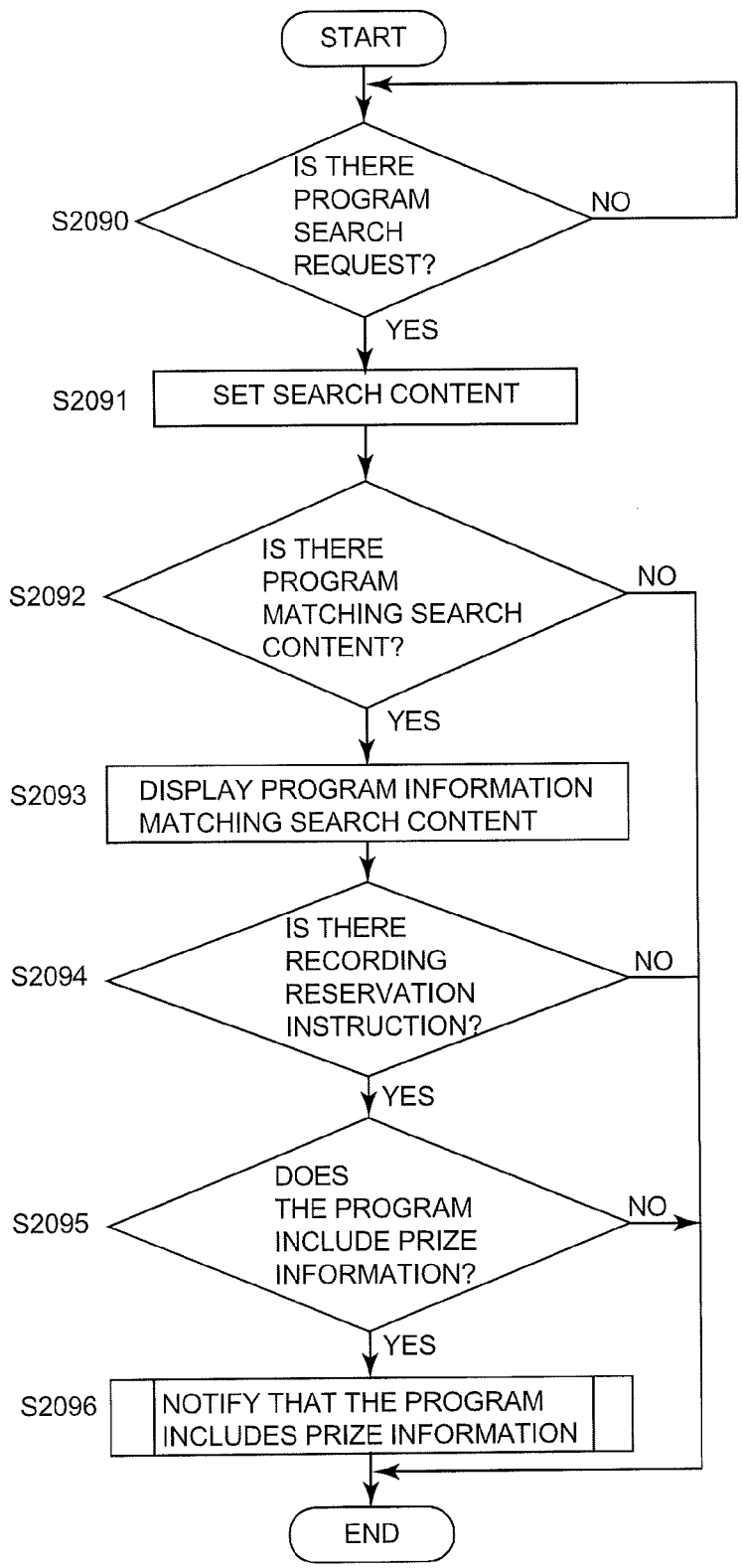
FIG. 31 is a flowchart of program search processing performed by the broadcast reception apparatus according to the exemplary embodiment 3 of the present invention.

FIG. 31 is a flowchart of program search display processing performed by the broadcast reception apparatus 2030 according to the exemplary embodiment 3 of the present invention. The program search display processing shown in FIG. 31 is different from the processing described above in a point that only a program matching a search condition is searched and displayed.

START: the control unit 2032 starts the program search display processing when a program search display mode is selected. After starting the program search display processing, the control unit 2032 proceeds to the process of step S2090.

Step S2090: the control unit 2032 determines the presence or absence of a program search request. If the program search request is present (YES in step S2090), the control unit 2032 proceeds to the process of step S2091. If the program search request is absent (NO in step S2090), the control unit 2032 repeats the process of step S2090.

Step S2091: the control unit 2032 sets search content inputted by the user, and then proceeds to the process of step S2092. If the user does not input search content, the control unit 2032 sets default search content.

Step S2092: the control unit 2032 determines the presence or absence of a program matching the search content. If a program matching the search content is present (YES in step S2092), the control unit 2032 proceeds to the process of step S2093. If a program matching the search content is absent (NO in step S2092), the control unit 2032 ends the processing (END).

Step S2093: the control unit 2032 displays program information matching the search content, and then proceeds to the process of step S2094.

Step S2094: the control unit 2032 determines the presence or absence of a recording reservation instruction for the program information displayed in the process of step S2093. If the recording reservation instruction for the program information displayed in the process of step S2093 is present (YES in step S2094), the control unit 2032 proceeds to the process of step S2095. If the recording reservation instruction for the program information displayed in the process of step S2093 is absent (NO in step S2094), the control unit 2032 ends the processing (END). It is preferred to set an appropriate determination period from when the process proceeds from step S2093 to step S2094 to when the control unit 2032 determines that the recording reservation instruction is absent.

Step S2095: if the recording reservation instruction is present in the process of step S2094 (YES in step S2094), the control unit 2032 determines whether or not the program assigned by the recording reservation instruction includes prize information. If the program includes prize information (YES in step S2095), the control unit 2032 proceeds to the process of step S2096. If the program includes no prize information (NO in step S2095), the control unit 2032 ends the processing (END).

Step S2096: the control unit 2032 notifies (shows) the user that the program determined in the process of step S2095 includes prize information, and then ends the processing (END).

By the program search display processing 1 described above, it is possible to select and display only a program matching a search condition and display the presence or absence of prize information of the program, so the possibility that the user fails to make a recording reservation of the program including prize information can be significantly reduced.

Figure 32:
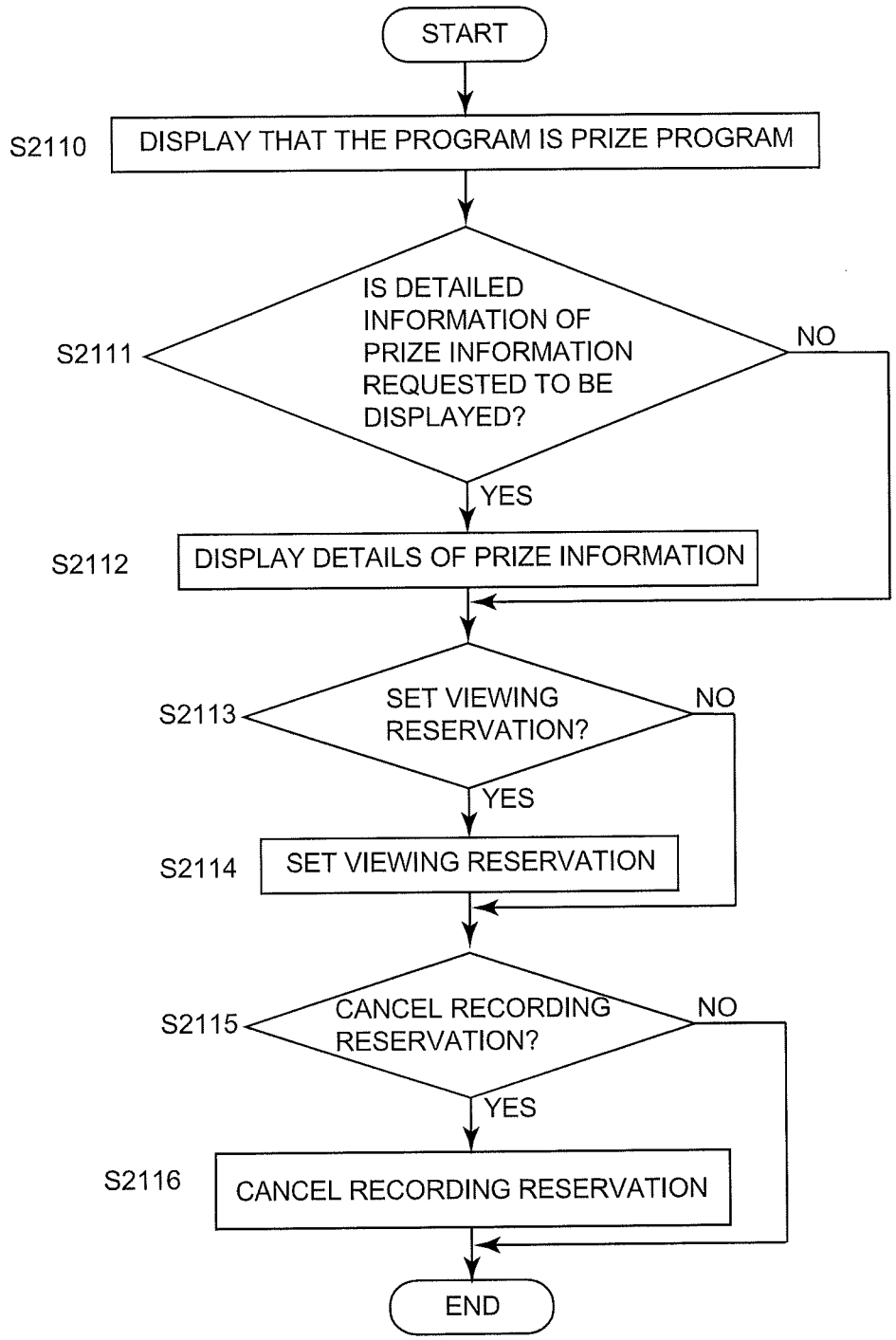
FIG. 32 is a flowchart of prize program display processing 1 performed by the broadcast reception apparatus according to the exemplary embodiment 3 of the present invention.

FIG. 32 is a flowchart of prize program display processing performed by the broadcast reception apparatus 2030 according to the exemplary embodiment 3 of the present invention. The prize program display processing shown in FIG. 32 is details of the processes of step S2078 in FIGS. 29 and 30 and step S2096 in FIG. 31.

START: the control unit 2032 starts the prize program display processing in the processes of step S2078 in FIGS. 29 and 30 and in the process of step S2096 in FIG. 31. After starting the prize program display processing, the control unit 2032 proceeds to the process of step S2110.

Step S2110: the control unit 2032 displays that the program is a prize program, and then proceeds to the process of step S2111.

Step S2111: the control unit 2032 determines the presence or absence of a display request of detailed information of the prize information. If the display request of detailed information of the prize information is present (YES in step S2111), the control unit 2032 proceeds to the process of step S2112. If the display request of detailed information of the prize information is absent (NO in step S2111), the control unit 2032 proceeds to the process of step S2113.

Step S2112: the control unit 2032 displays the details of the prize information, and then proceeds to the process of step S2113.

Step S2113: the control unit 2032 determines the presence or absence of a viewing reservation setting of the program. If the viewing reservation setting of the program is present (YES in step S2113), the control unit 2032 proceeds to the process of step S2114. If the viewing reservation setting of the program is absent (NO in step S2113), the control unit 2032 proceeds to the process of step S2115.

Step S2114: the control unit 2032 reserves the program for viewing, and then proceeds to the process of step S2115. The control unit 2032 determines that the program reserved for viewing is reserved for recording as well.

Step S2115: the control unit 2032 determines whether or not to cancel the recording reservation of the program. If canceling the recording reservation (YES in step S2115), the control unit 2032 proceeds to the process of step S2116. If maintaining the recording reservation (NO in step S2115), the control unit 2032 ends the processing (END). Although a process whether or not to cancel the recording reservation is performed in step S2115, the recording reservation may not be determined in the recording reservation processing in FIGS. 29, 30, and 31, and the recording reservation may be determined instead of the process of step S2115.

Step S2116: the control unit 2032 cancels the video recording reservation of the program, and then ends the processing (END).

By the prize program display processing described above, the possibility that the user fails to make a recording reservation of the program including prize information can be significantly reduced. Further, it is possible to reliably and easily select whether to perform the viewing reservation and the recording reservation at the same time or to perform only the viewing reservation.

Figure 33:
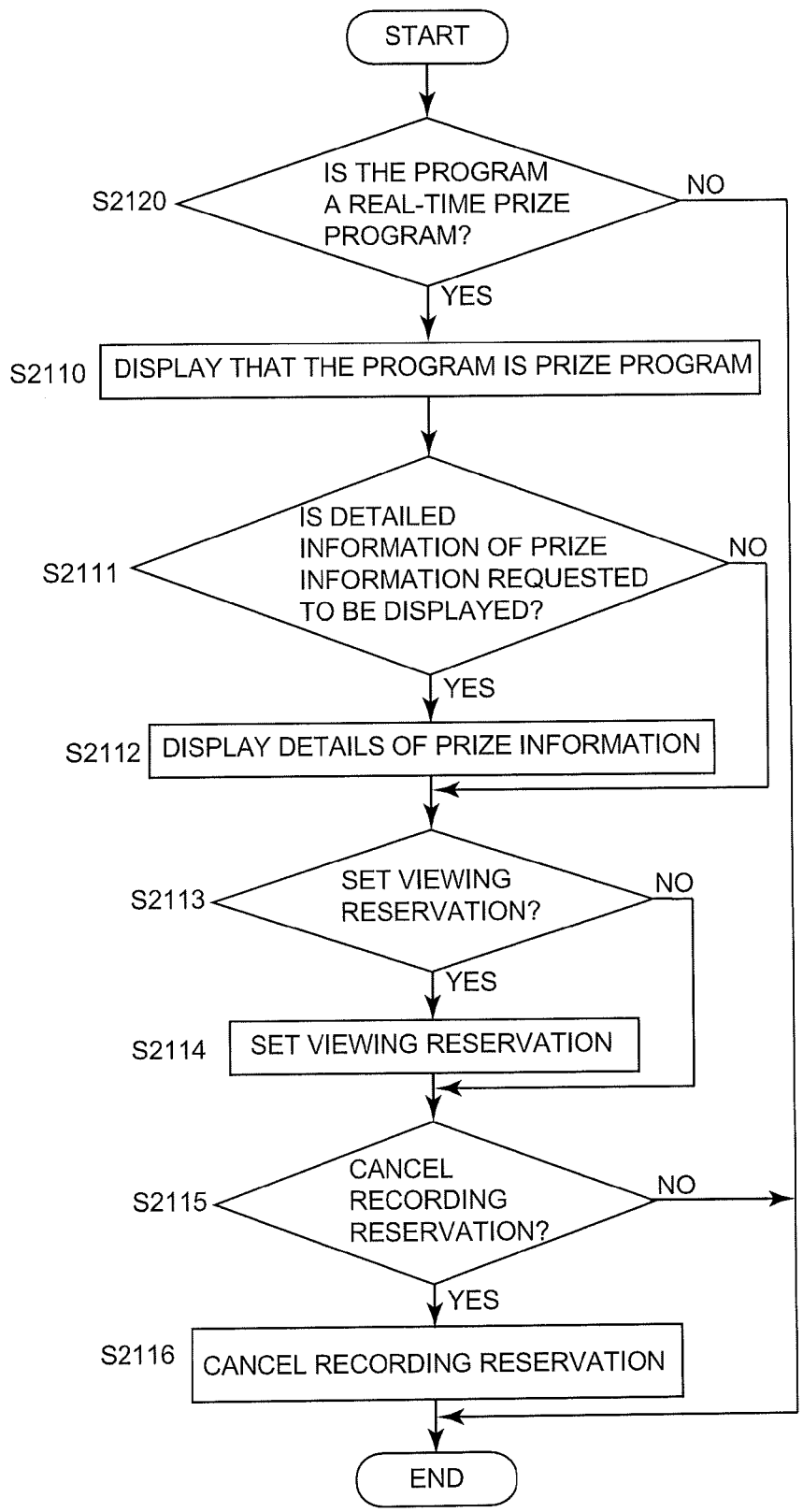
FIG. 33 is a flowchart of prize program display processing 2 performed by the broadcast reception apparatus according to the exemplary embodiment 3 of the present invention.

FIG. 33 is a flowchart of real-time prize program display processing performed by the broadcast reception apparatus 2030 according to the exemplary embodiment 3 of the present invention. The real-time prize program display processing shown in FIG. 33 is details of the processes of step S2078 in FIGS. 29 and 30 and the process of step S2096 in FIG. 31, and is an example corresponding to a real-time prize program.

Specifically, the control unit 2032 can switch the processing of FIG. 32 and the processing of FIG. 33 regarding the processes of step S2078 in FIGS. 29 and 30 and the process of step S2096 in FIG. 31 depending on whether the program is a real-time prize program or not. In this case, the control unit 2032 determines whether the program is a real-time prize program or not. If the program is a real-time prize program (YES in step S2120), the control unit 2032 performs processes (steps S2110 to S2116) described in FIG. 32. If the program is not a real-time prize program (NO in step S2120), the control unit 2032 ends the processing (END). In FIG. 33, in the prize information details display processing in step S2112, the control unit 2032 displays that the program is a real-time prize program.

By the real-time prize program display processing described above, the possibility that the user fails to make a viewing reservation of the program including real-time prize information can be significantly reduced. Further, it is possible to reliably and easily select whether to perform the viewing reservation and the recording reservation at the same time or to perform only the viewing reservation.

A screen display example 1 displayed on the display apparatus 2050 according to the exemplary embodiment 3 of the present invention is the same as the screen example 1 displayed on the display apparatus 1050 according to the exemplary embodiment 1, so the screen display example 1 will be described with reference to FIG. 9. The screen example shown in FIG. 9 is, for example, the screen displayed in step S2024 in FIG. 27 described above, and is an EPG screen displayed in a format of radio/TV section of a newspaper. At the left end portion of the EPG screen, the type of broadcast being received is highlighted, and the other broadcast types are grayed out. At the above right of the program guide, the current date and time are displayed. In the present exemplary embodiment, a program guide of four broadcast stations 2010 is displayed. In this program guide, the program "Discover the 7 Wonders of Japan!" of "Tokyo BC", which is one of the broadcast stations, at 17 o'clock-19 o'clock has prize information, so the program is highlighted. Only the prize information may be displayed in the program guide without highlighting the program.

FIG. 34 is a diagram showing a screen display example 2 displayed on the display apparatus 2050 shown in FIG. 32. The screen display example 2 corresponds to the process of step S2075 "display specific program information" in FIG. 29. The screen shown in FIG. 34 shows an example in which "Discover the 7 Wonders of Japan!" is selected in the program guide of FIG. 9 (a selected program in the program guide is moved by direction keys, and a decision key is pressed). In FIG. 34, detailed program information of "Discover the 7 Wonders of Japan!" is displayed. By pressing the down direction key and scrolling the screen, information that cannot be displayed in the screen can be displayed.

In FIG. 34, the application method is displayed as well. In FIG. 34, a reserve video recording button, a select channel button, a reserve viewing button, and a present button are displayed. When the reserve video recording button is pressed, the program is recorded (reserved to be recorded). When the select channel button is pressed, the channel is switched to the broadcast station to perform display. If the reserve viewing button is pressed subsequently, a control for switching the channel when the program starts is performed. When the Present button is pressed, the prize information is extracted, and specialized information is displayed.

In the screen display example of FIG. 34, the operation of pressing the buttons on the screen is pressing the direction keys on the operation input unit 2031 to select a button on the screen, and then pressing the decision button on the operation input unit 2031. If the operation input unit 2031 is a touch panel arranged on the screen, it is possible to directly press a button displayed on the screen by a finger.

FIG. 35 is a diagram showing a screen display example 3 displayed on the display apparatus 2050. The screen display example 3 corresponds to the process of step S2112 "display details of prize information" in FIG. 33. FIG. 35 shows the prize information when the Present button is pressed. The prize information says "This program includes a real-time prize" to indicate that a real-time prize is included in the program.

FIG. 36 is a diagram showing a screen display example 4 displayed on the display apparatus 2050. The screen display example 4 corresponds to the process of step S2073 "display EPG screen" in FIG. 30. FIG. 36 is an EPG screen displayed in a format of radio/TV section of a newspaper, which is described with reference to FIG. 9. Processing that is started when each of "red", "blue", "yellow", "green", and "decision" buttons is pressed is displayed below the EPG screen. When the "red" button is pressed, "reserve video recording" is started. When the "blue" button is pressed, "channel selection" is started. When the "yellow" button is pressed, "viewing reservation" is started. When the "green" button is pressed, a program including a "present", which is a prize, is highlighted. When the "decision" button is pressed, detailed information of a program which is indicated by a cursor or highlighted is displayed.

FIG. 37 is a diagram showing a screen display example 5 displayed on the display apparatus 2050. The screen display example 5 corresponds to the process of step S2112 "display details of prize information" in FIG. 33. FIG. 37 shows a result when the green button (=present button) is pressed on the EPG screen displayed in a format of radio/TV section of a newspaper, which is described in FIG. 36. Thereby, "This program includes a real-time prize" is displayed as detailed information related to the program "Discover the 7 Wonders of Japan!" highlighted in FIG. 36.

Figure 38:
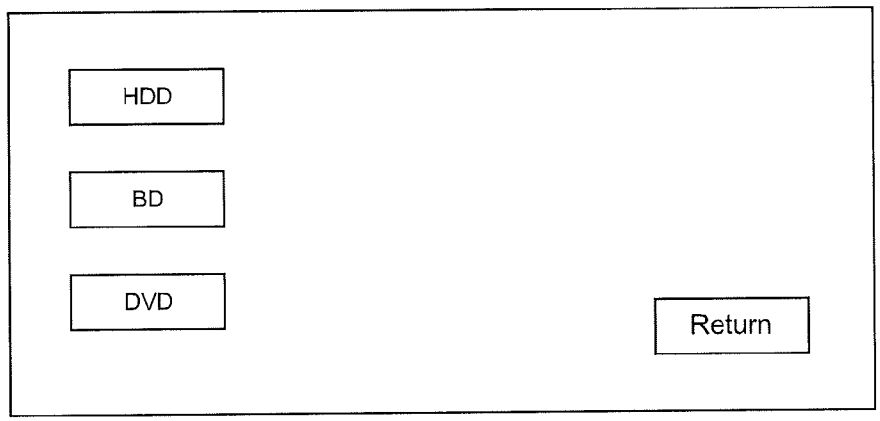
FIG. 38 is a diagram showing a screen display example 7 displayed on the display apparatus of the exemplary embodiment 3 of the present invention.

FIG. 38 is a screen display example when the "red" button (=reserve video recording button) is pressed in FIGS. 34 and 36. In the screen display example of FIG. 38, types of recording destination media (HDD: Hard Disc Drive, BD: Blue lay Disc, and DVD) are displayed. In the screen display example of FIG. 38, a recording destination medium is decided by a key operation (not shown in the drawings) on the operation input unit 2301. The screen display example of FIG. 38 is switched to a screen display example of FIG. 39 by an operation of the decision key. If the operation input unit 2031 is a touch panel, a button on the screen is directly pressed by a finger or the like.

Figure 39:
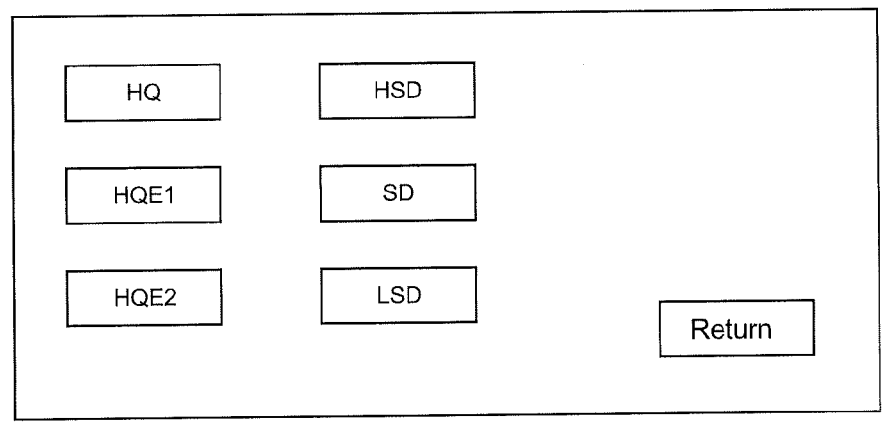
FIG. 39 is a diagram showing the screen display example 7 displayed on the display apparatus of the exemplary embodiment 3 of the present invention.

In the screen display example of FIG. 39, types of recording qualities (HQ: High Quality, HQE1: High Quality E1, HQE2: High Quality E2, HSD: High Standard, SD: Standard, and LSD: Low Standard) are displayed. In the screen display example of FIG. 39, a type of recording quality is decided by a key operation (not shown in the drawings) on the operation input unit 2301. The screen display example of FIG. 39 is switched to a screen display example of FIG. 40 by an operation of the decision key or the like. If the operation input unit 2031 is a touch panel, a button on the screen is directly pressed by a finger or the like.

Figure 40:
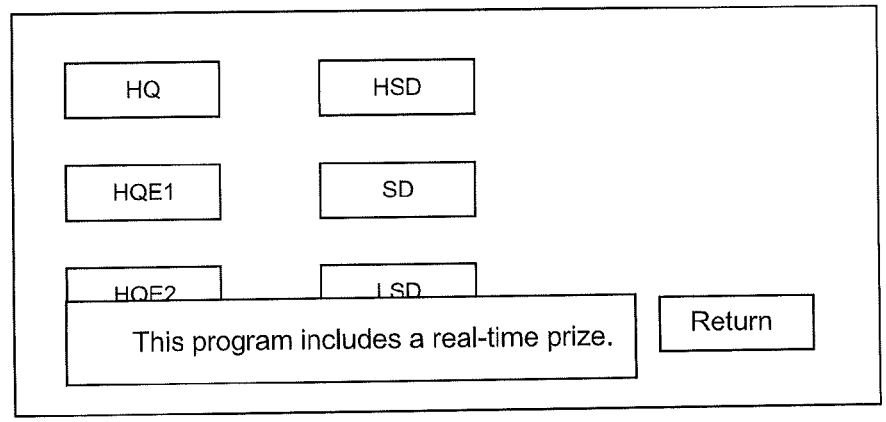
FIG. 40 is a diagram showing the screen display example 7 displayed on the display apparatus of the exemplary embodiment 3 of the present invention.

In the screen display example of FIG. 40, information is displayed that indicates the program being set to be recorded is a prize program. In the screen display example of FIG. 40, a message "This program includes a real-time prize" is displayed. At this time, the screen is switched to a screen display example of FIG. 41 by an operation such as operating the decision key again or automatically after a predetermined period of time.

In the screen display example of FIG. 41, processing of "cancel reservation", "reserve viewing", or "end" can be selected for the processing of the video recording reservation in FIGS. 38, 39, and 40. To select processing, a button on the screen is selected by a key operation on the operation input unit 2031 and the decision button on the operation input unit 2031 is pressed. If the operation input unit 2031 is a touch panel, a button on the screen is directly pressed by a finger or the like.

When the "cancel reservation" is selected here, the video recording reservation is cancelled. When the "reserve viewing" is selected, the viewing reservation is set as well as the video recording reservation. To complete the video recording reservation, the "end" is selected.

FIG. 42 is a diagram showing a screen display example 8 displayed on the display apparatus 2050. The screen display example 8 corresponds to the process of step S2091 "set search content" in FIG. 31. FIG. 42 is a screen display example when a search button (not shown in the drawings) on the operation input unit 2031 is pressed while receiving a broadcast. Genres and keywords to be searched are displayed instead of the broadcast image displayed on the full screen. When the search button is pressed again, as shown in a screen display example of FIG. 43, a search result is displayed in a list format. The screen display example of FIG. 43 corresponds to the process of step S2093 "display matched program information" in FIG. 37. From the screen display example of FIG. 43, it is found that "Discover the 7 Wonders of Japan!" includes prize and "Sunday Music" is reserved for video recording.

As described above, the information distribution system 2000 according to the exemplary embodiment 3 of the present invention performs broadcast including prize information, so that it is possible for a viewer or user to easily grasp a program with prize. Thereby, as a merit of the broadcast station, it is possible to acquire new viewers whose aim is prize and increase chances of viewing. As a merit of the user, it is possible to easily grasp programs with prize from the EPG information, so that the user can easily find a program which offers a present and watch the program or record and reproduce the program. Further, the user can easily grasp what present is offered in the program. Furthermore, the user can grasp whether the program is a real-time prize program or not, so that the user can select whether the user watches the program real-time or records the program and watches the recorded program.

A modified example of the broadcast transmission apparatus 2011 according to the exemplary embodiment 3 described above will be described. The modified example of the broadcast transmission apparatus 2011 generates and transmits prize information separately from the EPG information without transmitting prize information included in the EPG information. However, in this case, the prize information is not included in the EPG information, so the control unit reads data of the prize information after specifying a program based on the EPG information, and determines whether or not the program includes prize information. If the program includes prize information, the control unit can perform the recording reservation processing described in "exemplary embodiment 3" by acquiring the prize information.

By performing such distribution processing, in addition to the advantage of the broadcast transmission apparatus 2011 of the exemplary embodiment 3 described above, it is possible to multiplex the prize information with the broadcast data and distribute them to a broadcast reception apparatus even when the presence or absence of a prize in a program is not decided when the EPG information is generated or prize information is desired to be added after the EPG information is generated. Even when the prize information cannot be included in the EPG information, it is possible to multiplex the prize information with the broadcast data and distribute them to the broadcast reception apparatus.

Also in the exemplary embodiment 3 described above, as shown and described in FIGS. 18, 19, 22, and 24, the EPG information and the like may be transmitted via an IP communication network 2100.

Although the information distribution systems 2000 has been described as an exemplary embodiment of the present invention, the present invention is not limited to this, but various changes and modifications are possible without departing from the scope of the invention.

For example, if a program which needs to be applied in real-time is reserved for video recording, a pop-up screen for asking whether to switch the program to be reserved for viewing may be displayed.

When the EPG information from the broadcast station server 2070 includes a program with present, the broadcast reception apparatus 2030 may perform OSD (On Screen Display) on the EPG information from the broadcast signal.

Programs with prize which will be broadcast within 24 hours from the current time may be displayed along with the prize names. In this case, the prize content may be hidden by the broadcast server 2070, or may be disclosed.

The presence or absence of the prize information may be notified by sound or voice. Or, the presence or absence of the prize information may be notified during a broadcast of a program of broadcast signal. Specifically, the prize information may be run as a telop in the screen.

The broadcast reception apparatus 2030 may notify the prize application and the lottery results in bidirectional communication with the broadcast station server 2070 via the IP communication network 2100.

The EPG information may be converted into contents data in the broadcast station server 2070 and the contents data may be browsed on the web without transmitting the EPG information.

All or part of functions of each unit described in the information distribution system 2000 according to the exemplary embodiments described above and the modified example thereof may be configured by a computer program, and the functions may be implemented by installing the computer program in an information processing apparatus (computer). Although the computer program can be directly installed in the computer from a medium in which the computer program is recorded in an executable state, the computer program may be installed in a remote computer via a network.

Exemplary Embodiment 4

An information distribution system according to an exemplary embodiment 4 of the present invention will be described. The information distribution system according to the exemplary embodiment 4 is characterized by a process for searching a program with prize after the program with prize is notified. The entire configuration of the information distribution system according to the exemplary embodiment 4 of the present invention is the same as that of the information distribution system 1000 according to the exemplary embodiment 1 of the present invention. In the description below, an information distribution system, a broadcast station, a broadcast transmission apparatus, and a broadcast reception apparatus according to the exemplary embodiment 4 are respectively represented as an information distribution system 3000, a broadcast station 3010, a broadcast transmission apparatus 3011, and a broadcast reception apparatus 3030. The information distribution system 3000 may have a plurality of broadcast stations 3010 and three or more broadcast reception apparatuses 3030.

The configuration of the broadcast transmission apparatus 3011 included in the broadcast station 3010 of the information distribution system 3000 according to the exemplary embodiment 4 of the present invention is the same as that of the broadcast transmission apparatus 1011 included in the broadcast station 1010 of the information distribution system 1000 shown in FIG. 2, so the description will be omitted. In the description below, the constituent elements of the broadcast transmission apparatus 3011 according to the exemplary embodiment 4 are respectively represented as a control unit 3012, a contents stream generation unit 3013, an EPG information generation unit 3014, a data broadcast generation unit 3015, a MUX unit 3016, a broadcast contents DB 3017, a broadcast schedule DB 3018, and a data broadcast contents DB 3019.

The configuration of the broadcast reception apparatus 3030 in the information distribution system 3000 according to the exemplary embodiment 4 of the present invention is the same as that of the broadcast reception apparatus 1030 in the information distribution system 1000 shown in FIG. 3, so the description will be omitted. In the description below, the constituent elements of the broadcast reception apparatus 3030 according to the exemplary embodiment 4 are respectively represented as an operation input unit 3031, a control unit 3032, a tuner 3033, a DEMUX unit 3034, a decoder 3035, a video/sound output unit 3036, and a recording unit 3037. In the description below, a display apparatus and a sound reproduction apparatus are respectively represented as a display apparatus 3050 and a sound reproduction apparatus 3060. The broadcast reception apparatus 3030 according to the present embodiment is an individual apparatus separated from the display apparatus 3050 and the sound reproduction apparatus 3060. However, it is not limited to this, and the broadcast reception apparatus 3030, the display apparatus 3050, and the sound reproduction apparatus 3060 may be accommodated in the same housing. For example, the broadcast reception apparatus 3030 may be a television set. A configuration is possible in which the broadcast reception apparatus 3030 and the display apparatus 3050 are accommodated in the same housing and only the sound reproduction apparatus 3060 is accommodated in another housing. It should not be limited what apparatus the broadcast reception apparatus 3030, the display apparatus 3050, and the sound reproduction apparatus 3060 are provided in. The broadcast reception apparatus 3030 may have a video recording function and a sound recording function. The operation input unit 3031 is an example functioning as an electronic program information acquisition request unit and an announcement information acquisition request unit in the claims. The control unit 3032 is an example functioning as a part of an electronic program information acquisition unit, an announcement information acquisition unit, an announcement information output unit, and a program selection unit in the claims. The DEMUX unit 3034 is an example functioning as a part of the electronic program information acquisition unit, a part of the announcement information acquisition unit, and a part of the program selection unit in the claims. The decoder 3035 is an example functioning as a part of the announcement information output unit and a part of the program selection unit in the claims. The video/sound output unit 3036 is an example functioning as a part of the announcement information output unit in the claims.

A data string of prize information transmitted by the broadcast transmission apparatus 3011 according to the exemplary embodiment 4 of the present invention is the same as that of the prize information shown in FIG. 4, so the drawing and description thereof will be omitted. In the description below, the data string of prize information transmitted by the broadcast transmission apparatus 3011 according to the exemplary embodiment 4 will be described with reference to FIG. 4.

Broadcast distribution processing performed by the broadcast transmission apparatus 3011 according to the exemplary embodiment 4 of the present invention is the same as that shown in FIG. 5, so the drawing and description thereof will be omitted.

Figure 44:
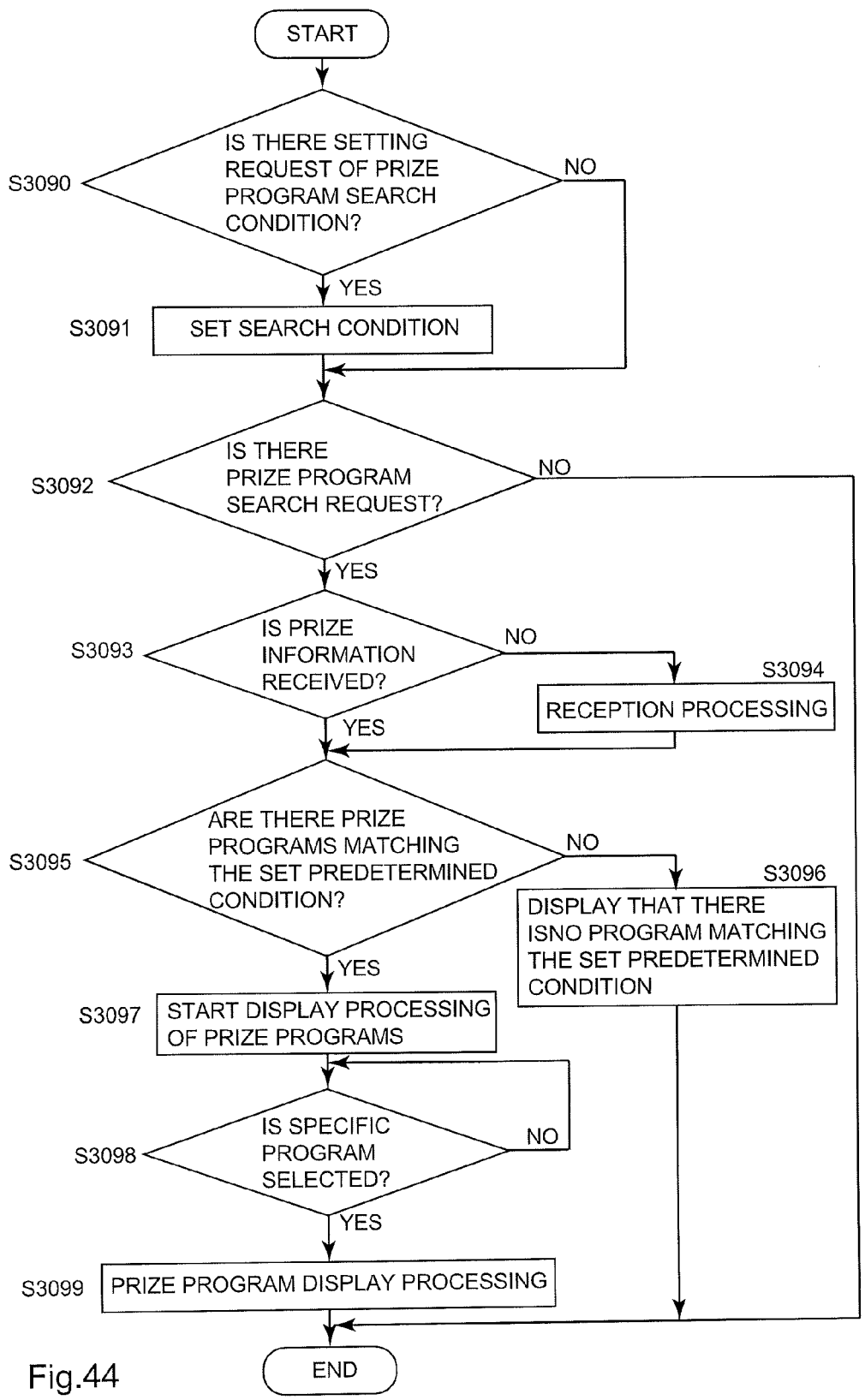
FIG. 44 is a flowchart of prize information search display processing performed by a broadcast reception apparatus of an exemplary embodiment 4 of the present invention.

FIG. 44 is a flowchart of prize program search display processing 1 performed by the broadcast reception apparatus 3030 of the exemplary embodiment 4 of the present invention. The prize program search display processing 1 shown in FIG. 44 is characterized in that a predetermined condition can be set when searching for only prize programs and displaying them.

The predetermined condition may be anything that can be identified from the prize information shown in FIG. 4. If whether or not a program is a real-time program is set as the predetermined condition, it is possible to search for real-time programs, or, on the contrary, it is possible to search for non-real-time programs. If an application method is set as the predetermined condition, it is possible to search for programs applied via phone and also it is possible to search for programs applied via Internet.

START: the control unit 3032 starts the prize program search display processing 1 when a prize program search display mode is selected. After starting the prize program search display processing 1, the control unit 3032 proceeds to the process of step S3090.

Step S3090: the control unit 3032 determines the presence or absence of a setting request of prize program search condition by a user. If the setting request of prize program search condition by a user is present (YES in step S3090), the control unit 3032 proceeds to the process of step S3091. If the setting request of prize program search condition by a user is absent (NO in step S3090), the control unit 3032 proceeds to the process of step S3092.

Step S3091: the control unit 3032 sets a search condition based on the setting request of prize program search condition by a user, and then proceeds to the process of step S3092.

Step S3092: the control unit 3032 determines the presence or absence of a prize program search request by a user. If the prize program search request by a user is present (YES in step S3092), the control unit 3032 proceeds to the process of step S3093, and if the prize program search request by a user is absent (NO in step S3092), the control unit 3032 ends the prize program search display processing 1 (END).

Step S3093: the control unit 3032 determines whether or not the prize information is received. If the prize information is received (YES in step S3093), the control unit 3032 proceeds to the process of step S3095. If the prize information is not received (NO in step S3093), the control unit 3032 proceeds to the process of step S3094.

Step S3094: the control unit 3032 performs reception processing of the prize information, and then proceeds to the process of step S3095. The reception processing is a waiting process until the prize information is received from a broadcast signal.

Step S3095: the control unit 3032 searches for prize programs matching the set predetermined condition from the EPG information. Specifically, the control unit 3032 further searches for data matching the set predetermined condition from among the programs including the prize information data shown in FIG. 4. If prize programs matching the set predetermined condition are present in the EPG information (YES in step S3095), the control unit 3032 proceeds to the process of step S3097, and if prize program matching the set predetermined condition is absent in the EPG information (NO in step S3095), the control unit 3032 proceeds to the process of step S3096.

Step S3096: the control unit 3032 displays that there is no prize information, and then ends the prize program search display processing 1 (END).

Step S3097: the control unit 3032 starts display processing for displaying only prize programs, and then proceeds to the process of step S3098. The display processing of step S3097 is a process for displaying programs, for example, in a list format so that the user can easily select a specific program.

Step S3098: the control unit 3032 determines whether or not the user selects a specific program which is one of the prize programs matching the set predetermined condition from the EPG information. The control unit 3032 waits until the user selects one of the prize programs (NO in step S3098). If the user selects a specific program which is one of the prize programs matching the set predetermined condition from the EPG information (YES in step S3098), the control unit 3032 proceeds to the process of step S3099. Examples of the predetermined condition include, at the time when the power is turned on, whether or not there is a today's prize program, whether or not there is a real-time prize program, whether or not there is prize information in which a product in a specific category is a prize product, and the like.

Step S3099: the control unit 3032 displays the prize program selected in step S3098, and then ends the prize program search display processing 1 (END).

By the prize program search display processing 1 described above, it is possible to select and display only programs including prize information matching the set predetermined condition in the EPG screen, so the possibility that the user fails to watch the programs can be significantly reduced. Only the programs desired by the user are selected and displayed, so that the user's convenience can be improved.

Figure 45:
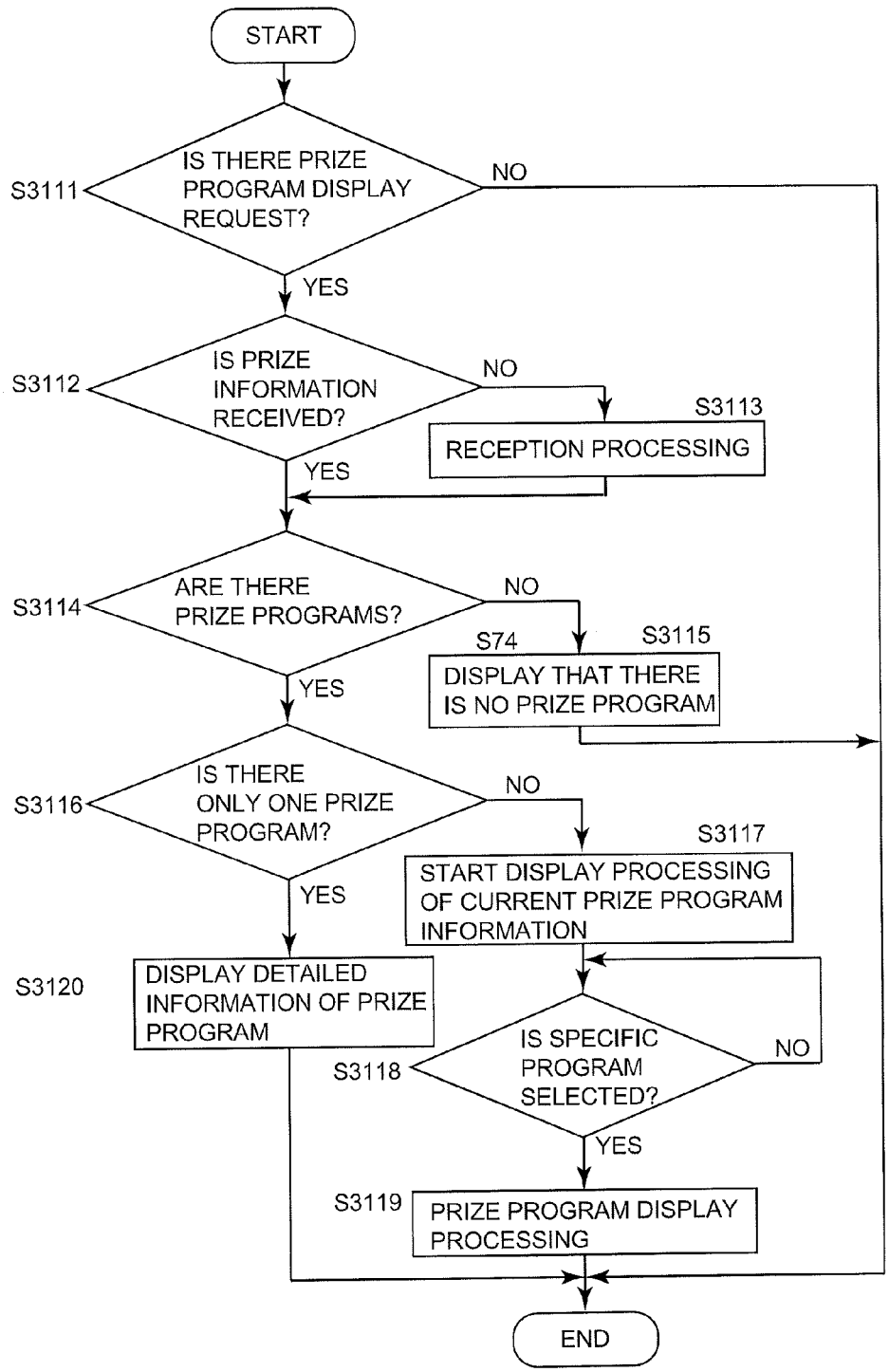
FIG. 45 is a flowchart of prize information search display processing performed by the broadcast reception apparatus of the exemplary embodiment 4 of the present invention.

FIG. 45 is a flowchart of prize program search display processing 2 performed by the broadcast reception apparatus 3030 of the exemplary embodiment 4 of the present invention. The prize program search display processing 2 shown in FIG. 45 is characterized in that, when only one prize program is searched, the detailed information thereof is displayed.

START: the control unit 3032 starts the prize program search display processing 2 when a prize program search display mode is selected. After starting the prize program search display processing 2, the control unit 3032 proceeds to the process of step S3111.

Step S3111: the control unit 3032 determines the presence or absence of a prize program display request from a user. If the prize program display request from a user is present (YES in step S3111), the control unit 3032 proceeds to the process of step S3112. If the prize program display request from a user is absent (NO in step S3111), the control unit 3032 ends the prize program search display processing 2 (END).

Step S3112: the control unit 3032 determines whether or not the prize information is received. If the prize information is received (YES in step S3112), the control unit 3032 proceeds to the process of step S3114. If the prize information is not received (NO in step S3112), the control unit 3032 proceeds to the process of step S3113.

Step S3113: the control unit 3032 performs reception processing of the prize information, and then proceeds to the process of step S3114. The reception processing is a waiting process until the prize information is received from a broadcast signal.

Step S3114: the control unit 3032 determines the presence or absence of prize program from the EPG information. As a result, if the prize program is present (YES in step S3114), the control unit 3032 proceeds to the process of step S3116. If the prize program is absent (NO in step S3114), the control unit 3032 proceeds to the process of step S3115.

Step S3115: the control unit 3032 displays that there is no prize program, and then ends the prize program search display processing 2 (END).

Step S3116: the control unit 3032 determines the presence or absence of prize program searched in the process of step S3114. If there is only one prize program searched in the process of step S3114 (YES in step S3114), the control unit 3032 displays the detailed information of the prize program (step S3120), and then ends the prize program search display processing 2 (END). If there is a plurality of prize programs searched in the process of step S3114 (NO in step S3116), the control unit 3032 proceeds to the process of step S3117.

Step S3117: the control unit 3032 starts display processing of current prize program information, and then proceeds to the process of step S3118. The display processing of step S3117 is a process for displaying programs, for example, in a list format so that the user can easily select a specific program. In the display in a list format, for example, titles are displayed.

Step S3118: the control unit 3032 determines whether or not the user selects a current prize program from the EPG information. The control unit 3032 waits until the user selects one of the prize programs (NO in step S3118). If the user selects a current prize program from the EPG information (YES in step S3118), the control unit 3032 proceeds to the process of step S3119.

Step S3119: the control unit 3032 displays the prize program selected in step S3118, and then ends the prize program search display processing 2 (END).

By the prize program search display processing 2 described above, if there is only one program including current prize information, the detailed information of the program can be promptly displayed, so the possibility that the user fails to watch the program can be significantly reduced. Only the programs desired by the user are selected and displayed, so that the user's convenience can be improved. Although, in the present exemplary embodiment, displays are different between a case in which there is only one program including current prize information and a case in which there are a plurality of programs including current prize information, displays may be different between a case in which the number of the programs including current prize information is smaller than a predetermined number and a case in which the number of the programs is greater than or equal to the predetermined number. In that case, the predetermined number may be more than one.

Figure 46:
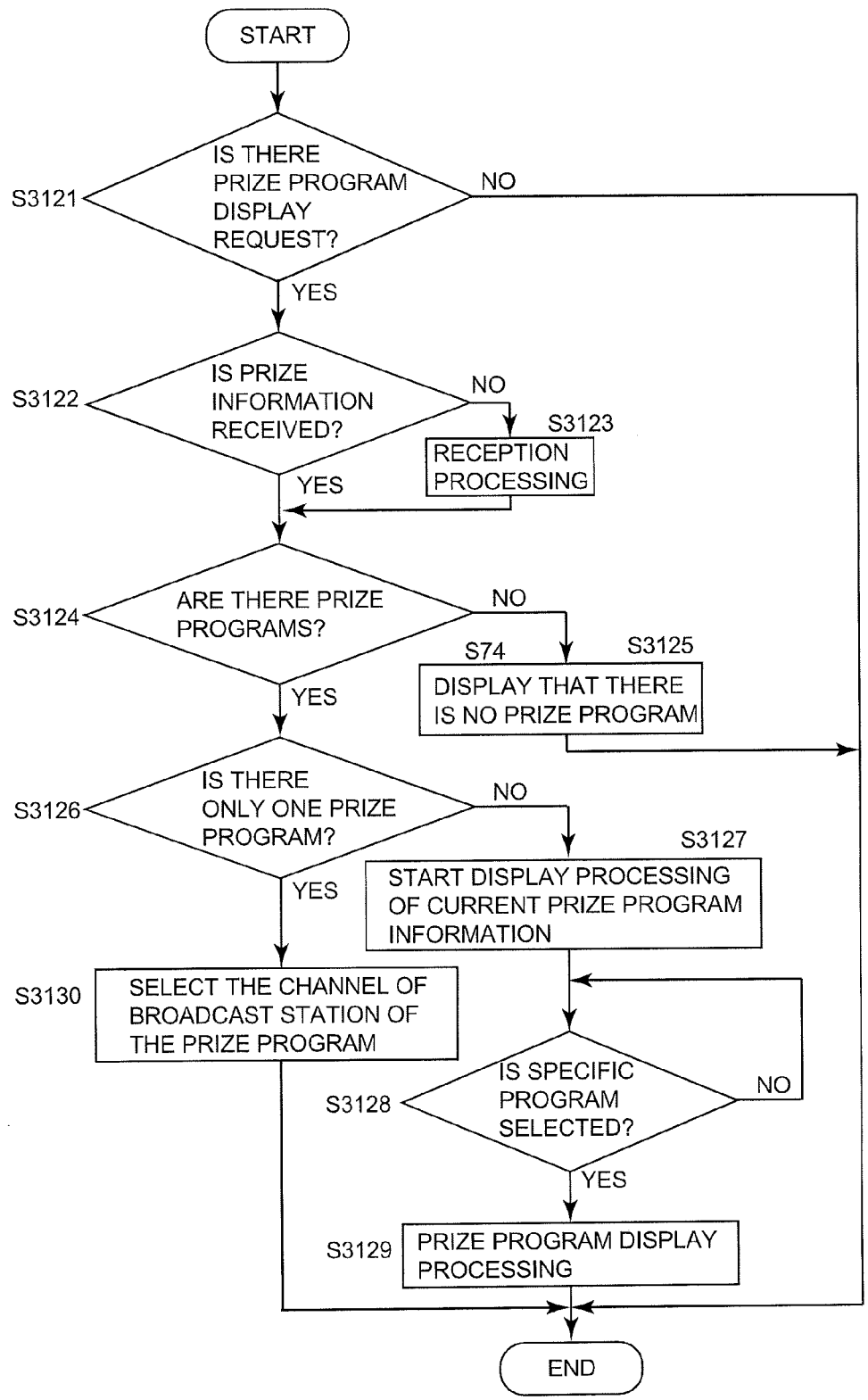
FIG. 46 is a flowchart of prize information search display processing performed by the broadcast reception apparatus of the exemplary embodiment 4 of the present invention.

FIG. 46 is a flowchart of prize program search display processing 3 performed by the broadcast reception apparatus 3030 of the exemplary embodiment 4 of the present invention. The prize program search display processing 3 shown in FIG. 46 is characterized in that, when only one prize program is searched, the channel of the broadcast station broadcasting the prize program is selected.

START: the control unit 3032 starts the prize program search display processing 3 when a prize program search display mode is selected. After starting the prize program search display processing 3, the control unit 3032 proceeds to the process of step S3121.

Step S3121: the control unit 3032 determines the presence or absence of a prize program display request from a user. If the prize program display request from a user is present (YES in step S3121), the control unit 3032 proceeds to the process of step S3122. If the prize program display request from a user is absent (NO in step S3121), the control unit 3032 ends the prize program search display processing 3 (END).

Step S3122: the control unit 3032 determines whether or not the prize information is received. If the prize information is received (YES in step S3122), the control unit 3032 proceeds to the process of step S3124. If the prize information is not received (NO in step S3122), the control unit 3032 proceeds to the process of step S3123.

Step S3123: the control unit 3032 performs reception processing of the prize information, and then proceeds to the process of step S3124. The reception processing is a waiting process until the prize information is received from a broadcast signal.

Step S3124: the control unit 3032 determines the presence or absence of prize program from the EPG information. As a result, if the prize program is present (YES in step S3124), the control unit 3032 proceeds to the process of step S3126. If the prize program is absent (NO in step S3124), the control unit 3032 proceeds to the process of step S3125.

Step S3125: the control unit 3032 displays that there is no prize program, and then ends the prize program search display processing 3 (END).

Step S3126: the control unit 3032 determines the presence or absence of prize program searched in the process of step S3124. If there is only one prize program searched in the process of step S3124 (YES in step S3126), the control unit 3032 proceeds to the process of step S3130. If there are a plurality of prize programs searched in the process of step S3124 (NO in step S3126), the control unit 3032 proceeds to the process of step S3127.

Step S3127: the control unit 3032 starts display processing of current prize programs, and then proceeds to the process of step S3128. The display processing of step S3127 is processing for displaying programs, for example, in a list format so that the user can easily select a specific program.

Step S3128: the control unit 3032 determines whether or not the user selects a current prize program from the EPG information. The control unit 3032 waits until the user selects one of the prize programs (NO in step S3128). If the user selects a current prize program from the EPG information (YES in step S3128), the control unit 3032 proceeds to the process of step S3129.

Step S3129: the control unit 3032 displays the prize program selected in step S3128, and then ends the prize program search display processing 3 (END).

Step S3130: the control unit 3032 selects the channel of the broadcast station of the prize program, and then ends the prize program search display processing 3 (END).

By the prize program search display processing 3 described above, if there is only one program including current prize information, the channel of the broadcast station of the prize program can be promptly selected, so the possibility that the user fails to watch the program can be significantly reduced. Only the programs desired by the user are selected and displayed, so that the user's convenience can be improved.

In the exemplary embodiment 4, the same prize information display processing as that in the exemplary embodiment 3 may be performed.

FIG. 47 is a diagram showing a screen display example 1 displayed on the display apparatus 3050 according to the exemplary embodiment 4 of the present invention. FIG. 47 is a screen display example when a menu button (not shown in the drawings) on the operation input unit 3031 is pressed while receiving a broadcast. The broadcast image displayed on the full screen is reduced, and "set", "search", "reserve", "prize", and "end" are displayed beside the broadcast image. By operating the direction keys on the operation input unit 3031, one of the displays "set", "search", "reserve", "prize", and "end" is selected, and by pressing the decision button on the operation input unit 3031, each processing of "set", "search", "reserve", "prize", and "end" is performed.

Each processing of "set", "search", "reserve", "prize", and "end" will be described. An input of various settings is enabled by selecting the "set". Examples of the various settings include a recording destination medium when the video recording is reserved, video recording quality when the video recording is reserved, and the like. Various searches are enabled by selecting the "search". Examples of the various searches include a search by category of product, a search by application deadline, and the like. An input of video recording reservation or viewing reservation is enabled by selecting the "reserve". The prize information is displayed by selecting the "prize". Each processing of "set", "search", "reserve", and "prize" can be ended by selecting the "end."

Here, when the "prize" is selected on the display screen of FIG. 47 as described above, or when the "green" button (that is, the present button) on the operation input unit 3031 is pressed as described in the screen display example of FIG. 46, the prize programs are listed on the screen as shown in FIG. 48. When the "green" button on the operation input unit 3031 is pressed, if there is no prize program, a screen display example as shown in FIG. 49 is displayed.

Figures 50, 51, 52:
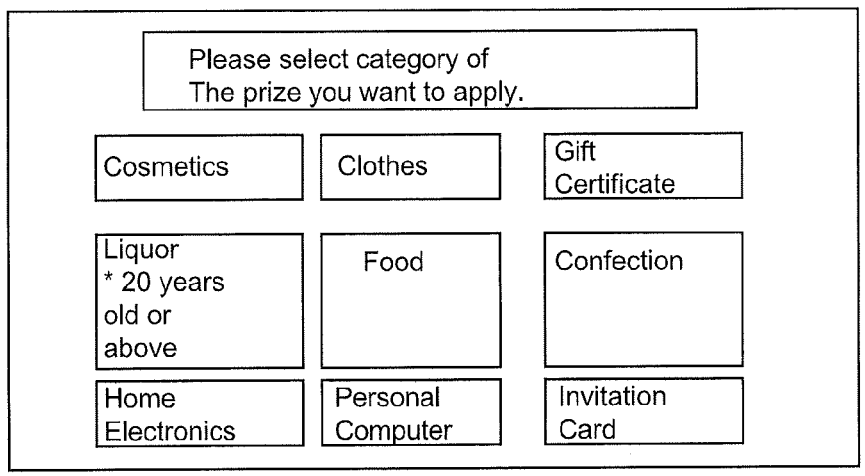
FIG. 50 is a diagram showing a screen display example 2 displayed on the display apparatus according to the exemplary embodiment 4 of the present invention.
FIG. 51 is a diagram showing a screen display example 2 displayed on the display apparatus according to the exemplary embodiment 4 of the present invention.
FIG. 52 is a diagram showing a screen display example 2 displayed on the display apparatus according to the exemplary embodiment 4 of the present invention.

FIG. 50 is a diagram showing a screen display example 2 displayed on the display apparatus 3050 according to the exemplary embodiment 4 of the present invention. FIG. 50 is a screen display example when a category of the prize is selected. Any procedure can be used to switch to the screen of the screen display example of FIG. 50. For example, it is described that the menu button (not shown in the drawings) on the operation input unit 3031 is pressed so that the screen display example shown in FIG. 47 is displayed, and thereafter the direction keys on the operation input unit 3031 are operated so that the "set" is selected, and then the decision button is pressed so that an input of various settings is enabled. One of the various settings may be the screen display example of FIG. 50.

In this way, the user can select a category which the user wants to set on the screen of the screen display example of FIG. 50. For example, the user selects a desired category by moving the direction keys on the operation input unit 3031 and performs selection operation by pressing the decision button.

After the user sets a category in this way, if the user displays the screen display example shown in FIG. 47 and selects "prize" or presses the "green" button (=present button) described in FIG. 36, a list is displayed in which products are narrowed down to products in the category desired by the user.

As shown in FIG. 52, a search condition can also be set on categories other than the product category. The procedure to switch to the screen of the screen display example of FIG. 52 may be the same as the procedure to switch to the screen of the screen display example of FIG. 52.

In this way, the user can select a search condition which the user wants to set on the screen of the screen display example of FIG. 52. Regarding the procedure of the setting, for example, the user displays a search condition which the user wants to set from many search conditions stored in advance in the recording unit 3037 by moving the direction keys on the operation input unit 3031, and sets the search condition by pressing the "decision" button. Or, the user may directly input a keyword or the like by using character input keys (not shown in the drawings) on the operation input unit 3031. By the setting the search condition as described above, the processing shown in FIG. 44 can be performed.

Figure 53:
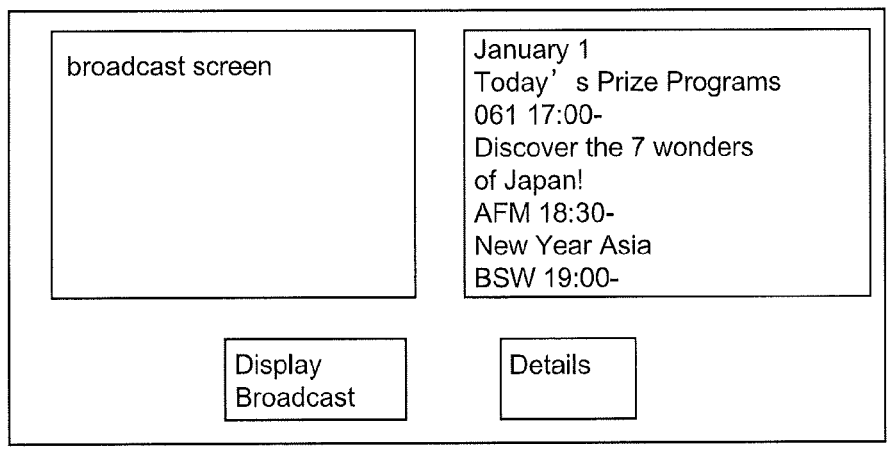
FIG. 53 is a diagram showing a screen display example 3 displayed on the display apparatus according to the exemplary embodiment 4 of the present invention.

FIG. 53 is a diagram showing a screen display example 3 displayed on the display apparatus 3050 according to the exemplary embodiment 4 of the present invention. FIG. 53 is a screen display example when the broadcast reception apparatus 3030 is turned on. Information of today's prize programs is displayed next to the broadcast image. The processing in which the screen display example is displayed corresponds to a case in which "today's prize program" is set as the predetermined condition used in step S3095 in the flowchart described in FIG. 44. It is preferred that programs that ended before the broadcast reception apparatus 3030 is turned on are not displayed even if the programs are "today's prize program". In particular, it is not necessary to display a real-time prize program which closes application at the end of the program.

Figure 54:
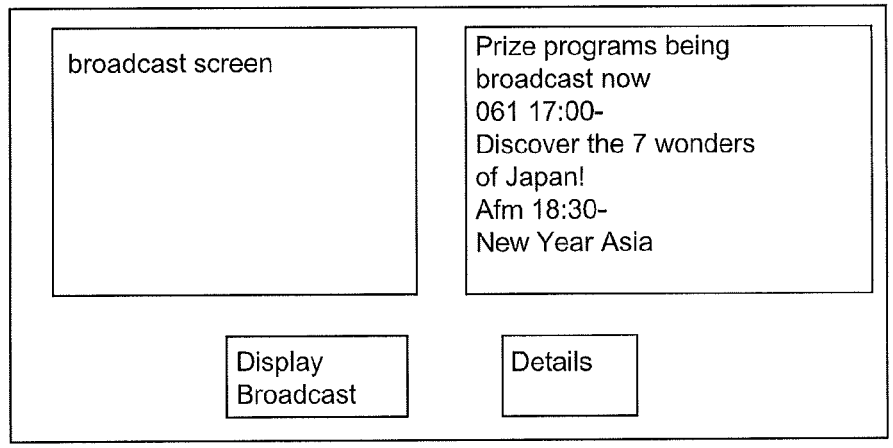
FIG. 54 is a diagram showing a screen display example 4 displayed on the display apparatus according to the exemplary embodiment 4 of the present invention.
Figure 55:
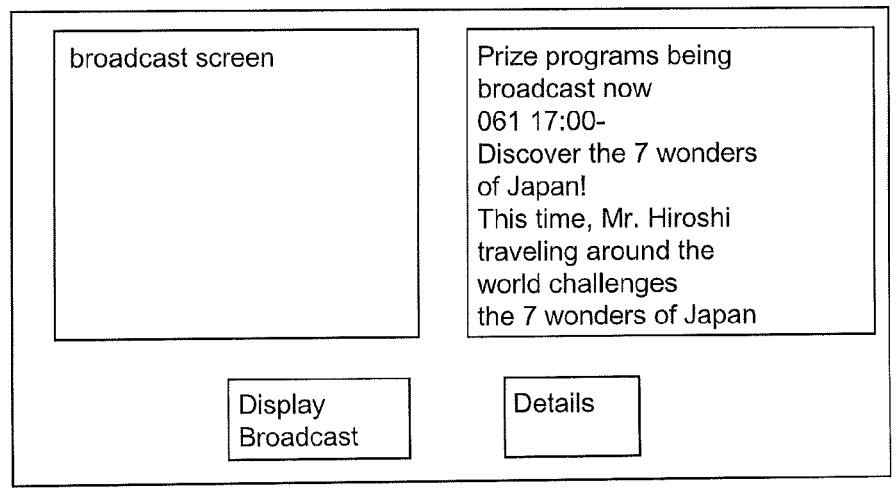
FIG. 55 is a diagram showing a screen display example 4 displayed on the display apparatus according to the exemplary embodiment 4 of the present invention.

FIGS. 54 and 55 are diagrams showing a screen display example 4 displayed on the display apparatus 3050 according to the exemplary embodiment 4 of the present invention. FIGS. 54 and 55 are screen display examples when a user inputs a prize program display request by operating the operation input unit 3031. The screen display examples correspond to the processing of the flowcharts in FIGS. 45 and 46. FIG. 54 is a screen display example when there are a plurality of prize programs in the processing of the flowcharts in FIGS. 45 and 46 (steps S3114 and S3124). In the example of FIG. 54, it is found that "Discover the 7 Wonders of Japan!" and "New Year Asia" are the prize programs. FIG. 55 is a screen display example when there is only one prize program in the processing of the flowcharts in FIGS. 45 and 46 (steps S3117 and S3127). In the example of FIG. 55, only the "Discover the 7 Wonders of Japan!" is the prize program and the detailed information thereof is displayed.

As described above, the information distribution system 3000 according to the exemplary embodiment 4 of the present invention performs broadcast including prize information, so that it is possible to easily grasp a program with prize. Thereby, as a merit of the broadcast station 3010, it is possible to acquire new viewers whose aim is prize and increase chances of viewing. As a merit of the user, it is possible to easily grasp programs with prize from the EPG information, so that the user can easily find a program which offers a present and watch the program. Further, the user can easily grasp what present is offered in the program. Furthermore, the user can grasp whether the program is a real-time prize program or not, so that the user can select whether the user watches the program real-time or records the program and watches the recorded program.

Next, a broadcast transmission apparatus (hereinafter referred to as broadcast transmission apparatus 3011A), which is a modified example of the exemplary embodiment 4 described above, will be described. The broadcast transmission apparatus 3011A is different from the broadcast transmission apparatus 3011 of the exemplary embodiment 4, and generates and transmits prize information separately from the EPG information without transmitting prize information included in the EPG information. The configuration and the function of the broadcast transmission apparatus 3011A are the same as the configuration shown in FIG. 12 and the function of the broadcast transmission apparatus 1011A according to the exemplary embodiment 1. Therefore, although the description is omitted, the constituent elements of the broadcast transmission apparatus 3011A are respectively represented as a control unit 3012A, a contents stream generation unit 3013, an EPG information generation unit 3014A, a data broadcast generation unit 3015, a MUX unit 3016A, a broadcast contents DB 3017, a broadcast schedule DB 3018, and a data broadcast contents DB 3019 in the description below.

Broadcast distribution processing of the broadcast transmission apparatus 3011A, which is a modified example of the exemplary embodiment 4 of the present invention, is the same as that of the broadcast transmission apparatus 1011A of the exemplary embodiment 3, so the description thereof will be omitted. The search processing described in the flowcharts of FIG. 44 to FIG. 46 in "exemplary embodiment 4" can be applied to the "modified example of the exemplary embodiment 4". However, the prize information is not included in the EPG information, so the control unit 3012A reads data of the prize information after specifying a program based on the EPG information, and determines whether or not the program includes prize information. If the program includes prize information, the control unit 3012A can perform the search processing described in "exemplary embodiment 4" by acquiring the prize information.

By performing such distribution processing, in addition to the advantage of the broadcast transmission apparatus 3011 of the exemplary embodiment 4 described above, it is possible to multiplex the prize information with the broadcast data and distribute them to a broadcast reception apparatus 3030A even when the presence or absence of a prize in a program is not decided when the EPG information is generated or prize information is desired to be added after the EPG information is generated. Even when the prize information cannot be included in the EPG information, it is possible to multiplex the prize information with the broadcast data and distribute them to the broadcast reception apparatus 3030A.

A modified example of the information distribution system according to the exemplary embodiment 4 of the present invention will be described. The information distribution system according to the modified example the exemplary embodiment 4 is different from the exemplary embodiments described above, and transmits the EPG information and the like via the IP communication network. Also in the modified example, the user can grasp whether the program is a real-time prize program or not, so that the user can select whether the user watches the program real-time or records the program and watches the recorded program. Even when the EPG information is not transmitted from the broadcast station or the transmitted EPG information does not include prize information, it is possible to easily grasp a program including prize information by acquiring the EPG information including prize information transmitted from the broadcast station server.

Next, another modified example of the exemplary embodiment 4 described above will be described. A broadcast station server of the other modified example of the exemplary embodiment 4 generates and transmits prize information separately from the EPG information without transmitting prize information included in the EPG information. A broadcast reception apparatus of the other modified example of the exemplary embodiment 4 does not receive the EPG information including prize information but receives the EPG information and the prize information which are generated separately. In this modified example, only the prize information is generated and transmitted. The prize information is transmitted in this way, so that only the prize information can be transmitted independently from the EPG information.

The information distribution system 3000 has been described as an exemplary embodiment. The present invention is not limited to this, but various changes and modifications are possible without departing from the scope of the invention.

For example, if a program which needs to be applied in real-time is reserved for video recording, a pop-up screen for asking whether to switch the program to be reserved for viewing may be displayed.

When the EPG information from the broadcast station server 3070 includes a program with present, the broadcast reception apparatuses 3030, 3030A, and 3030B may perform OSD (On Screen Display) on the EPG information from the broadcast signal.

Programs with prize which will be broadcast within 24 hours from the current time may be displayed along with the prize names. In this case, the prize content may be hidden by the broadcast server 3070, or may be disclosed.

The presence or absence of the prize information may be notified by sound or voice. Or, the presence or absence of the prize information may be notified during a broadcast of a program of broadcast signal. Specifically, the prize information may be run as a telop in the screen.

The broadcast reception apparatuses 3030, 3030A, and 3030B may notify the prize application and the lottery results in bidirectional communication with the broadcast station server 3070 via the IP communication network 3100.

The EPG information may be converted into contents data in the broadcast station server 3070 and the contents data may be browsed on the web without transmitting the EPG information.

All or part of functions of each unit described in the information distribution systems 3000 and 3000A according to the exemplary embodiments described above and the modified examples thereof may be configured by a computer program, and the functions may be implemented by installing the computer program in an information processing apparatus (computer). Although the computer program can be directly installed in the computer from a medium in which the computer program is recorded in an executable state, the computer program may be installed in a remote computer via a network.

What is claimed is:
1. An information reception apparatus comprising:
an electronic program information acquisition unit including a tuner which acquires electronic program infor- mation from a broadcast station server through a bidirectional communication link;

an announcement information acquisition unit including a processor which acquires information announced in a program from information included in the electronic program information acquired by the electronic program information acquisition unit or from data transmitted along with the electronic program information; and a recording reservation reception unit including a processor which, when reserving recording of a program, causes an electronic display unit to display whether or not the program to be reserved for recording includes the announced information on the basis of the information acquired by the announcement information acquisition unit, in which:

the announced information is prize information including at least information indicating an application period for applying for a prize through the bidirectional communication link with the broadcast station server, and the recording reservation reception unit determines, for each program to be reserved for recording, whether or not the application period of the prize information is limited within a receiving period of the program being broadcast in accordance with the at least information indicating the application period using information in "real-time or not" column in a data string of the prize information and, in accordance with the determined result, notifies of a program whose application period is within the receiving period of the program being broadcast;

wherein the data string of the prize information is transmitted in the electronic program information, the data string of the prize information comprising a plurality of columns of information, the plurality of columns of information comprise: the "real-time or not" column, "prize application start date and time" column, and "prize application end date and time" column, wherein the "real-time or not" column provides information indicating whether or not the prize application is closed while the program is being broadcast, the "prize application start date and time" column and the "prize application end date and time" column provide information indicating limited application period of the prize.

2. The information reception apparatus according to claim 1, further comprising:

a search unit which searches the electronic program information satisfying a predetermined condition to be a candidate to be reserved for recording before reserving recording.

3. An information distribution apparatus which provides prize information as information announced in a program included in at least either one of the electronic program information and the electronic program information to the information reception apparatus according to claim 1.

4. A method executed by a video recorder to receive information relating to broadcast programs, comprising:

an electronic program information acquisition step comprising acquiring by an electronic program information acquiring unit including a tuner, electronic program information from a broadcast station server through a bidirectional communication link;

an announcement information acquisition step comprising acquiring by an announcement information acquisition unit including a processor, information announced in a program from information included in the electronic program information acquired by the electronic program information acquisition step or from data transmitted along with the electronic program information; and a recording reservation reception step comprising, when reserving recording of a program by a recording reservation reception unit including a processor, displaying whether or not the program to be reserved for recording includes the announced information on the basis of the information acquired by a process of the announcement information acquisition step, wherein:

the announced information is prize information including at least information indicating an application period for applying for a prize through the bidirectional communication link with the broadcast station server, and the recording reservation reception step includes: determining, for each program to be reserved for recording, whether or not the application period of the prize information is limited within a receiving period of the program being broadcast in accordance with the at least information indicating the application period using information in "real-time or not" column in a data string of the prize information and, in accordance with the determined result, notifying of a program whose application period is within the receiving period of the program being broadcast;

wherein the data string of the prize information is transmitted in the electronic program information, the data string of the prize information comprising a plurality of columns of information, the plurality of columns of information comprise: the "real-time or not" column, "prize application start date and time" column, and "prize application end date and time" column, wherein the "real-time or not" column provides information indicating whether or not the prize application is closed while the program is being broadcast, the "prize application start date and time" column and the "prize application end date and time" column provide information indicating limited application period of the prize.

5. A non-transitory computer-readable storage medium storing computer-executable instructions that, when executed by a computer, cause the computer to perform:

an electronic program information acquisition step comprising acquiring by an electronic program information acquiring unit including a tuner, electronic program information from a broadcast station server through a bidirectional communication link;

an announcement information acquisition step comprising acquiring by an announcement information acquisition unit including a processor, information announced in a program from information included in the electronic program information acquired by the electronic program information acquisition step or from data transmitted along with the electronic program information; and a recording reservation reception step comprising, when reserving recording of a program by a recording reservation reception unit including the processor, displaying whether or not the program to be reserved for recording includes the announced information on the basis of the information acquired by the announcement information acquisition step, wherein:

the announced information is prize information including at least information indicating an application period for applying for a prize through the bidirectional communication link with the broadcast station server, and the recording reservation reception step further comprises determining, for each program to be reserved for recording, whether or not the application period of the prize information is limited within a receiving period of the program being broadcast in accordance with the at least information indicating the application period using information in "real-time or not" column in a data string of the prize information and, in accordance with the determined result, notifies of a program whose application deadline is within the receiving period of the program being broadcast;

wherein the data string of the prize information is transmitted in the electronic program information, the data string of the prize information comprising a plurality of columns of information, the plurality of columns of information comprise: the "real-time or not" column, "prize application start date and time" column, and "prize application end date and time" column, wherein the "real-time or not" column provides information indicating whether or not the prize application is closed while the program is being broadcast, the "prize application start date and time" column and the "prize application end date and time" column provide information indicating limited application period of the prize.

* * * * *